United States Patent
Fuse et al.

(10) Patent No.: US 9,750,021 B2
(45) Date of Patent: Aug. 29, 2017

(54) WIRELESS COMMUNICATION SYSTEM, WIRELESS COMMUNICATION METHOD, MOBILE STATION DEVICE, BASE STATION DEVICE, PROGRAM, AND RECORDING MEDIUM

(71) Applicant: Sharp Kabushiki Kaisha, Osaka-shi, Osaka (JP)

(72) Inventors: Shumpei Fuse, Osaka (JP); Shinichi Sawada, Osaka (JP); Katsutoshi Ishikura, Osaka (JP); Shigeto Suzuki, Osaka (JP); Yuhsuke Takagi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 120 days.

(21) Appl. No.: 14/408,373

(22) PCT Filed: Jun. 13, 2013

(86) PCT No.: PCT/JP2013/066371
§ 371 (c)(1),
(2) Date: Dec. 16, 2014

(87) PCT Pub. No.: WO2013/191084
PCT Pub. Date: Dec. 27, 2013

(65) Prior Publication Data
US 2015/0195837 A1    Jul. 9, 2015

(30) Foreign Application Priority Data

Jun. 18, 2012   (JP) ................................ 2012-136980
Jul. 17, 2012   (JP) ................................ 2012-158998

(51) Int. Cl.
*H04W 36/00*    (2009.01)
*H04W 72/04*    (2009.01)
(Continued)

(52) U.S. Cl.
CPC ........ *H04W 72/0453* (2013.01); *H04B 7/022* (2013.01); *H04L 5/001* (2013.01);
(Continued)

(58) Field of Classification Search
CPC ............. H04W 72/0453; H04W 72/04; H04W 72/0426; H04W 76/066; H04W 76/06;
(Continued)

(56) References Cited

U.S. PATENT DOCUMENTS 8,873,505 B2 * 10/2014 Zhang .................... H04L 5/0035
                                                         370/329
8,897,195 B2 * 11/2014 Shimizu .............. H04W 36/026
                                                         370/208

(Continued)

FOREIGN PATENT DOCUMENTS

JP    2006-13826 A    1/2006
JP    2012-60682 A    3/2012
(Continued)

OTHER PUBLICATIONS

3GPP TS 36.300 V11.0.0, "3rd Generation Partnership Project; Technical Specification Group Radio Access Network; Evolved Universal Terrestrial Radio Access (E-UTRA); and Evolved Universal Terrestrial Radio Access Network (EUTRAN); Overall Description; Stage 2 (Release 11)," Dec. 2011, pp. 1-194.
(Continued)

*Primary Examiner* — Kwang B Yao
*Assistant Examiner* — Syed M Bokhari
(74) *Attorney, Agent, or Firm* — Keating & Bennett, LLP

(57) ABSTRACT

A wireless communication system includes a first base station device, a second base station device, a mobile station device configured to communicate with the first base station device using a first component carrier and to communicate with the second base station device using a second compo-
(Continued)

nent carrier. The first base station device includes a disconnection preparation requesting unit configured to transmit to the second base station device, a disconnection preparation request that requests the second base station device to prepare to disconnect the second component carrier.

1 Claim, 43 Drawing Sheets

(51) Int. Cl.
*H04B 7/022* (2017.01)
*H04W 24/08* (2009.01)
*H04W 76/06* (2009.01)
*H04L 5/00* (2006.01)
*H04W 84/04* (2009.01)
*H04W 88/06* (2009.01)
*H04W 88/08* (2009.01)

(52) U.S. Cl.
CPC ........... *H04L 5/0098* (2013.01); *H04W 24/08* (2013.01); *H04W 72/0426* (2013.01); *H04W 76/066* (2013.01); *H04W 84/045* (2013.01); *H04W 88/06* (2013.01); *H04W 88/08* (2013.01)

(58) Field of Classification Search
CPC ... H04W 24/08; H04W 88/06; H04W 84/045; H04W 88/08; H04L 5/001; H04L 5/0098; H04B 7/022
USPC ......... 370/329, 331, 312, 315, 328; 455/436
See application file for complete search history.

(56) References Cited

U.S. PATENT DOCUMENTS

| | | | | |
|---|---|---|---|---|
| 2005/0288025 A1* | 12/2005 | Yoshida | ................ | H04W 36/18 455/442 |
| 2010/0246506 A1* | 9/2010 | Krishnaswamy | ... | H04W 72/085 370/329 |
| 2011/0183674 A1* | 7/2011 | Lee | ................... | H04W 36/0055 455/436 |
| 2011/0249566 A1 | 10/2011 | Bergman et al. | | |
| 2012/0106510 A1* | 5/2012 | Kuo | .................... | H04W 76/064 370/331 |
| 2013/0170435 A1* | 7/2013 | Dinan | .................... | H04L 45/50 370/328 |
| 2013/0272187 A1* | 10/2013 | Malladi | ................. | H04W 76/02 370/315 |
| 2014/0071920 A1 | 3/2014 | Kamei et al. | | |
| 2015/0195837 A1 | 7/2015 | Fuse et al. | | |

FOREIGN PATENT DOCUMENTS

| | | |
|---|---|---|
| JP | 2012-100262 A | 5/2012 |
| JP | 2012-513156 A | 6/2012 |
| JP | 2014-3440 A | 1/2014 |
| WO | 2011/100673 A1 | 8/2011 |
| WO | 2012/006122 A1 | 1/2012 |
| WO | 2012/051631 A1 | 4/2012 |
| WO | 2012/168996 A1 | 12/2012 |

OTHER PUBLICATIONS

Alcatel-Lucent, "Inter-RAT Load Balancing/Carrier Aggregation", 3GPP TSG-RAN Plenary Meeting #51, RP-110384, Mar. 16, 2011, 5 pages.

* cited by examiner

WIRELESS COMMUNICATION SYSTEM, WIRELESS COMMUNICATION METHOD, MOBILE STATION DEVICE, BASE STATION DEVICE, PROGRAM, AND RECORDING MEDIUM

TECHNICAL FIELD

The present invention relates to a wireless communication system, a wireless communication method, a mobile station device, and a base station device.

Priority is claimed on Japanese Patent Application No. 2012-136980 filed Jun. 18, 2012, and Japanese Patent Application No. 2012-158998 filed Jul. 17, 2012, the content of which is incorporated herein by reference.

BACKGROUND ART

Currently, LTE-A (Long Term Evolution-Advanced) specifications are studied by 3GPP (3rd Generation Partnership Project). In LTE-A, it is requested to realize a higher-speed communication than LTE communication. For this reason, in the LTE-A, it has been decided to support a wider band than that for LTE (bandwidth that is over the LTE 20 MHz bandwidth and up to 100 MHz).

In LTE-A, for the purpose of maintaining compatibility with LTE as much as possible, carrier aggregation (CA) technology is employed. Regarding the CA technology, a communication device performs communication simultaneously using a plurality of frequency bands up to a 20 MHz bandwidth, which are called component carriers (CCs). Thus, the communication device can secure a bandwidth up to a 100 MHz bandwidth, and realizes high-speed and high-capacity communication using that bandwidth (see section 5.5 of Non-Patent Document 1).

The CA technology includes three methods classified by usage of frequency bands (frequency bands) to be used by CCs.

(1) Contiguous frequency bands are used in the same frequency band (frequency band) (Inter-band Contiguous CA).

(2) Dispersed frequency bands are used in the same frequency band (frequency band) (Inter-band Non-Contiguous CA).

(3) Frequency bands in different frequency bands (frequency bands) are used (Inter-band Non-Contiguous CA).

A conventionally-studied CA technology is as to communication between mobile station devices and one macrocell base station device. In the CA technology, PUCCH (physical uplink control channel) is transmitted from the mobile station using a single CC.

In the CA technology, PCC (primary component carrier) is defined as a CC used to transmit PUCCH, and SCC (secondary component carrier) is defined as a CC not used to transmit PUCCH.

In the conventional multicarrier communication, there is no concept of PCC/SCC, and it has been possible to independently use the same signal in two frequency bands. Additionally, when a new frequency band (frequency band) is added, transmission of PRACH is performed using that frequency band to be added, synchronization is made, and then a connection process is performed, thus making it possible to add the frequency band.

In communication using the CA technology, it is limited to the PCC, as the first CC, that enables a connection process (see section 7.5 of Non-Patent Document 1).

In the conventional CA technology, a mobile station device has performed communication using PCC and SCC for a single base station device. For this reason, in order to disconnect the SCC, the mobile station device transmits an SCC disconnection request notification to a base station device using the PCC. Based on the disconnection request notification received by the base station device, the base station device could disconnect the communication using the SCC performed by the base station device.

CITATION LIST

Non-Patent Document

[Non-Patent Document 1] 3GPP TS 36.300 V11.0.0 (2011-12)

DISCLOSURE OF THE INVENTION

Problems to be Solved by the Invention

However, in the wireless communication system described in Non-Patent Document 1, it is the same base station device that performs communication using PCC and SCC. For this reason, the number of CCs with which communication can be performed using the CA technology is limited to the number of CCs with which one base station device can perform communication, and therefore a sufficient communication rate could not be obtained in some cases.

The present invention has been in view of such circumstances, and has an object to provide a wireless communication system, a wireless communication method, a mobile station device, a base station device, a program, and a recording medium, which realize the excellent communication speed.

Means for Solving the Problems (1) The present invention has been made to solve the above problems. A first aspect of the present invention is a wireless communication system including: a first base station device; a second base station device; and a mobile station device configured to communicate with the first base station device using a first component carrier and to communicate with the second base station device using a second component carrier. The first base station device includes a disconnection preparation requesting unit configured to transmit to the second base station device, a disconnection preparation request that requests the second base station device to prepare to disconnect the second component carrier.

(2) Additionally, a second aspect of the present invention is the wireless communication system described in the above first aspect. The first base station device includes: a carrier aggregation communication determining unit configured to, in a case that a result of measurement of information representing a traffic amount regarding the mobile station device is equal to or less than a threshold value, determine to disconnect the second component carrier; and a disconnection requesting unit configured to, in a case that the carrier aggregation communication determining unit determines to disconnect the second component carrier, transmits to the mobile station device, a disconnection request that requests the mobile station device to disconnect the second component carrier. The disconnection requesting unit is configured to transmit the disconnection request in a case that the carrier aggregation communication determining unit determines to disconnect the second component carrier. The mobile station device is configured to disconnect the second component carrier upon receiving the disconnection request.

(3) Further, a third aspect of the present invention is the wireless communication system described in the above first aspect. The second base station device is configured to, upon receiving the disconnection preparation request to disconnect the second component carrier which is transmitted from the first base station device, transmit to the mobile station device, a disconnection request that requests the mobile station device to disconnect the second component carrier. The mobile station device is configured to disconnect the second component carrier upon receiving the disconnection request.

(4) Moreover, a fourth aspect of the present invention is the wireless communication system described in the above third aspect. The mobile station device is configured to, upon receiving the disconnection request, notify the first base station device of disconnection of the second component carrier and disconnect the second component carrier.

(5) Additionally, a fifth aspect of the present invention is the wireless communication system described in the above third aspect. The second base station device is configured to, upon receiving the disconnection preparation request, notify the first base station device of disconnection of the second component carrier and transmit to the mobile station device, a disconnection request that requests the mobile station device to disconnect the second component carrier.

(6) Further, a sixth embodiment of the present invention is the wireless communication system described in the above first aspect. The second base station device includes: a carrier aggregation communication rejection determining unit configured to, based on a result of measurement of a communication environment, determine whether or not to disconnect the second component carrier; and a carrier aggregation communication rejection requesting unit configured to, in a case that the carrier aggregation communication rejection determining unit determines to disconnect the second component carrier, transmits to the first base station device, a carrier aggregation communication rejection request that requests the first base station device to reject carrier aggregation communication. The disconnection preparation requesting unit of the first base station device is configured to, upon receiving the carrier aggregation communication rejection request, transmit the disconnection preparation request to the second base station device.

(7) Moreover, a seventh aspect of the present invention is the wireless communication system described in the above first aspect. The wireless communication system further includes a third base station device configured to communicate with the mobile station device using a third component carrier. The first base station device includes: a communication environment detecting unit configured to detect a communication environment of each base station device; and a disconnection target component carrier determining unit configured to, based on a result of detection performed by the communication environment detecting unit, determine a disconnection-target component carrier from among component carriers. The disconnection preparation requesting unit is configured to transmit the disconnection preparation request to the base station device using the disconnection-target component carrier determined by the disconnection target component carrier determining unit.

(8) Additionally, an eighth aspect of the present invention is the wireless communication system described in the above seventh embodiment. The first base station device is configured to transmit to the second base station device and the third base station device, the disconnection preparation request to disconnect the second component carrier.

(9) Further, a ninth aspect of the present invention is the wireless communication system described in the above eighth aspect. The first base station device is configured to transmit to the mobile station device, a disconnection request that requests the mobile station device to disconnect the second component carrier and the third component carrier. The mobile station device is configured to disconnect the second component carrier and the third component carrier upon receiving the disconnection request.

(10) Moreover, a tenth aspect of the present invention is a wireless communication system including: a first base station device; a second base station device; and a mobile station device configured to communicate with the first base station device and the second base station device. The mobile station device includes: a communication unit configured to perform carrier aggregation using a first component carrier to be used to communicate with the first base station device and a second component carrier to be used to communicate with the second base station device; and a disconnection requesting unit configured to transmit using the first component carrier, a disconnection request to disconnect the second component carrier from among component carriers to be used for carrier aggregation. The first base station device includes a disconnection preparation requesting unit configured to, based on the disconnection request, notify the second base station device of a first disconnection preparation request that requests the second base station device to prepare to disconnect the second component carrier being used for carrier aggregation.

(11) Additionally, an eleventh aspect of the present invention is the wireless communication system described in the tenth aspect. The mobile station device includes: the communication unit configured to perform carrier aggregation using the first component carrier to be used to communicate with the first base station device and the second component carrier to be used to communicate with the second base station device; and a communication environment detecting unit configured to detect, in the communication unit, a communication environment of each component carrier.

(12) Further, a twelfth aspect of the present invention is a base station device configured to communicate with a mobile station device using a first component carrier. The base station device includes a disconnection preparation requesting unit configured to transmit to another base station device, a disconnection preparation request that requests the other base station device to disconnect a component carrier used for the mobile station device to communicate with the other base station device.

(13) Moreover, a thirteenth aspect of the present invention is a base station device configured to communicate with a mobile station device using a second component carrier. The base station device includes: a carrier aggregation communication rejection determining unit configured to, based on a result of measurement of a communication environment of each component carrier, determine a component carrier to be disconnected from a first component carrier used for the mobile station device to communicate with another base station device and the second component carrier; and a carrier aggregation communication rejection requesting unit configured to, in a case that the carrier aggregation communication rejection determining unit determines to disconnect the second component carrier, transmit to the other base station device, a carrier aggregation communication rejection request that requests the other base station device to reject carrier aggregation communication.

(14) Additionally, a fourteenth aspect of the present invention is a mobile station device configured to communicate with a first base station device using a first component carrier and communicate with a second base station device using a second component carrier. The mobile station device is configured to receive from the first base station device, a disconnection request that requests the mobile station device to disconnect the second component carrier, and disconnect the second component carrier based on the received disconnection request.

(15) Further, a fifteenth aspect of the present invention is a mobile station device including: a communication unit configured to perform carrier aggregation using a first component carrier to be used to communicate with a first base station device and a second component carrier to be used to communicate with a second base station device; and a disconnection requesting unit configured to transmit using the first component carrier, a disconnection request to disconnect the second component carrier from among component carriers to be used for carrier aggregation.

(16) Moreover, a sixteenth aspect of the present invention is a wireless communication method for a wireless communication system. The wireless communication system includes: a first base station device; a second base station device; and a mobile station device configured to communicate with the first base station device using a first component carrier and to communicate with the second base station device using a second component carrier. The wireless communication method includes: a first step of transmitting a disconnection preparation request that requests preparation to disconnect the second component carrier; a second step of transmitting, based on the disconnection preparation request, a disconnection request that requests disconnection of the second component carrier; and a third step of disconnecting the second component carrier based on the disconnection request.

(17) Additionally, a seventeenth aspect of the present invention is a wireless communication method for a wireless communication system. The wireless communication system includes: a first base station device; a second base station device; and a mobile station device configured to communicate with the first base station device and the second base station device. The wireless communication method includes: a first step of requesting the first base station device to disconnect a carrier aggregation; a second step of, upon receiving the request, requesting the second base station device to prepare to disconnect a component carrier; and a third step of, upon receiving the request, notifying the first base station device of disconnection of the component carrier.

(18) Further, an eighteenth aspect of the present invention is a program for a wireless communication system. The wireless communication system includes: a first base station device; a second base station device; and a mobile station device configured to communicate with the first base station device using a first component carrier and to communicate with the second base station device using a second component carrier. The program has a computer execute: a first step of transmitting a disconnection preparation request that requests preparation to disconnect the second component carrier; a second step of transmitting, based on the disconnection preparation request, a disconnection request that requests disconnection of the second component carrier; and a third step of disconnecting the second component carrier based on the disconnection request.

(19) Moreover, a nineteenth aspect of the present invention is a program for a wireless communication system. The wireless communication system includes: a first base station device; a second base station device; and a mobile station device configured to communicate with the first base station device and the second base station device. The program has a computer execute: a first step of requesting the first base station device to disconnect a carrier aggregation; a second step of, upon receiving the request, requesting the second base station device to prepare to disconnect a component carrier; and a third step of, upon receiving the request, notifying the first base station device of disconnection of the component carrier.

(20) A twentieth aspect of the present invention is a recording medium storing a program for a wireless communication system. The wireless communication system includes: a first base station device; a second base station device; and a mobile station device configured to communicate with the first base station device using a first component carrier and to communicate with the second base station device using a second component carrier. The program executes: a first step of transmitting a disconnection preparation request that requests preparation to disconnect the second component carrier; a second step of transmitting, based on the disconnection preparation request, a disconnection request that requests disconnection of the second component carrier; and a third step of disconnecting the second component carrier based on the disconnection request.

(21) A twenty-first aspect of the present invention is a recording medium storing a program for a wireless communication system. The wireless communication system includes: a first base station device; a second base station device; and a mobile station device configured to communicate with the first base station device and the second base station device. The program has a computer execute: a first step of requesting the first base station device to disconnect a carrier aggregation; a second step of, upon receiving the request, requesting the second base station device to prepare to disconnect a component carrier; and a third step of, upon receiving the request, notifying the first base station device of disconnection of the component carrier.

Effects of the Invention

According to a wireless communication system, a wireless communication method, a mobile station device, a base station device, a program, and a recording medium, it is possible to improve user convenience in communication between a base station device and a mobile station device.

BEST MODE FOR CARRYING OUT THE INVENTION

First Embodiment

Hereinafter, a first embodiment of the present invention will be described with reference to drawings.

Figure 1:
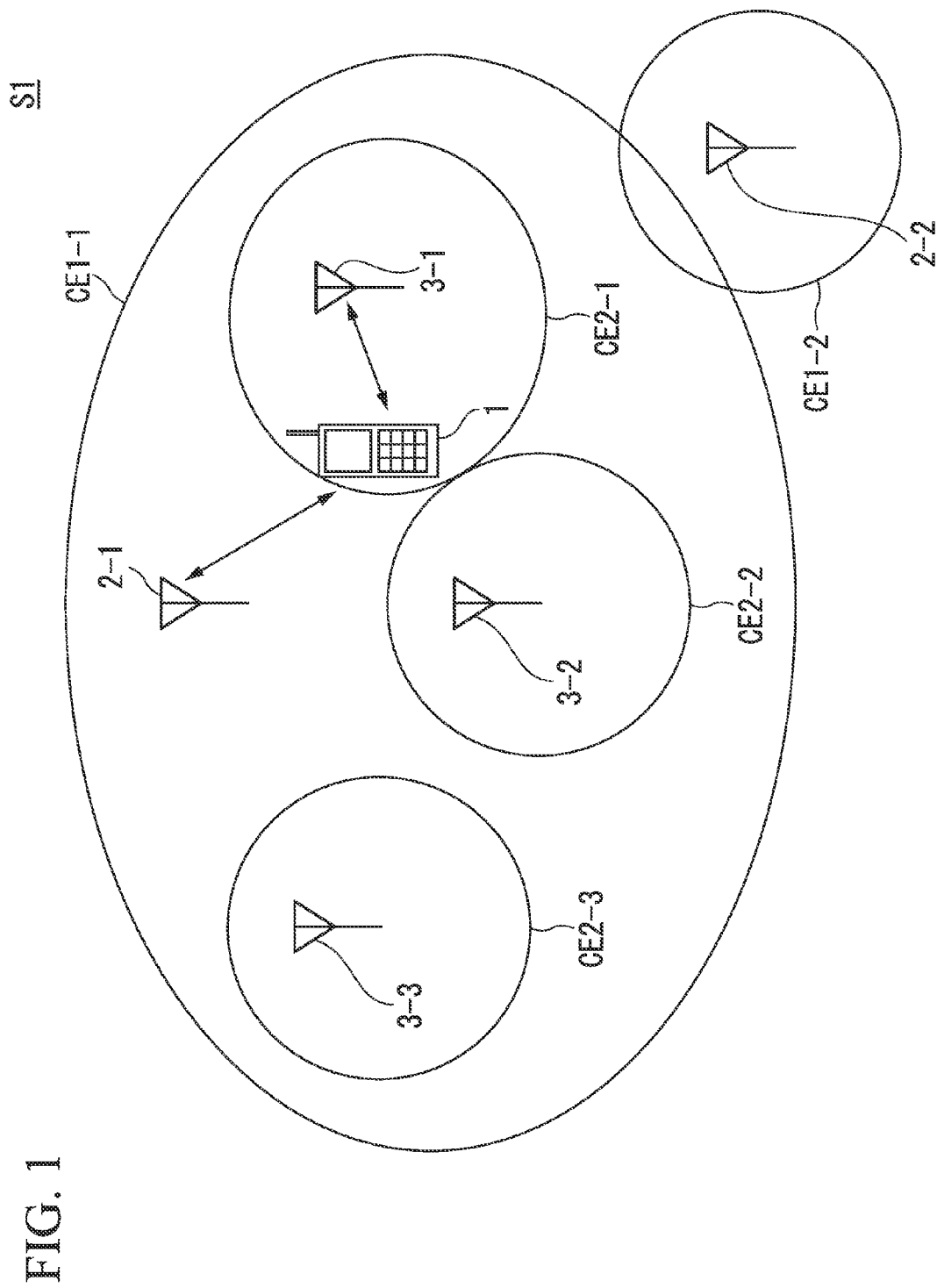
FIG. 1 is a schematic diagram showing an example of a configuration of a wireless communication system according to a first embodiment of the present invention.

FIG. 1 is a schematic diagram showing an example of a configuration of a wireless communication system S1 according to the first embodiment of the present invention.

The wireless communication system S1 includes a mobile station device 1, a macrocell base station device 2-1 (first base station device), a macrocell base station device 2-2, an HeNB (Home eNodeB) base station device 3-1 (second base station device), an HeNB base station device 3-2, and an HeNB base station device 3-3.

The macrocell base station device 2-1 and the macrocell base station device 2-2 respectively serve a cell CE1-1 and a cell CE1-2 as communication coverages. The cells CE1-1 and CE1-2 partially overlap each other. The HeNB base station device 3-1, the HeNB base station device 3-2, and the HeNB the base station device 3-3 respectively serve a cell CE2-1, a cell CE2-2, and a cell CE2-3 as communication coverages. Each of the cells CE2-1, CE2-2, and CE2-3 are included in the communication coverage of the cell CE1-1.

The macrocell base station device 2-1 and the HeNB base station device 3-1 communicate with the mobile station device 1, each using one frequency band. Each of the frequency bands is also referred to as a component carrier (CC), and the maximum bandwidth of the component carrier is 20 MHz. Additionally, the frequency bands (CCs) to be used by the macrocell base station device 2-1 and the HeNB base station device 3-1 are different from each other.

The mobile station device 1 is performing communication using the carrier aggregation (CA) technology, using a CC (first CC) for the macrocell base station device 2-1 and a CC (second CC) for the HeNB base station device 3-1. Here, communication using the CA technology is hereinafter referred to as CA communication.

Here, description will be given hereinafter assuming that the CC for the macrocell base station device 2-1 is a primary component carrier (PCC), and the CC for the HeNB base station device 3-1 is a secondary component carrier (SCC). Description will be given assuming that the mobile station device 1 performs communication using the CA technology, using the PCC and the SCC. Here, PCC is a CC used to transmit a PUCCH, and SCC is a CC not used to transmit a PUCCH.

Additionally, in the following description, the "mobile station device" is occasionally described with no reference numeral, but "mobile station device" represents mobile station devices that are not limited to the mobile station device 1, and include other mobile station devices. Similarly, "base station device" with no reference numeral represents base station devices that are not limited to the macrocell base station device 2-1, the macrocell base station device 2-2, the HeNB base station device 3-1, the HeNB the base station device 3-2, and the HeNB base station device 3-3, and include other base station devices. Additionally, the macrocell base station device 2-1 and the macrocell base station device 2-2 are collectively referred to as the macrocell base station device 2 in some cases. Further, the HeNB base station device 3-1, the HeNB the base station device 3-2, and the HeNB base station device 3-3 are collectively referred to as the HeNB base station device 3 in some cases.

Figure 2:
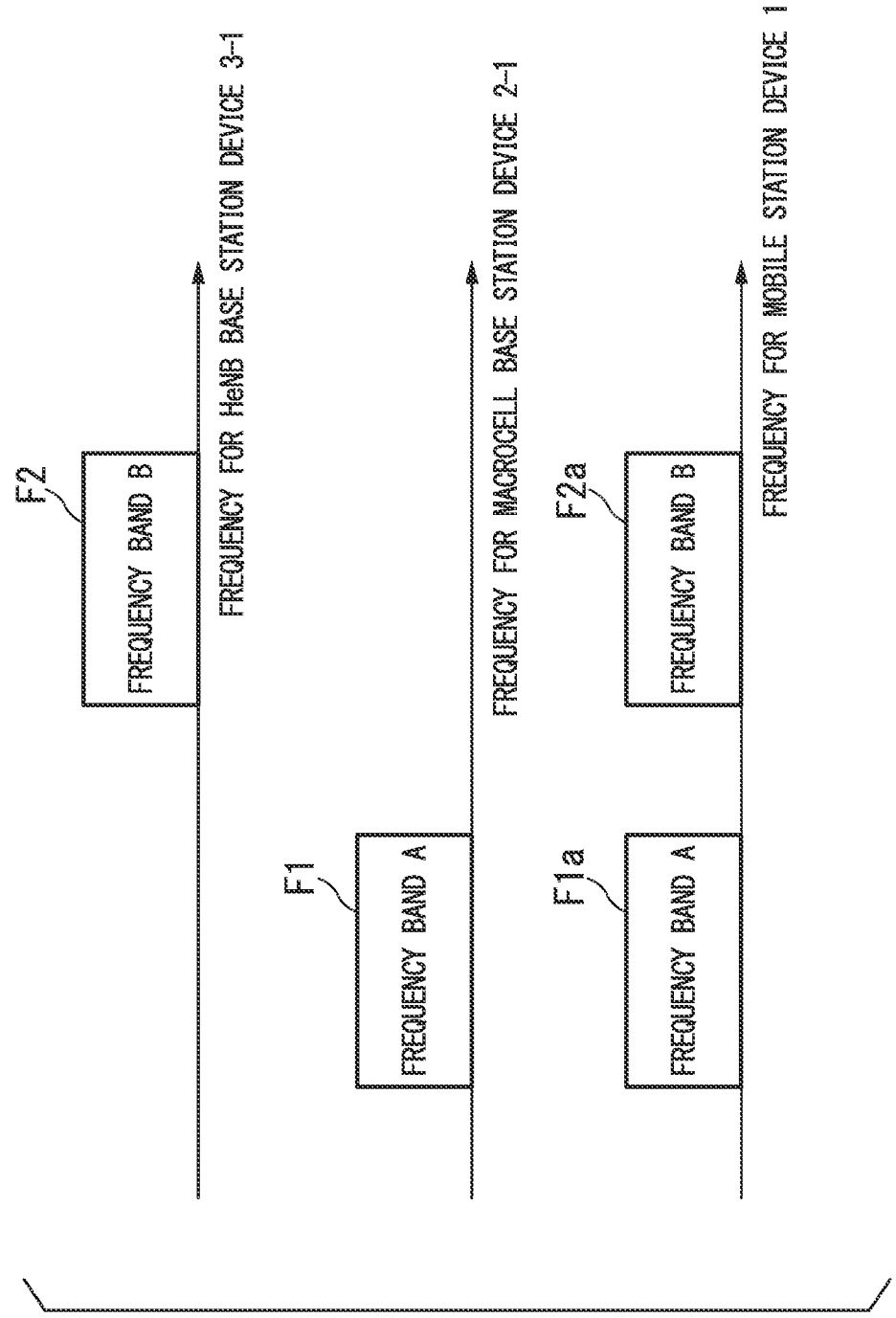
FIG. 2 is a schematic diagram showing an example of communication using carrier aggregation technology according to the first embodiment.

FIG. 2 is a schematic diagram showing an example of communication using the carrier aggregation technology according to the first embodiment of the present invention.

The mobile station device 1 is performing CA communication using a CC (frequency band A) for the macrocell base station device 2-1 and a CC (frequency band B) for the HeNB base station device 3-1. In FIG. 2, the mobile station device 1 is communicating with the macrocell base station device 2-1 and the HeNB base station device 3-1, using frequency bands F1a and F2a. The macrocell base station device 2-1 is communicating with the mobile station device 1, using the frequency band F1. The frequency bands F1 and F1a are the same frequency band A. The HeNB base station device 3-1 communicates with the mobile station device 1, using the frequency band F2. The frequency bands F2 and F2a are the same frequency band B. Here, the mobile station device 1 uses the frequency band F1a as the PCC and uses the frequency band F2a as the SCC, to perform the CA communication.

Figure 3:
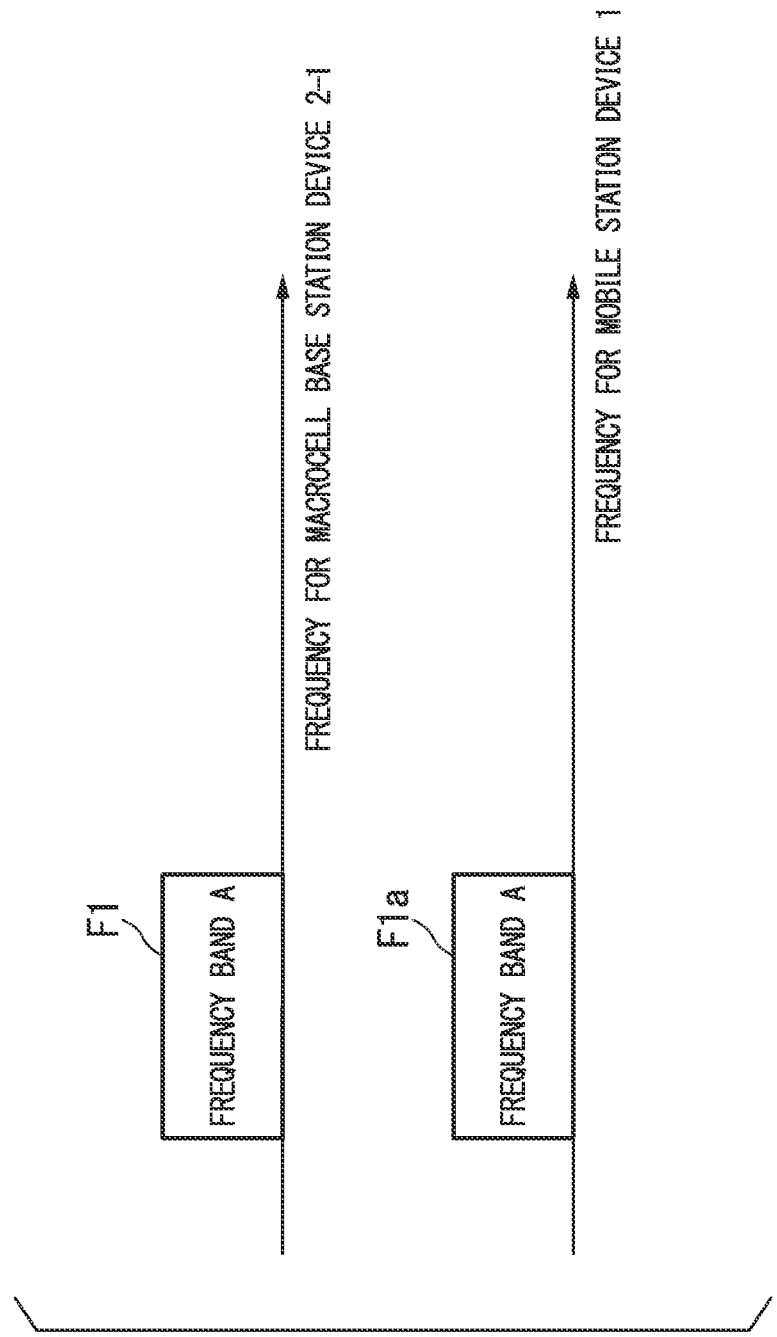
FIG. 3 is a schematic diagram showing an example of disconnection of communication using the carrier aggregation technology according to the first embodiment.

FIG. 3 is a schematic diagram showing an example of disconnection of communication using the carrier aggregation technology according to the first embodiment.

FIG. 3 shows an example of a case where the mobile station device 1 performs an SCC disconnection process as will be described later, in response to an SCC disconnection request transmitted from the macrocell base station device 2-1 to the mobile station device 1.

As shown in FIG. 2, the mobile station device 1 communicates with the macrocell base station device 2-1 and the HeNB base station device 3-1. Here, with respect to the macrocell base station device 2-1, the mobile station device 1 performs the SCC disconnection process for the frequency band F2a. Specifically, the macrocell base station device 2-1 determines whether or not to perform CA communication. If it is determined not to perform CA communication, or if it is determined to disconnect the SCC, the macrocell base station device 2-1 transmits an SCC disconnection request to the mobile station device 1. Upon receiving the SCC disconnection request, the mobile station device 1 disconnects the SCC (frequency band B). Thus, the mobile station 1 communicates with the macrocell base station device 2-1, using the PCC (frequency band A).

Figure 4:
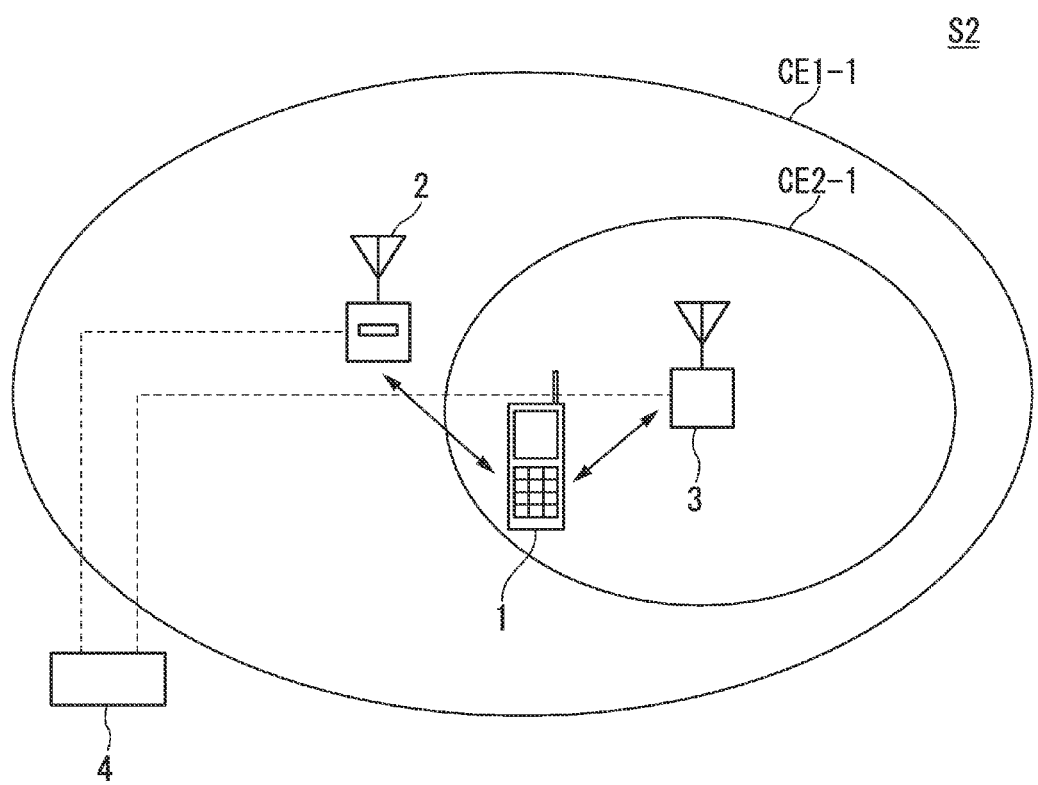
FIG. 4 is a schematic diagram showing an example of a configuration of a wireless communication system according to the first embodiment.

FIG. 4 is a schematic diagram showing an example of a configuration of a wireless communication system S2 according to the first embodiment.

The wireless communication system S2 is configured to include a mobile station device 1, a macrocell base station device 2, an HeNB the base station device 3, and a core network switch 4. Here, a plurality of HeNB base station devices may be connected to an HeNB-GW (Home eNodeB Gateway).

The macrocell base station device 2 and the HeNB base station device 3 respectively serve a cell CE1-1 and a cell CE2-1 as communication coverages. The cell CE2-1 is included in the communication coverage of the cell CE1-1. The macrocell base station device 2 and the HeNB base station device 3 communicate with the mobile station device 1, each using a single CC.

The mobile station device 1 performs wireless communication with the macrocell base station device 2 and the HeNB base station device 3. Here, the mobile station device 1 performs CA communication using CCs for a plurality of base station devices, such as a CC for the macrocell base station device 2 and a CC for the HeNB base station device 3.

The macrocell base station device 2 and the HeNB base station device 3 are connected to the core network switch 4 via a network, such as an optical line or a fixed telephone line.

Figure 5:
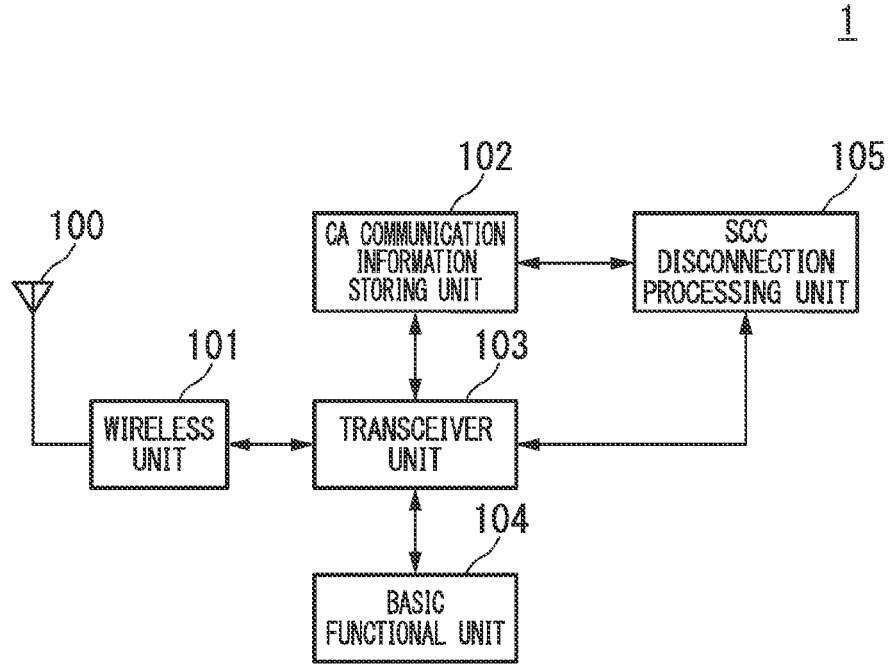
FIG. 5 is a schematic block diagram showing an example of a configuration of a mobile station device according to the first embodiment.

FIG. 5 is a schematic block diagram showing an example of a configuration of the mobile station device 1 according to the first embodiment.

The mobile station device 1 is configured to include a transceiver antenna 100, a wireless unit 101, a CA communication information storing unit 102, a transceiver unit 103, a basic functional unit 104, and an SCC disconnection processing unit 105. Additionally, the mobile station device 1 has generally known functions of mobile station devices, but illustration and description thereof are omitted. The mobile station device 1 performs wireless communication with the macrocell base station device 2 and the HeNB base station device 3.

The wireless unit 101 down-converts a communication signal received from the transceiver antenna 100, and outputs the down-converted communication signal to the transceiver unit 103. Additionally, the wireless unit 101 up-converts a communication signal received from the transceiver unit 103, and transmits the up-converted communication signal to the macrocell base station device 2 or the HeNB the base station device 3 via the transceiver antenna 100.

The CA communication information storing unit 102 stores CA communication information. Here, the CA communication information represents information regarding, for example, an ID of each base station device, an ID of each mobile station device, a cell ID of each base station device, a frequency band of each CC, a bandwidth, and the like.

The transceiver unit 103 modulates a communication signal received from the basic functional unit 104 and the SCC disconnection processing unit 105. Here, the communication signal represents a signal including information regarding, for example, voice communication such as a telephone call, an image and text communication, and the like. Then, the transceiver unit 103 reads the CA communication information stored by the CA communication information storing unit 102. Based on the CA communication information, the transceiver unit 103 maps the modulated communication signal to wireless resources (time, frequency), and outputs the mapped communication signal to the wireless unit 101.

Additionally, the transceiver unit 103 reads the CA communication information stored by the CA communication information storing unit 102. Based on the CA communication information, the transceiver unit 103 demaps to wireless resources, a communication signal received from the wireless unit 101. Then, the transceiver unit 103 demodulates the demapped communication signal. The transceiver unit 103 outputs the demodulated communication signal to the basic functional unit 104.

Further, the transceiver unit 103 outputs to the SCC disconnection processing unit 105, control information regarding disconnection of SCC.

The transceiver unit 103 has the CA communication information storing unit store CA communication information, such as an ID of each base station device, a frequency band of each CC, a bandwidth, and the like, which are used at the time communication has been performed with each base station device.

The basic functional unit 104 includes an input/output device to perform a display of a telephone call, an image, and a text, with respect to voice communication, an image, text communication, and the like, for example, a microphone, speakers, a display, input keys, a touch panel, and the like.

Upon receiving an SCC disconnection request from the macrocell base station device 2, the SCC disconnection processing unit 105 performs a process of disconnecting the SCC.

Specifically, upon receiving the SCC disconnection request from the macrocell base station device 2, the SCC disconnection processing unit 105 refers to the CA communication information stored by the CA communication information storing unit 102, based on any information, such as an ID of a disconnection-target base station device (e.g., the HeNB base station device 3), a cell ID, a frequency band, and a bandwidth, which are included in the SCC disconnection request. Then, the SCC disconnection processing unit 105 deletes from the CA communication information storing unit 102, the CA communication information regarding the disconnection-target base station device, thus updating the CA communication information stored by the CA communication information storing unit 102.

Figure 6:
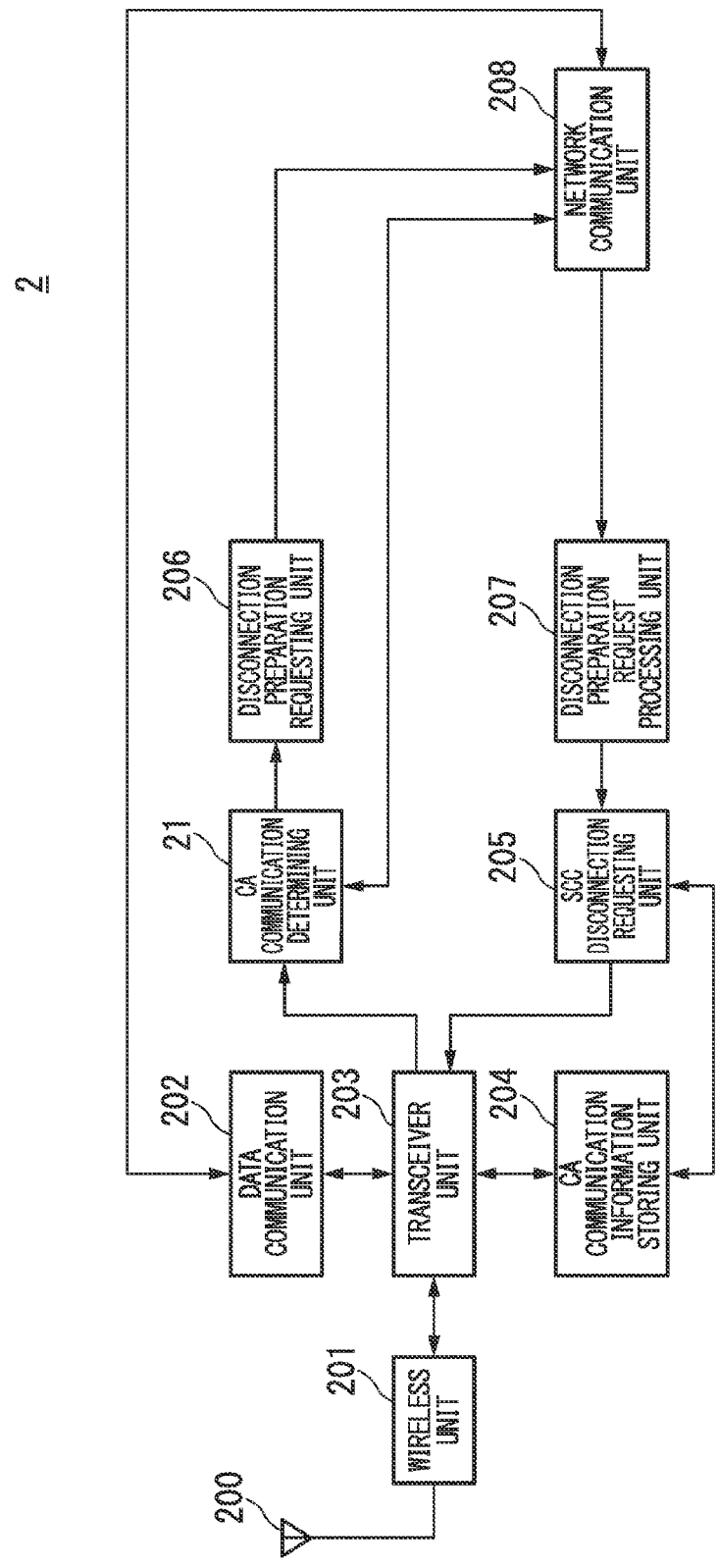
FIG. 6 is a schematic block diagram showing an example of a configuration of a macrocell base station device according to the first embodiment.

FIG. 6 is a schematic block diagram showing an example of a configuration of the macrocell base station device 2 according to the first embodiment.

The macrocell base station device 2 is configured to include a transceiver antenna 200, a wireless unit 201, a data communication unit 202, a transceiver unit 203, a CA communication information storing unit 204, an SCC disconnection requesting unit 205, a disconnection preparation requesting unit 206, a disconnection preparation request processing unit 207, a network communication unit 208, and a CA communication determining unit 21. Additionally, the macrocell base station device 2 has other general functions of base station devices, but illustration and description thereof will be omitted.

The wireless unit 201 down-converts a communication signal received from the transceiver antenna 200, and outputs the down-converted communication signal to the transceiver unit 203. Additionally, the wireless unit 201 up-converts a communication signal received from the transceiver unit 203, and transmits the up-converted communication signal to the mobile station device 1 via the transceiver antenna 200.

The data communication unit 202 generates a control signal including control information, such as scheduling information used to manage a scheduling for other base station devices. Additionally, the data communication unit 202 generates a communication signal including communication information regarding communication with the mobile station device 1. Then, the communication unit 202 outputs the generated control signal to the network communication unit 208. Additionally, the data communication unit 202 outputs the generated communication signal to the transceiver unit 203.

Further, the data communication unit 202 outputs to the transceiver unit 203, a communication signal including control information to be used to control the mobile station device 1 based on the control signal received from the network communication unit 208. Additionally, based on the communication signal received from the transceiver unit 203, the data communication unit 202 generates a control signal including control information with respect to another base station device, and outputs the generated control signal to the network communication unit 208.

The transceiver unit 203 modulates the communication signal received from the data communication unit 202. The transceiver unit 203 reads the CA communication information from the CA communication information storing unit 204. Based on the CA communication information, the transceiver unit 203 maps the modulated communication signal to wireless resources. The transceiver unit 203 outputs the mapped communication signal to the wireless unit 201.

The transceiver unit 203 reads the CA communication information stored by the CA communication information storing unit 204. Based on the CA communication information, the transceiver unit 203 demaps to wireless resources, the communication signal received from the wireless unit 201. The transceiver unit 203 demodulates the demapped communication signal. The transceiver unit 203 outputs the demodulated communication signal to the data communication unit 202.

The transceiver unit 203 outputs to the CA communication determining unit 21, a control signal including control information regarding disconnection of SCC.

The CA communication information storing unit 204 stores the CA communication information.

For example, the CA communication determining unit 21 measures the amount of traffic between the mobile station device 1 and the macrocell base station device 2, and the amount of traffic between the mobile station device 1 and the HeNB the base station device 3. Here, the amount of traffic represents information regarding, for example, the data amount of uplink/downlink communication between a mobile station device and a base station device, the amount of cell traffic of each base station device, the call type used for communication (communication bearer), communication limitation, and the like. The CA communication determining unit 21 determines whether a result of the measurement of the traffic amount is equal to or less than a threshold value. If the result of the measurement of the traffic amount is equal to or less than the threshold value, the CA communication determining unit 21 determines to disconnect the CA communication. The detailed operation of the CA decision communication unit 21 will be described later.

The disconnection preparation requesting unit 206 generates an SCC disconnection preparation request based on the result of the determination performed by the CA communication determining unit 21. Then, the disconnection preparation requesting unit 206 transmits the generated SCC disconnection preparation request to the HeNB base station device 3 via the network communication unit 208.

The disconnection preparation request processing unit 207 receives from the HeNB the base station device 3 via the network communication unit 208, a disconnection preparation ACK as a response to the disconnection preparation request. Then, upon receiving the disconnection preparation ACK from the HeNB the base station device 3, the disconnection preparation request processing unit 207 outputs an instruction signal that instructs the SCC disconnection requesting unit 205 to generate a disconnection request.

Based on the instruction signal received from the disconnection preparation request processing unit 207, the SCC disconnection requesting unit 205 reads from the CA communication information storing unit 204, the CA communication information regarding the HeNB base station device 3. Then, the SCC disconnection requesting unit 205 generates a SCC disconnection request addressed to the HeNB base station device 3.

Then, the SCC disconnection requesting unit 205 transmits to the mobile station device 1, the CA communication information read from the CA communication information storing unit 204, and the generated SCC disconnection request.

Then, the SCC disconnection requesting unit 205 deletes from the CA communication information storing unit 204, the CA communication information regarding the disconnection-target HeNB base station device 3.

The network communication unit 208 outputs to the data communication unit 202, a control signal received from another base station device. Additionally, the network communication unit 208 transmits to another base station device (e.g., the HeNB base station device 3), the control signal received from the data communication unit 202.

Additionally, the network communication unit 208 transmits the disconnection preparation request received from the disconnection preparation requesting unit 206, to the disconnection-target base station device, for example, the HeNB base station device 3. Then, the network communication unit 208 outputs to the disconnection preparation request processing unit 207, a disconnection preparation ACK received from the disconnection-target base station device in response to the disconnection preparation request.

Figure 7:
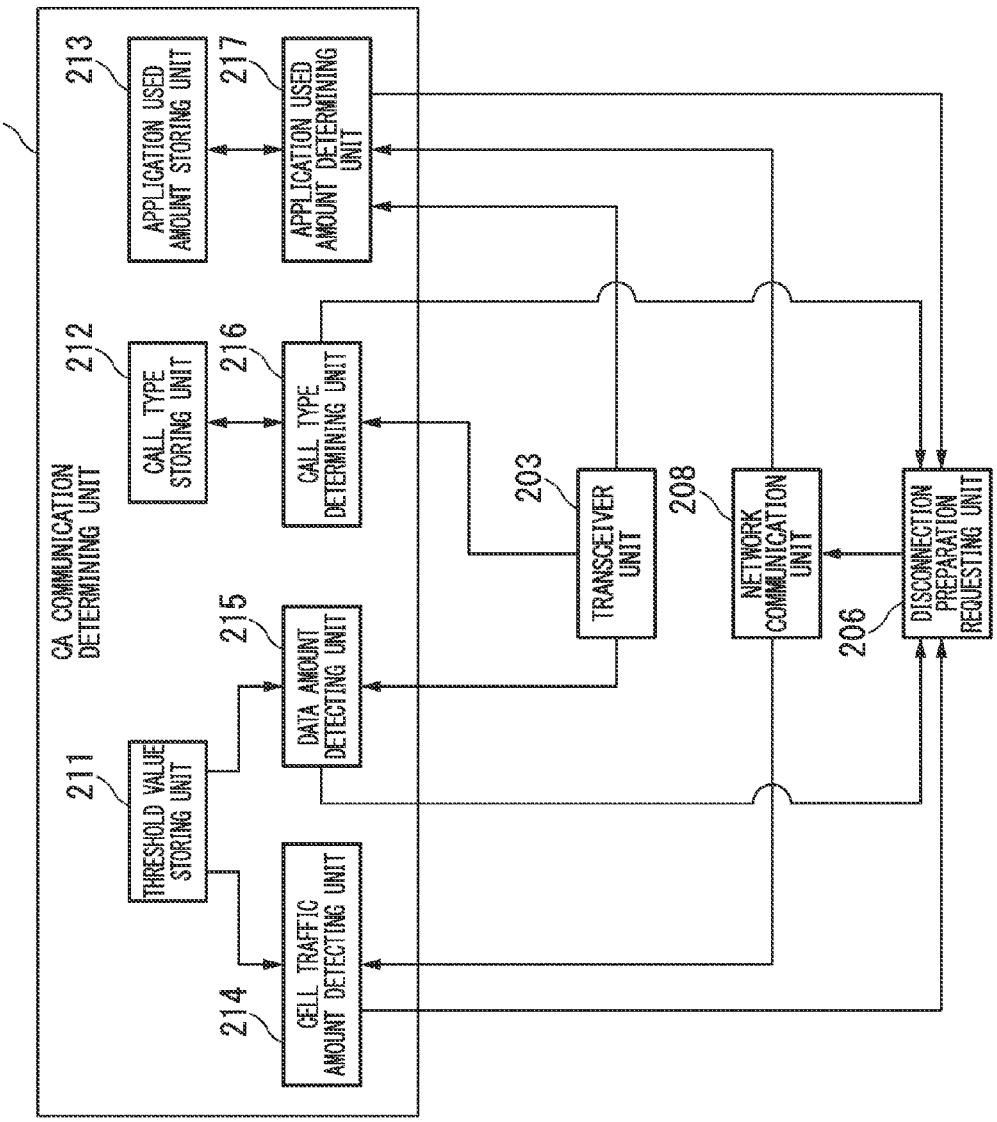
FIG. 7 is a schematic block diagram showing an example of a configuration of a carrier aggregation communication determining unit according to the first embodiment.

FIG. 7 is a schematic block diagram showing an example of a configuration of the carrier aggregation communication determining unit (CA communication determining unit 21) according to the first embodiment.

The CA communication determining unit 21 includes a threshold value storing unit 211, a call type storing unit 212, an application used amount storing unit 213, a cell traffic amount detecting unit 214, a data amount detecting unit 215, a call type determining unit 216, and an application used amount determining unit 217.

The threshold value storing unit 211 stores a threshold value regarding the traffic amount of the cell served by the HeNB the base station device 3, a threshold value regarding the traffic amount of the cell served by the macrocell base station device 2, a threshold value regarding the amount of downlink data to be transmitted to the mobile station device 1, and a threshold value regarding the amount of uplink data to be transmitted from the mobile station device 1.

The call type storing unit 212 stores information regarding the call type.

The application used amount storing unit 213 stores information regarding the amount of applications in use.

The cell traffic amount detecting unit 214 detects the traffic amount of the cell serviced by the HeNB base station device 3 in communication with the network communication unit 208. Then, the cell traffic amount detecting unit 214 determines whether or not the traffic amount of the cell served by the HeNB base station device 3 is greater than or equal to the threshold value. If the traffic amount of the cell served by the HeNB base station device 3 is greater than or equal to the threshold value, that is, if the HeNB base station device 3 is in a busy state, the cell traffic detecting unit 214 determines to disconnect the CA communication.

Additionally, the cell traffic detecting unit 214 detects the traffic amount of the cell served by the macrocell base station device 2 in communication using the network communication unit 208. Then, the cell traffic detecting unit 214 determines whether or not the traffic amount of the cell served by the macrocell base station device 2 is equal to or less than the threshold value. If the traffic amount of the cell served by the macrocell base station device 2 is equal to or less than the threshold value, for example, if the macrocell base station device 2 is not in a busy state, the cell traffic detecting unit 214 determines to disconnect the CA communication. Upon determining to disconnect the CA communication, the cell traffic amount detecting unit 214 outputs an instruction signal that instructs the disconnection preparation requesting unit 206 to generate a disconnection preparation request.

Here, the cell traffic amount detecting unit 214 may determine to disconnect the CA communication in at least one of the case where the traffic amount of the cell served by the macrocell base station device 2 is equal to or less than the threshold value, and the case where the traffic amount of the cell served by the HeNB base station device 3 is greater than or equal to the threshold value.

The data amount detecting unit 215 detects the amount of downlink data to be transmitted by the transceiver unit 203 to the mobile station device 1. Then, the data amount detecting unit 215 determines whether or not the detected amount of downlink data is equal to or less than a threshold value. If the amount of downlink data to be transmitted to the mobile station device 1, for example, the amount of data addressed to the mobile station device 1and stored in a buffer of the macrocell base station device 2, is equal to or less than the threshold value, the data amount detecting unit 215 determines to disconnect the CA communication.

The data amount detecting unit 215 detects the amount of uplink data to be transmitted from the mobile station device 1. Then, the data amount detecting unit 215 determines whether or not the detected amount of uplink data is equal to or less than a threshold value. If the amount of uplink data to be transmitted from the mobile station device 1, for example, the amount of data to be transmitted from the mobile station device 1 and stored in a buffer of the mobile station device 1, is equal to or less than the threshold value, the data amount detecting unit 215 determines to disconnect the CA communication.

Upon determining to disconnect the CA communication, the data amount detecting unit 215 outputs to the disconnection preparation requesting unit 206, an instruction signal that instructs the disconnection preparation requesting unit 206 to generate a disconnection preparation request.

Here, the data amount detecting unit 215 may determine to disconnect the CA communication in at least one of the case where the amount of downlink data is equal to or less than the threshold value, and the case where the amount of uplink data is equal to or less than the threshold value. Additionally, for example, in a case where the amount of downlink data is equal to or greater than the threshold value, and the amount of uplink data is equal to or less than the threshold value, the data amount detecting unit 215 may determine to disconnect only the SCC used in the uplink.

The call type determining unit 216 detects a call type during communication, and determines whether or not to disconnect the CA communication in response to a change in call type during the communication. For example, if the call type is switched from the call type of the high volume to the call type of the small volume, the call type determining unit 216 determines to disconnect the CA communication. In other words, when communication connection is established, the call type determining unit 216 instructs the mobile station device 1 about by which call type to establish communication connection. For this reason, the call type determining unit 216 has the call type storing unit 212 store the call type used when the mobile station device 1 initiates communication with the macrocell base station device 2. Upon determining to disconnect the CA communication, the call type determining unit 216 outputs to the disconnection preparation requesting unit 206, an instruction signal that instructs the disconnection preparation requesting unit 206 to generate a disconnection preparation request.

The application used amount determining unit 217 detects the number of applications being used by the network communication unit 208 and the transceiver unit 203. Then, in accordance with the number of applications in use, the application used amount determining unit 217 determines whether or not to disconnect the CA communication. For example, in a case where one of a plurality of applications is suspended in use while the plurality of applications are simultaneously used, the application used amount determining unit 217 determines to disconnect the CA communication.

Specifically, in a case where while a file is being downloaded by an application installed on the mobile station device 1, for example, a file sharing application, two applications such as ones that use another game application are used, if the game application is terminated or suspended in use, the application used amount determining unit 217 determines to disconnect the CA communication.

The application used amount determining unit 217 has the application used amount storing unit 213 store the detected number of applications. Then, upon determining to disconnect the CA communication, the application used amount determining unit outputs to the disconnection preparation requesting unit 206, an instruction signal that instructs the disconnection preparation requesting unit 206 to generate a disconnection preparation request.

Here, in the present embodiment, the CA communication is determined to be disconnected if at least one of the cell traffic amount detecting unit 214, the data amount detecting unit 215, the call type determining unit 216, and the application used amount determining unit 217 determines to disconnect the CA communication. However, the CA communication may be determined to be disconnected based on other conditions, for example, information regarding communication environments, a wireless communication quality, a bit rate, or the like. Here, examples of the information regarding communication environments include information regarding a bit error rate or a packet error rate for each CC, a throughput, or the like. Additionally, although the expression "disconnect SCC (disconnect CA communication)" is used here, an expression "deactivate SCC" may be used.

Figure 8:
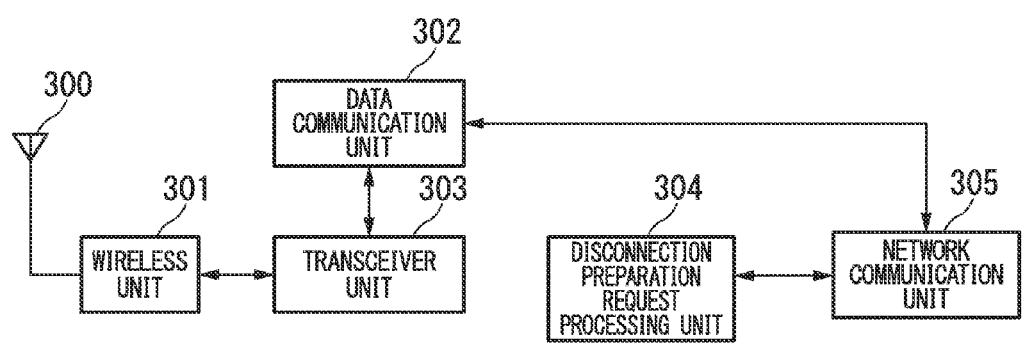
FIG. 8 is a schematic block diagram showing an example of a configuration of an HeNB base station device according to the first embodiment.

FIG. 8 is a schematic block diagram showing an example of a configuration of the HeNB base station device 3 according to the first embodiment.

The HeNB base station device 3 is configured to include a transceiver antenna 300, a wireless unit 301, a data communication unit 302, a transceiver unit 303, a disconnection preparation request processing unit 304, and a network communication unit 305. Additionally, the HeNB base station device 3 has other general functions of base station devices, but illustration and description thereof are omitted here.

The wireless unit 301 down-converts a communication signal received from the transceiver antenna 300, and outputs the down-converted communication signal to the transceiver unit 303.

Additionally, the wireless unit 301 up-converts a communication signal received from the transceiver unit 303, and transmits the up-converted communication signal to the mobile station device 1 via the transceiver antenna 300.

The data communication unit 302 generates a control signal including control information. Additionally, the data communication unit 302 generates a communication signal including communication information regarding communication with the mobile station device 1. Then, the communication unit 302 outputs the generated control signal to the network communication unit 305. Additionally, the data communication unit 302 outputs the generated communication signal to the transceiver unit 303.

Further, the data communication unit 302 outputs to the transceiver unit 303, a communication signal including control information to be used to control the mobile station device 1 based on the control signal received from the network communication unit 305. Additionally, based on the communication signal received from the transceiver unit 303, the data communication unit 302 generates a control signal including control information addressed to another base station device, and outputs the generated control signal to the network communication unit 305.

The transceiver unit 303 modulates the communication signal received from the data communication unit 302. The transceiver unit 303 maps the modulated communication signal to wireless resources, using allocation of a predetermined frequency band (e.g., CC). The transceiver unit 303 outputs the mapped communication signal to the wireless unit 301.

Using allocation of a predetermined frequency band (e.g., CC), the transceiver unit 303 demaps to wireless resources, a communication signal received from the wireless unit 301. The transceiver unit 303 demodulates the demapped communication signal. The transceiver unit 303 outputs the demodulated communication signal to the data communication unit 302.

Upon receiving the disconnection preparation request from the macrocell base station device 2 via the network communication unit 305, the disconnection preparation request processing unit 304 performs preparation to disconnect SCC. The disconnection preparation request processing unit 304 transmits a disconnection preparation ACK to the macrocell base station device 2 via the network communication unit 305.

Here, in the present embodiment, network communication between the macrocell base station device 2 and the HeNB the base station device 3 is performed via the core network switch 4, that is, an S1 interface. However, the network communication may be performed via an X2 interface that enables direct communication between the macrocell base station device 2 and the HeNB base station device 3.

Figure 9:
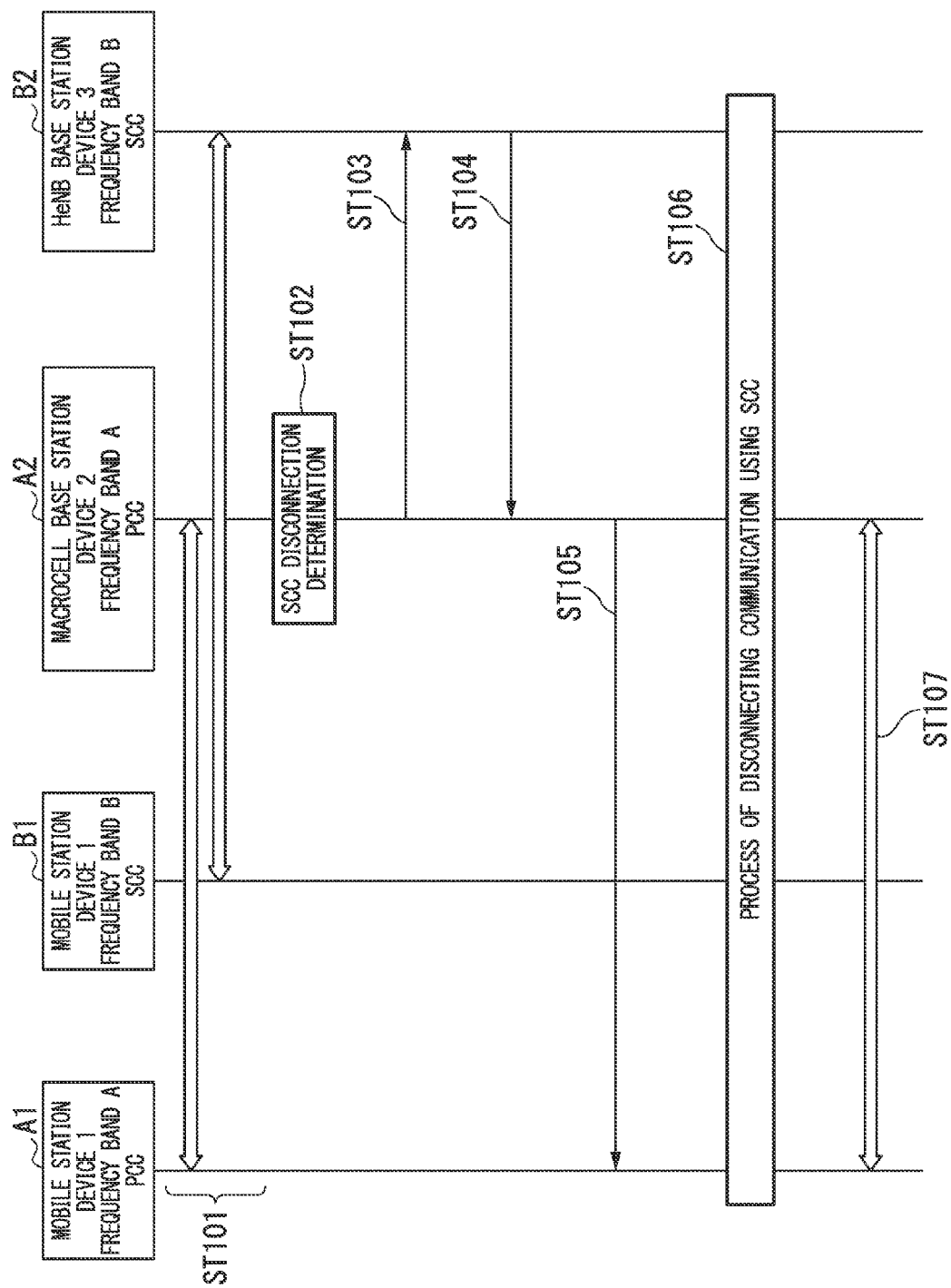
FIG. 9 is a sequence diagram illustrating an example of a component carrier disconnection process to be performed by the mobile station device and two base station devices according to the first embodiment.

FIG. 9 is a sequence diagram showing an example of a component carrier disconnection process performed by the mobile station device 1 and the two base station devices according to the first embodiment.

Communication between the macrocell base station device 2 and the HeNB base station device 3 is performed via the network communication units 208 and 305 of the respective base station devices, but description thereof is omitted hereinafter.

Additionally, communication between the mobile station device 1 and the macrocell base station device 2, and communication between the mobile station device 1 and the HeNB base station device 3, are performed via the transceiver antennas 100, 200, and 300, the wireless units 101, 201, and 301, and the transceiver units 103, 203, and 303, but description thereof is omitted hereinafter.

The mobile station device 1 is performing CA communication using PCC (frequency band A) used for communication with the macrocell base station device 2, and SCC (frequency band B) used for communication with the HeNB base station device 3 (step ST101).

The CA communication determining unit 21 of the macrocell base station device 2 determines to disconnect CA communication from a result of measurement of information regarding the traffic amount (step ST102).

When the CA communication determining unit 21 determines to disconnect the CA communication, the disconnection preparation requesting unit 206 of the macrocell base station device 2 transmits a disconnection preparation request to the HeNB base station device 3 (step ST103).

Upon receiving the disconnection preparation request from the macrocell base station device 2, the disconnection preparation request processing unit 304 of the HeNB base station device 3 performs preparation to disconnect SCC, and transmits a disconnection preparation ACK to the macrocell base station device 2 (step ST104).

Based on the disconnection preparation ACK received from the HeNB base station device 3, the SCC disconnection requesting unit 205 of the macrocell base station device 2 transmits an SCC disconnection request to the mobile station device 1 (step ST105).

Upon receiving the disconnection request from the macrocell base station device 2, the SCC disconnection processing unit 105 of the mobile station device 1 disconnects communication with the HeNB base station device 3 (step ST106).

The mobile station device 1 performs communication with the macrocell base station device 2, using PCC (step ST107).

Thus, a wireless communication system according to the present embodiment includes the macrocell base station device 2 (first base station device), the HeNB base station device 3 (second base station device), and the mobile station device 1 that communicates with the macrocell base station device 2 (first base station device) using a first component carrier (PCC) and communicates with the HeNB base station device 3 (second base station device) using a second component carrier (SCC). The disconnection preparation requesting unit 206 of the macrocell base station device 2 (first base station device) transmits to the HeNB base station device 3 (second base station device), a disconnection preparation request for the second component carrier (SCC).

Thus, it is possible to disconnect a component carrier in accordance with the traffic amount, thereby making it possible to provide an excellent communication speed for PCC.

Here, the description has been given in the present embodiment with respect to the case where the macrocell base station device 2 uses PCC as a main base station device, and the HeNB base station device 3 uses SCC. However, the HeNB base station device 3 may be configured to use PCC as a main base station device. Alternatively, a configuration may be such that another HeNB base station uses PCC as a main base station device, and the HeNB base station device 3 uses SCC. Additionally, a main base station device is assumed to manage a scheduling. As a modified example, however, the core network switch 4 may be configured to manage the scheduling.

Further, in the present embodiment, the expression "disconnect SCC" has been used, but an expression "deactivate SCC and monitor the SCC" may be used. Here, the "deactivate" means entering a state such that no data communication, and no transmission and reception of a control signal and the like are performed. For example, reference signals (pilot symbols) of deactivated SCC are received periodically. When measurement of a reception quality of the CC is not performed, the power of the system of receiving SCC can be turned off. Here, even when deactivation is performed, it is not always necessary to perform monitoring.

Second Embodiment

Hereinafter, a second embodiment of the present invention will be described with reference to drawings.

An example of CA communication according to the second embodiment of the present invention is similar to that shown in FIGS. 2 and 3, and therefore description thereof is omitted here. Additionally, a wireless communication system S2 according to the present embodiment is similar to the wireless communication system S2 shown in FIG. 4, and therefore description thereof is omitted here.

Figure 10:
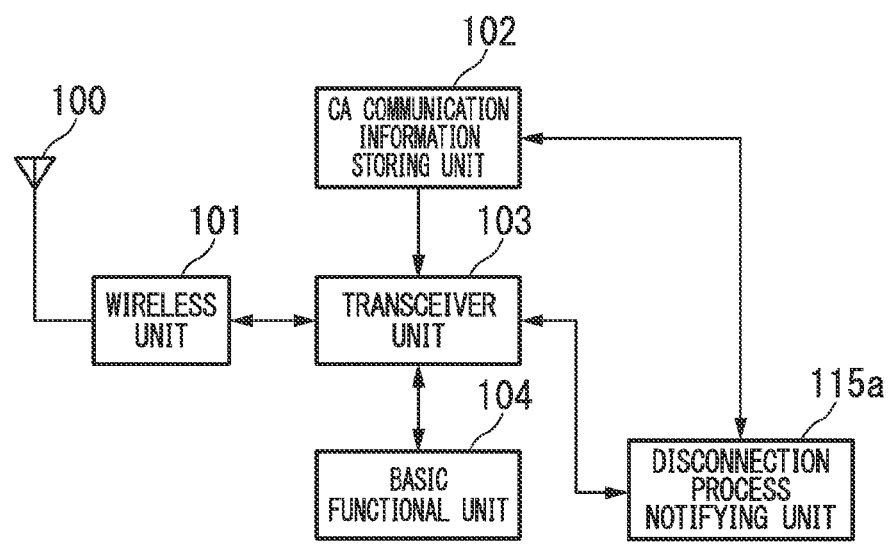
FIG. 10 is a schematic block diagram showing an example of a configuration of a mobile station device according to a second embodiment of the present invention.

FIG. 10 is a schematic block diagram showing an example of a configuration of a mobile station device 1a according to the second embodiment of the present invention.

Comparing the mobile station device 1a and the mobile station device 1 of the first embodiment, there are differences in that the SCC disconnection processing unit 105 is removed, and a disconnection process notifying unit 115a is added. Other configurations are similar to those of the first embodiment, and therefore description thereof is omitted here. The mobile station device 1a performs wireless communication with a macrocell base station device 2a and an HeNB base station device 3a.

Upon receiving a disconnection request from the HeNB base station device 3a, the disconnection process notifying unit 115a performs a process of disconnecting SCC. Specifically, upon receiving an SCC disconnection request from the HeNB the base station device 3a, the disconnection process notifying unit 115a reads CA communication information from the CA communication information storing unit 102, using any information, such as an ID of the disconnection-target HeNB base station device 3a, a cell ID, a frequency band, a bandwidth, and the like, which are included in the SCC disconnection request. Then, the disconnection process notifying unit 115a deletes the information, such as an ID of the disconnection-target HeNB base station device 3a, a cell ID, a frequency band, a bandwidth, and the like, thus updating the CA communication information stored by the CA communication information storing unit 102. The disconnection process notifying unit 115a transmits an SCC disconnection process notification to the macrocell base station device 2a.

Figure 11:
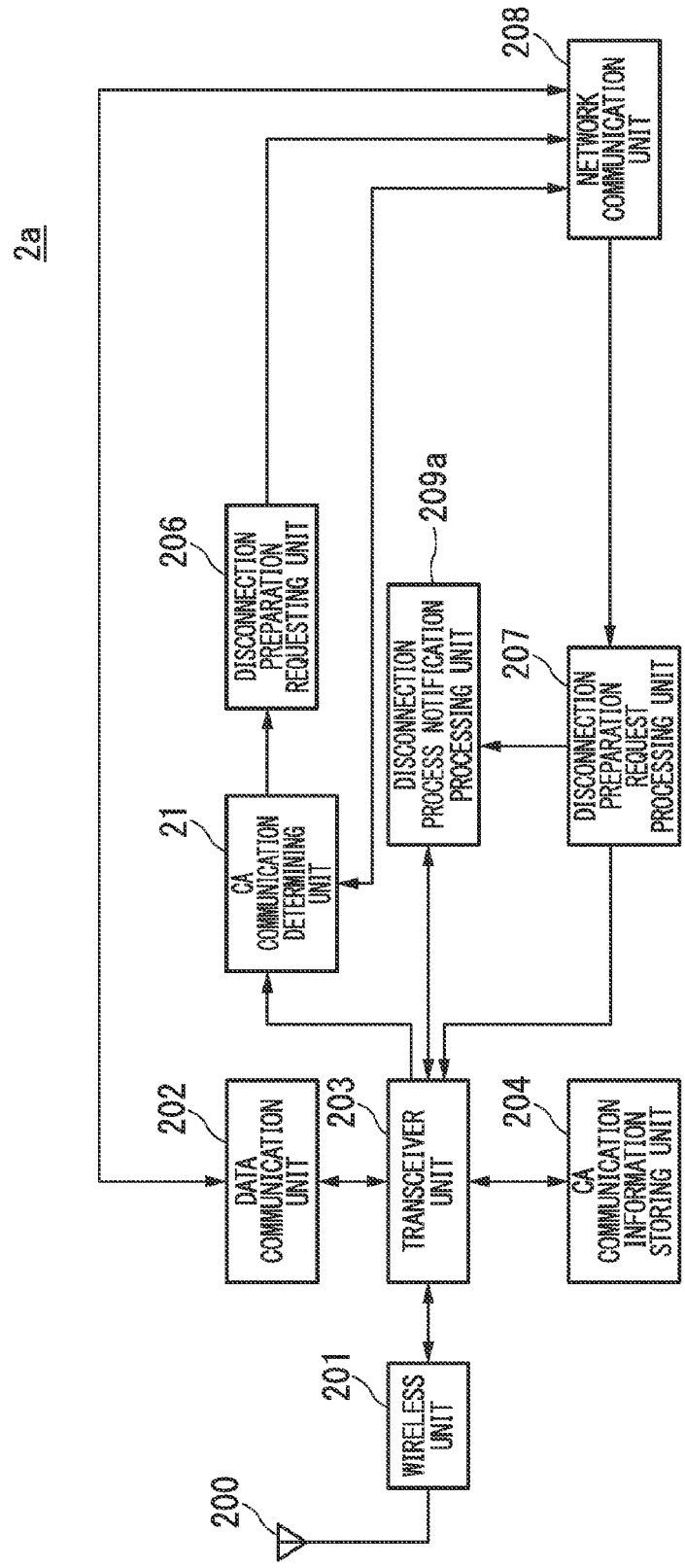
FIG. 11 is a schematic block diagram showing an example of a configuration of a macrocell base station device according to a second embodiment.

FIG. 11 is a schematic block diagram showing an example of a configuration of the macrocell base station device 2a according to the second embodiment.

Comparing the macrocell base station device 2a and the macrocell base station device 2 of the first embodiment, there are differences in that the SCC disconnection requesting unit 205 is removed, and a disconnection process notification processing unit 209a is added. Other configurations are similar to those of the first embodiment, and therefore description thereof is omitted here.

Based on the disconnection process notification received from the mobile station device 1a, the disconnection process notification processing unit 209a determines that a notification to disconnect SCC has been made known to the mobile station device 1a and the HeNB base station device 3a. Then, the disconnection process notification processing unit 209a transmits a disconnection process ACK to the mobile station device 1a.

Figure 12:
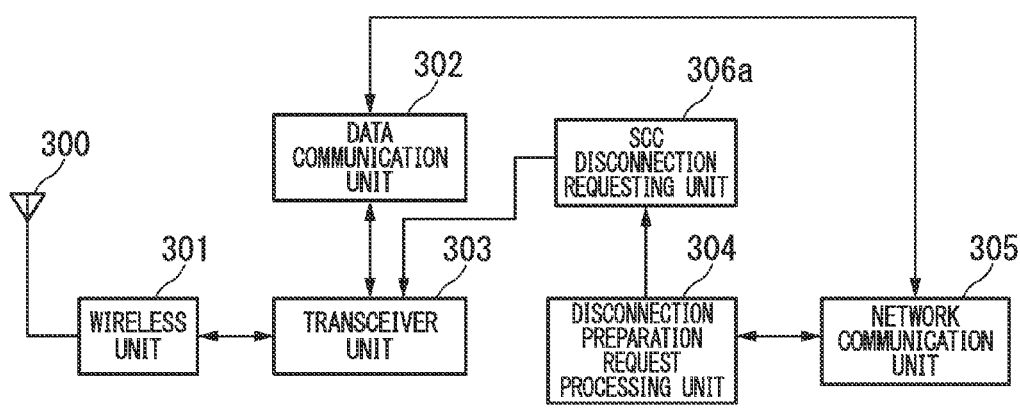
FIG. 12 is a schematic block diagram showing an example of a configuration of an HeNB base station device according to the second embodiment.

FIG. 12 is a schematic block diagram showing an example of a configuration of the HeNB base station device 3a according to the second embodiment.

Comparing the HeNB base station device 3a and the HeNB the base station device 3, an SCC disconnection requesting unit 306a is different. Other configurations are similar to those of the first embodiment, and therefore description thereof is omitted here.

Based on a disconnection preparation request received from the macrocell base station device 2a, the SCC disconnection requesting unit 306a performs preparation to disconnect SCC, and transmits an SCC disconnection request to the mobile station device 1a.

Figure 13:
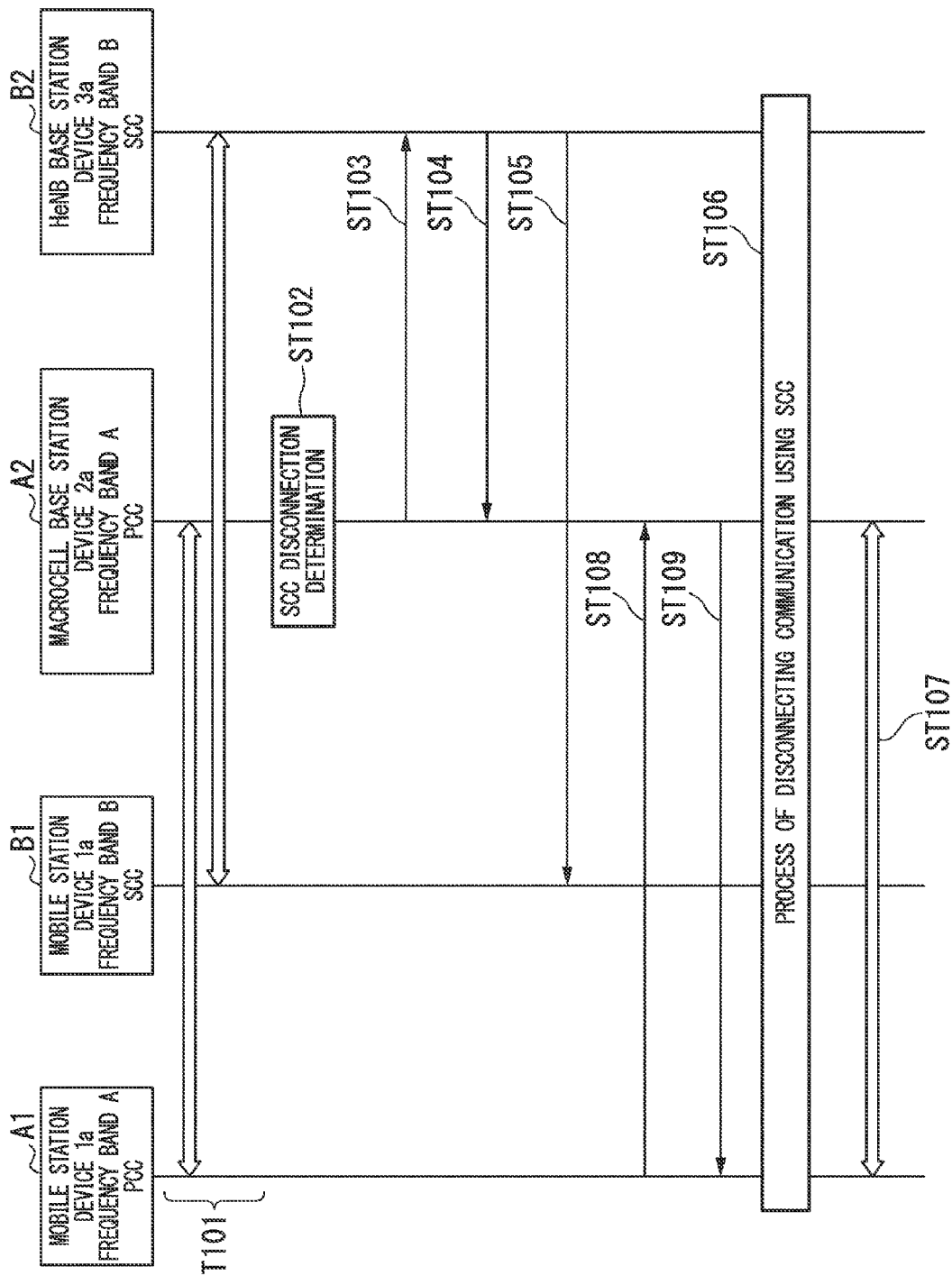
FIG. 13 is a sequence diagram illustrating an example of a component carrier disconnection process to be performed by the mobile station device and two base station devices according to the second embodiment.

FIG. 13 is a sequence diagram showing an example of a component carrier disconnection process performed by the mobile station device 1a and the two base station devices according to the second embodiment.

Communication between the macrocell base station device 2a and the HeNB base station device 3a is performed via the network communication units 208 and 305 of the respective base station devices, but description thereof is omitted hereinafter. Additionally, communication between the mobile station device 1a and the macrocell base station device 2a, and communication between the mobile station device 1a and the HeNB base station device 3a, are performed via the transceiver antennas 100, 200, and 300, the wireless units 101, 201, and 301, and the transceiver units 103, 203, and 303, but description thereof is omitted hereinafter.

The mobile station device 1a is performing CA communication using PCC (frequency band A) used for communication with the macrocell base station device 2a, and SCC (frequency band B) used for communication with the HeNB base station device 3a (step ST101).

The CA communication determining unit 21 of the macrocell base station device 2a determines to disconnect CA communication from a result of measurement of information regarding the traffic amount (step ST102).

When the CA communication determining unit 21 determines to disconnect the CA communication, the disconnection preparation requesting unit 206 of the macrocell base station device 2a transmits a disconnection preparation request to the HeNB base station device 3a (step ST103).

Upon receiving the disconnection preparation request from the macro base station device 2a, the disconnection preparation request processing unit 304 of the HeNB base station device 3a performs preparation to disconnect SCC, and transmits a disconnection preparation ACK to the macrocell base station device 2a (step ST104).

Upon receiving the disconnection preparation request from the macrocell base station device 2a, the SCC disconnection requesting unit 306a of the HeNB base station device 3a transmits an SCC disconnection request to the mobile station device 1a (step ST105).

Upon receiving the SCC disconnection request from the HeNB base station device 3a, the disconnection process notifying unit 115a of the mobile station device 1a performs a process of disconnecting SCC. The disconnection process notifying unit 115a of the mobile station device 1a generates an SCC disconnection process notification in order to have the macrocell base station device 2a perform the disconnection process. The disconnection process notifying unit 115a of the mobile station device 1a transmits the generated SCC disconnection process notification to the macrocell base station device 2a (step ST108).

Upon receiving the SCC disconnection process notification from the mobile station device 1a, the SCC disconnection process notification processing unit 209a of the macrocell base station device 2a transmits a disconnection process ACK to the mobile station device 1a (step ST109).

Upon receiving the disconnection process ACK from the macrocell base station device 2a, the disconnection process notifying unit 115a of the mobile station device 1a performs the process of disconnecting SCC, thus disconnecting the communication with the HeNB base station device 3a (step ST106).

The mobile station device 1a communicates with the macrocell base station device 2a (step ST107).

Thus, the wireless communication system according to the present embodiment includes the macrocell base station device 2a (first base station device), and the HeNB base station device 3a (second base station device), and the mobile station device 1a that communicates with the macrocell base station device 2a (first base station device) using a first component carrier (PCC) and communicating with the HeNB base station device 3a (second base station device) using a second component carrier (SCC), thus performing communication using the CA technology. The disconnection preparation requesting unit 206 of the macrocell base station device 2a (first base station device) transmits to the HeNB base station device 3a (second base station device), a disconnection preparation request that requests the HeNB base station device 3a (second base station device) to perform preparation to disconnect the second component carrier (SCC) from the component carriers used for the communication using the CA technology.

Upon receiving the disconnection preparation request for the second component carrier, which is transmitted from the macrocell base station device 2a, the HeNB base station device 3a transmits to the mobile station device 1a, a disconnection request that requests the mobile station device 1a to disconnect the second component carrier. In other words, based on the disconnection preparation request, the SCC disconnection requesting unit 306a transmits to the mobile station device 1a, a disconnection request that requests the mobile station device 1a to disconnect the second component carrier. Upon receiving the disconnection request for the second component carrier, which is transmitted from the HeNB base station device 3a, the mobile station device 1a transmits to the macrocell base station device 2a, a notification to disconnect the second component carrier. Upon receiving the disconnection request, the mobile station device 1a disconnects the second component carrier from the component carriers used for performing the communication using the CA technology.

Thus, it is possible to disconnect SCC in accordance with the traffic amount, thereby making it possible to provide an excellent communication speed for PCC.

Here, the description has been given in the present embodiment with respect to the case where the macrocell base station device 2a uses PCC as a main base station device, and the HeNB base station device 3a uses SCC. However, the HeNB base station device 3a may be configured to use PCC as a main base station device. Alternatively, a configuration may be such that another HeNB base station uses PCC as a main base station device, and the HeNB base station device 3a uses SCC. Additionally, a main base station device is assumed to manage a scheduling. As a modified example, however, the core network switch 4 may be configured to manage the scheduling.

Further, in the present embodiment, the expression "disconnect SCC" has been used, but an expression "deactivate SCC and monitor the SCC" may be used. Here, the "deactivate" means entering a state such that no data communication, and no transmission and reception of a control signal and the like, are performed. For example, reference signals (pilot symbols) of deactivated SCC are received periodically. When measurement of a reception quality of the CC is not performed, the power of the system of receiving SCC may be turned off. Here, even when deactivation is performed, it is not always necessary to perform monitoring.

Third Embodiment

Hereinafter, a third embodiment of the present invention will be described with reference to drawings.

An example of CA communication according to the third embodiment of the present invention is similar to that shown in FIGS. 2 and 3, and therefore description thereof is omitted here. Additionally, a wireless communication system S2 according to the present embodiment is similar to the wireless communication system S2 shown in FIG. 4, and therefore description thereof is omitted here. Further, a configuration of the mobile station device 1 of the present embodiment is similar to that of the mobile station device 1 of the first embodiment, and therefore description thereof is omitted here. The mobile station device 1 performs wireless communication with a macrocell base station device 2b and an HeNB base station device 3b.

Figure 14:
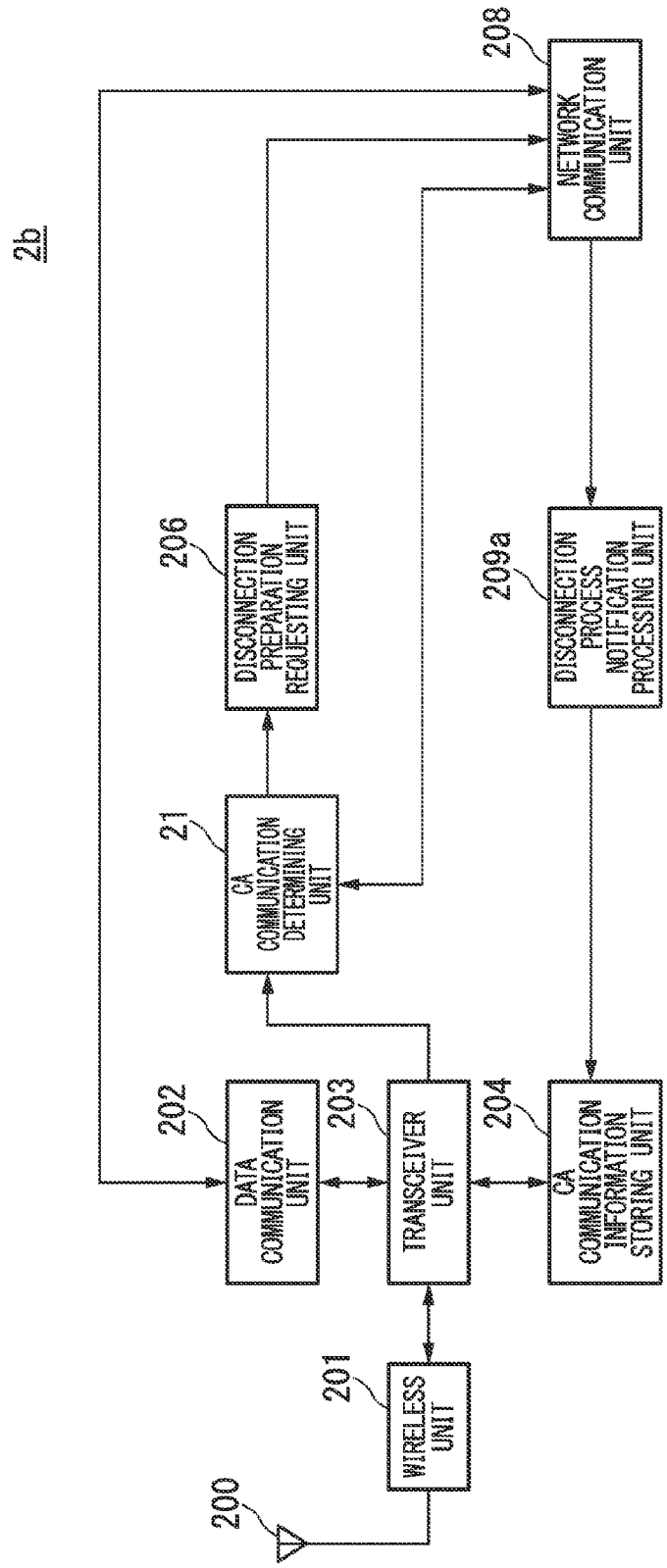
FIG. 14 is a schematic block diagram showing an example of a configuration of a macrocell base station device according to a third embodiment of the present invention.

FIG. 14 is a schematic block diagram showing an example of a configuration of the macrocell base station device 2b according to the third embodiment of the present invention.

Comparing the macrocell base station device 2b and the macrocell base station device 2a of the second embodiment, there is a difference in that the disconnection preparation request processing unit 207 is removed. Other configurations are similar to those of the macrocell base station device 2a of the second embodiment, and therefore description thereof is omitted here.

Figure 15:
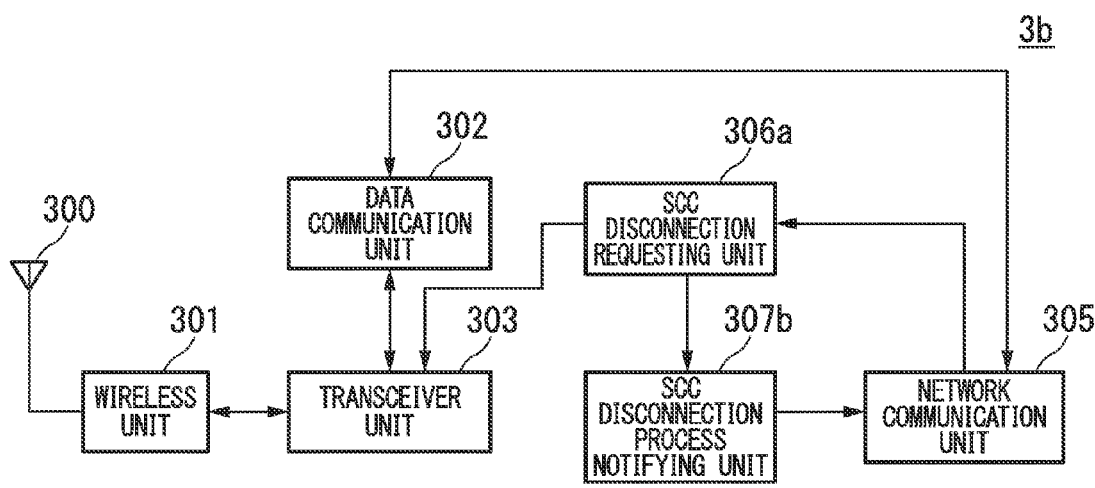
FIG. 15 is a schematic block diagram showing an example of a configuration of an HeNB base station device according to the third embodiment.

FIG. 15 is a schematic block diagram showing an example of a configuration of the HeNB base station device 3b according to the third embodiment.

Comparing the HeNB base station device 3b and the HeNB the base station device 3a of the second embodiment, there are differences in that the disconnection preparation request processing unit 304 is removed, and an SCC disconnection process notifying unit 307b is added. Other configurations are similar to those of the HeNB base station device 3a of the second embodiment, and therefore description thereof is omitted here.

Upon receiving a disconnection preparation request from the macrocell base station device 2b, the SCC disconnection process notifying unit 307b performs a process of disconnecting SCC. The SCC disconnection process notifying unit 307b generates an SCC disconnection process notification in order to notify the macrocell base station device 2b of the process of disconnecting SCC. The SCC disconnection process notifying unit 307b transmits the SCC disconnection process notification to the macrocell base station device 2b.

Figure 16:
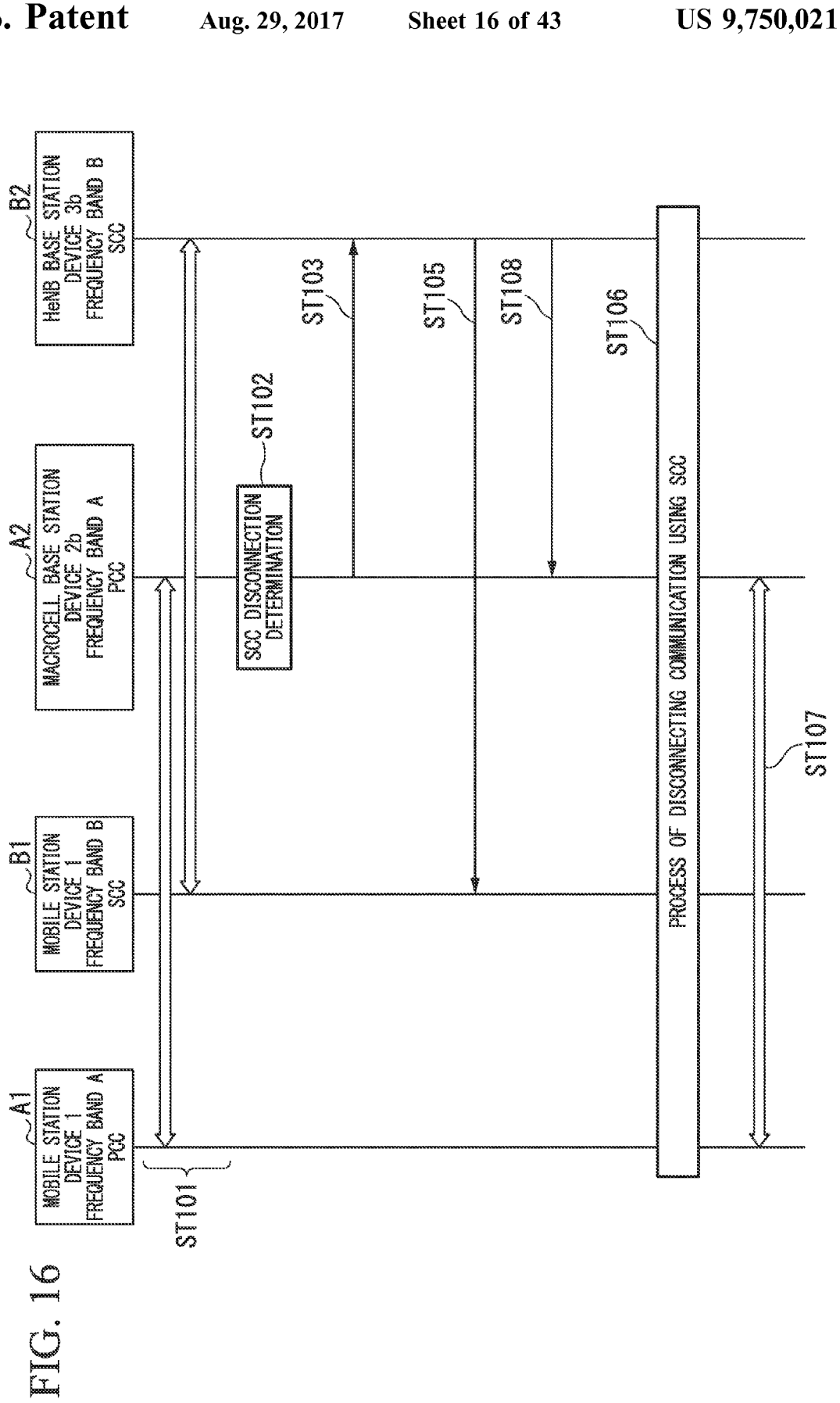
FIG. 16 is a sequence diagram illustrating an example of a component carrier disconnection process to be performed by the mobile station device and two base station devices according to the third embodiment.

FIG. 16 is a sequence diagram showing an example of a component carrier disconnection process performed by the mobile station device 1 and the two base station devices according to the third embodiment.

Communication between the macrocell base station device 2b and the HeNB base station device 3b is performed via the network communication units 208 and 305 of the respective base station devices, but description thereof is omitted hereinafter. Additionally, communication between the mobile station device 1 and the macrocell base station device 2b, and communication between the mobile station device 1 and the HeNB base station device 3b, are performed via the transceiver antennas 100, 200, and 300, the wireless units 101, 201, and 301, and the transceiver units 103, 203, and 303, but description thereof is omitted hereinafter.

The mobile station device 1 is performing CA communication using PCC (frequency band A) used for communication with the macrocell base station device 2b, and SCC (frequency band B) used for communication with the HeNB base station device 3b (step ST101).

The CA communication determining unit 21 of the macrocell base station device 2b determines to disconnect CA communication from a result of measurement of information regarding the traffic amount (step ST102).

The disconnection preparation requesting unit 206 of the macrocell base station device 2*b* transmits a disconnection preparation request to the HeNB base station device 3*b* (step ST103).

Upon receiving the disconnection preparation request from the macrocell base station device 2*b*, the SCC disconnection requesting unit 306*a* of the HeNB base station device 3*b* transmits an SCC disconnection request to the mobile station device 1 (step ST105).

Upon receiving the disconnection preparation request from the macrocell base station device 2*b*, and the SCC disconnection process notifying unit 307*b* of the HeNB base station device 3*b* transmits an SCC disconnection process notification to the macrocell base station device 2*b* (step ST108).

Upon receiving the SCC disconnection request from the HeNB base station device 3*b*, the SCC disconnection processing unit 105 of the mobile station device 1 disconnects the communication with the HeNB base station device 3*b* (step ST106).

The mobile station device 1 communicates with the macrocell base station device 2*b* (step ST107).

Thus, the wireless communication system according to the present embodiment includes the macrocell base station device 2*b*, the HeNB base station device 3*b*, and the mobile station device 1 that communicates with the macrocell base station device 2*b* and the HeNB base station device 3*b*. The mobile station device 1 is performing communication using the CA technology, using a first component carrier to be used to communicate with the macrocell base station device 2*b*, and a second component carrier to be used to communicate with the HeNB base station device 3*b*. The disconnection preparation requesting unit 206 transmits to the HeNB base station device 3*b*, a disconnection preparation request that requests the HeNB base station device 3*b* to prepare to disconnect the second component carrier from the component carriers used to perform the communication using the CA technology. Upon receiving the disconnection preparation request transmitted from the macrocell base station device 2*b*, the HeNB base station device 3*b* transmits to the macrocell base station device 2*b*, a notification to disconnect the second component carrier.

Upon receiving the disconnection preparation request for the second component carrier, which is transmitted from the macrocell base station device 2*b*, the HeNB base station device 3*b* transmits to the mobile station device 1, a disconnection request that requests the mobile station device 1 to disconnect the second component carrier. In other words, based on the disconnection preparation request, the SCC disconnection requesting unit 306*a* transmits to the mobile station device 1, a disconnection request that requests the mobile station device 1*a* to disconnect the second component carrier. Upon receiving the disconnection request, the mobile station device 1 disconnects the second component carrier from the component carriers used to perform the communication using the CA technology.

Thus, it is possible to disconnect SCC in accordance with the traffic amount, thereby making it possible to provide an excellent communication speed for PCC and to improve user convenience.

Here, the description has been given in the present embodiment with respect to the case where the macrocell base station device 2*b* uses PCC as a main base station device, and the HeNB base station device 3*b* uses SCC. However, the HeNB base station device 3*b* may be configured to use PCC as a main base station device. Alternatively, a configuration may be such that another HeNB base station device 3*b* uses PCC as a main base station device, and the HeNB base station device 3*b* uses SCC. Additionally, a main base station device is assumed to manage a scheduling. As a modified example, however, the core network switch 4 may be configured to manage the scheduling.

Further, in the present embodiment, the expression "disconnect SCC" has been used, but an expression "deactivate SCC and monitor the SCC" may be used. Here, the "deactivate" means entering a state such that no data communication, and no transmission and reception of a control signal and the like, are performed. For example, reference signals (pilot symbols) of deactivated SCC are received periodically. When measurement of a reception quality of the CC is not performed, the power of the system of receiving SCC may be turned off. Here, even when deactivation is performed, it is not always necessary to perform monitoring.

Fourth Embodiment

Hereinafter, a fourth embodiment of the present invention will be described in detail with reference to drawings.

An example of CA communication according to the fourth embodiment of the present invention is similar to that shown in FIGS. 2 and 3, and therefore description thereof is omitted here. Additionally, a wireless communication system S2 according to the present embodiment is similar to the wireless communication system S2 shown in FIG. 4, and therefore description thereof is omitted here. Further, a configuration of the mobile station device 1 according to the present embodiment is similar to that of the mobile station device 1 of the first embodiment, and therefore description thereof is omitted here.

The mobile station device 1 performs wireless communication with a macrocell base station device 2*c* and an HeNB base station device 3*c*.

Figure 17:
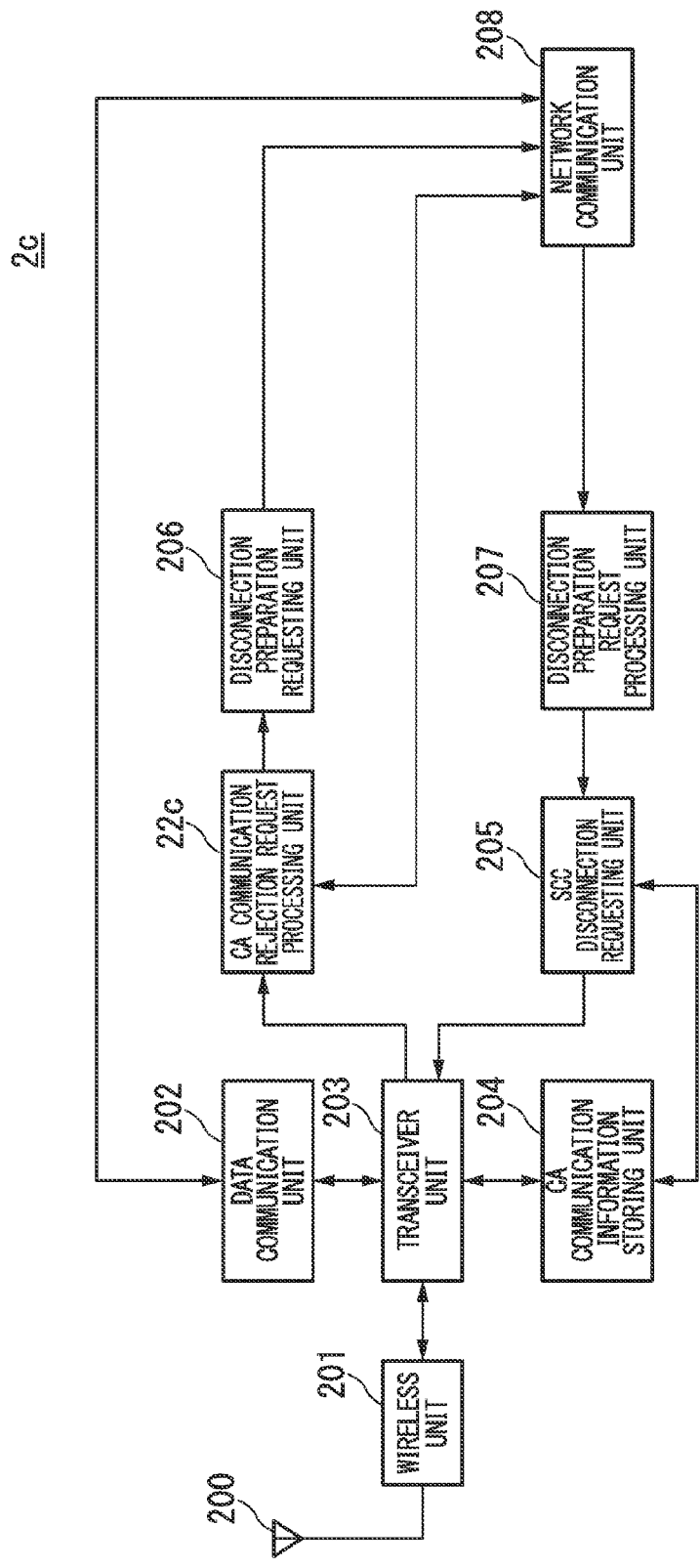
FIG. 17 is a schematic block diagram showing an example of a configuration of a macrocell base station device according to a fourth embodiment of the present invention.

FIG. 17 is a schematic block diagram showing an example of a configuration of the macrocell base station device 2*c* according to the fourth embodiment of the present invention.

Comparing the macrocell base station device 2*c* and the macrocell base station device 2 of the first embodiment, there are differences in that the CA communication determining unit 21 is removed, and a CA communication rejection request processing unit 22*c* is added. Other configurations are similar to those of the macrocell base station device 2 of the first embodiment, and therefore description thereof is omitted here.

Upon receiving a CA communication rejection request from the HeNB base communication station device 3*c*, the CA communication rejection request processing unit 22*c* accepts the CA communication rejection request, and outputs the CA communication rejection request to the disconnection preparation requesting unit 206.

Figure 18:
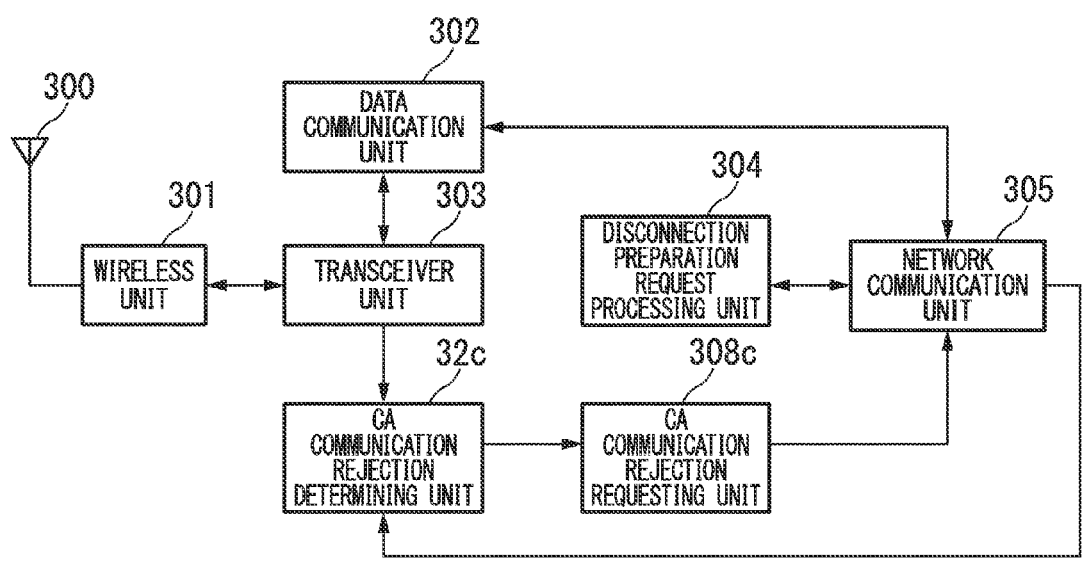
FIG. 18 is a schematic block diagram showing an example of a configuration of an HeNB base station device according to the fourth embodiment

FIG. 18 is a schematic block diagram showing an example of a configuration of the HeNB base station device 3*c* according to the fourth embodiment.

Comparing the HeNB base station device 3*c* and the HeNB the base station device 3 of the first embodiment, a CA communication rejection determining unit 32*c* and a CA communication rejection requesting unit 308*c* are different. Other configurations are similar to those of the HeNB base station device 3 of the first embodiment, and therefore description thereof is omitted here.

The CA communication rejection determining unit 32*c* measures communication environments, and determines based on a result of the measurement whether or not to reject the CA communication. The detailed description will be given later. The CA communication rejection determining unit 32c outputs to the CA communication rejection requesting unit 308c, the result of the determination of whether or not to reject the CA communication.

Upon receiving from the CA communication rejection determining unit 32c, the result of the determination of whether or not to reject the CA communication, the CA communication rejection requesting unit 308c generates a CA communication rejection request. The CA communication reject requesting unit 308c transmits the generated CA communication rejection request to the macrocell base station device 2c via the network communication unit 305.

Figure 19:
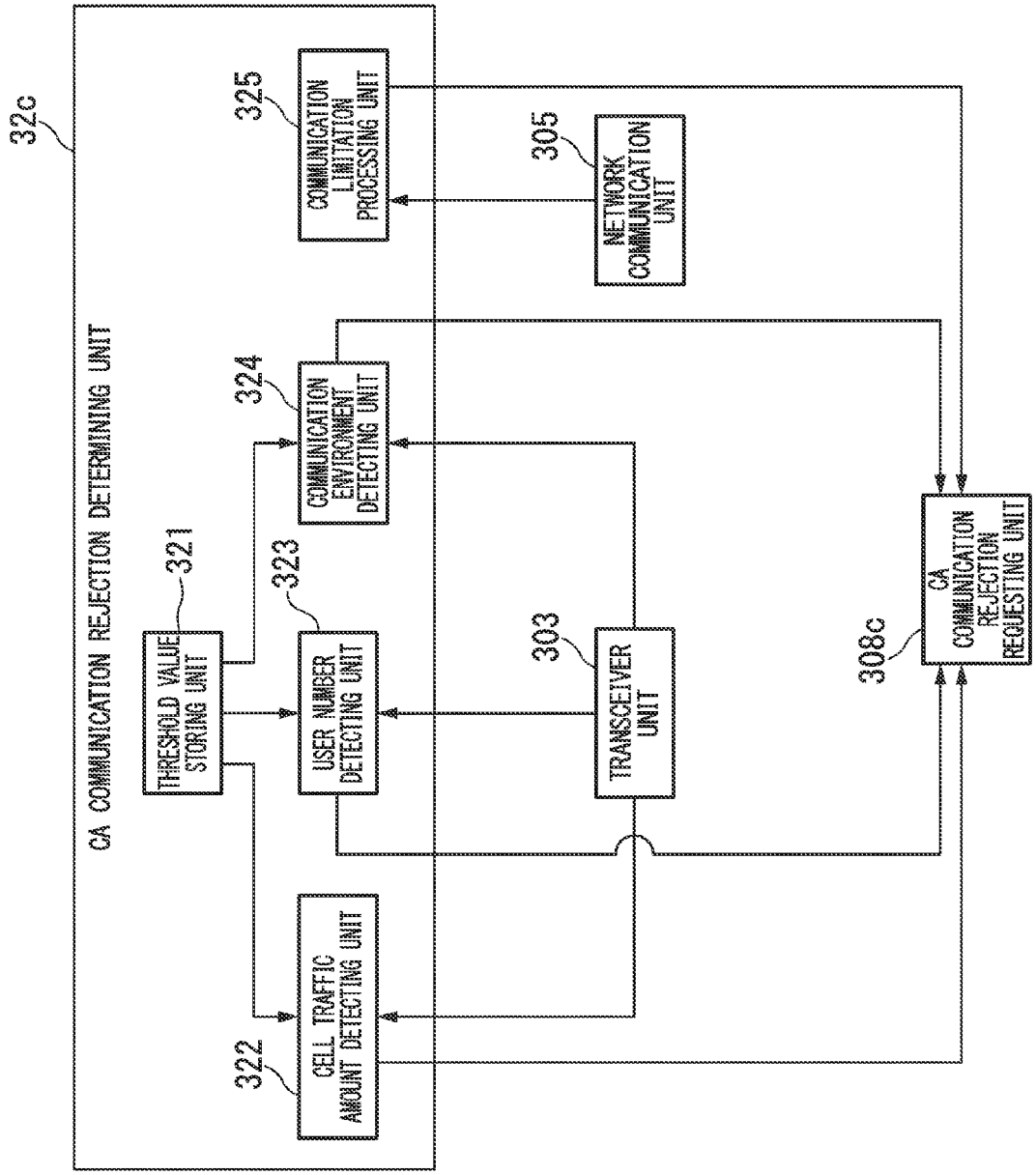
FIG. 19 is a schematic block diagram showing an example of a configuration of a carrier aggregation communication rejection determining unit according to the fourth embodiment.

FIG. 19 is a schematic block diagram showing an example of a configuration of a carrier aggregation communication rejection determination unit (CA communication rejection determining unit 32c) according to the fourth embodiment.

The CA communication rejection determining unit 32c is configured to include a threshold value storing unit 321, a cell traffic amount detecting unit 322, a user number detecting unit 323, a communication environment detecting unit 324, and a communication limitation processing unit 325.

The threshold value storing unit 321 stores a threshold value regarding the traffic amount of a cell, a threshold value regarding the number of users, and a threshold value regarding communication environment.

The cell traffic amount detecting unit 322 detects the traffic amount of the cell served by the HeNB base station device 3c. Then, the cell traffic amount detecting unit 322 determines whether or not the traffic amount of the cell served by the HeNB base station device 3c is equal to or greater than the threshold value. If the traffic amount of the cell served by the HeNB base station device 3c is equal to or greater than the threshold value, the cell traffic amount detecting unit 322 determines to reject the CA communication. The cell traffic amount detecting unit 322 outputs a result of the determination to the CA communication rejection requesting unit 308c.

The communication environment detecting unit 324 detects the wireless communication quality of SCC. Then, the communication environment detecting unit 324 determines whether or not the wireless communication quality of the SCC is equal to or less than a threshold value. Here, the wireless communication quality is communication quality to be evaluated based on a throughput, a bit error rate, a packet error rate, a communication speed, and the like. If the wireless communication quality of SCC is equal to or less than the threshold value, the communication environment detecting unit 324 determines to reject the CA communication. The communication environment detecting unit 324 outputs a result of the determination to the CA communication rejection requesting unit 308c.

If a communication failure of the HeNB base station device 3c or a communication limitation occurs, the communication limitation processing unit 325 determines to reject the CA communication. The communication limitation processing unit 325 outputs a result of the determination to the CA communication rejection requesting unit 308c.

Here, in the present embodiment, the CA communication is determined to be rejected in accordance with the result of determination based on at least one of the traffic amount of the cell, the number of users, the communication environment, and the communication limitation. However, other conditions may be added thereto.

Figure 20:
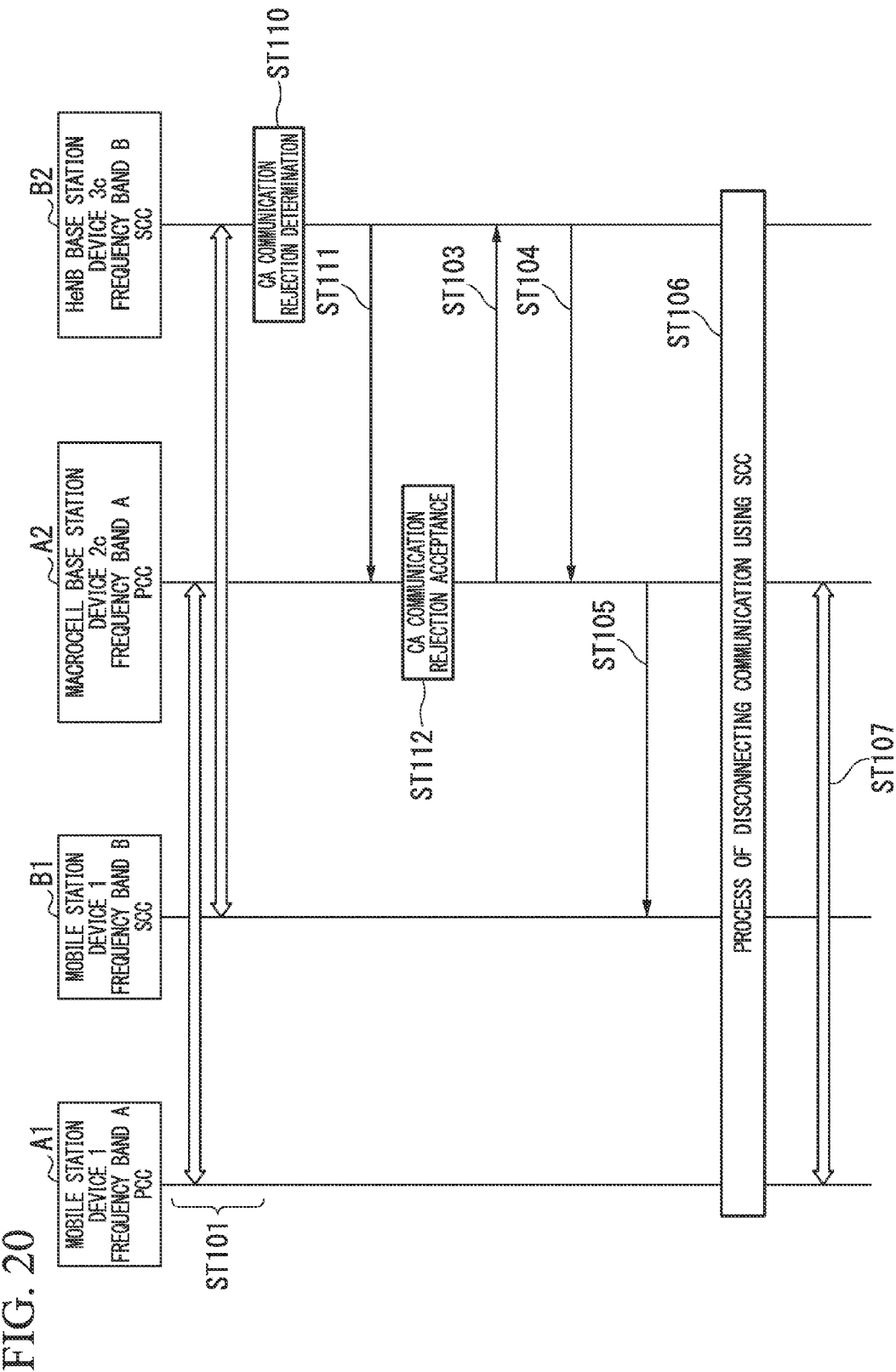
FIG. 20 is a sequence diagram illustrating an example of a component carrier disconnection process to be performed by the mobile station device and two base station devices according to the fourth embodiment.

FIG. 20 is a sequence diagram showing an example of a component carrier disconnection process performed by the mobile station device 1 and the two base station devices according to the fourth embodiment.

Communication between the macrocell base station device 2c and the HeNB base station device 3c is performed via the network communication units 208 and 305 of the respective base station devices, but description thereof is omitted hereinafter. Additionally, communication between the mobile station device 1 and the macrocell base station device 2c, and communication between the mobile station device 1 and the HeNB base station device 3c, are performed via the transceiver antennas 100, 200, and 300, the wireless units 101, 201, and 301, and the transceiver units 103, 203, and 303, but description thereof is omitted hereinafter.

The mobile station device 1 is performing CA communication using PCC (frequency band A) used to communicate with the macrocell base station device 2c, and SCC (frequency band B) used to communicate with the HeNB base station device 3c (step ST101).

The CA communication rejection determining unit 32c of the HeNB base station device 3c determines to reject the CA communication from a result of the determination based on the information, such as the traffic amount of the cell, the number of users, a communication environment, and a communication limitation (step ST110).

If the CA communication rejection determining unit 32c determines to reject the CA communication in step ST110, the CA communication rejection requesting unit 308c of HeNB base station device 3c transmits a CA communication rejection request to the macrocell base station device 2c (step ST111).

Upon receiving the CA communication rejection request from the HeNB communication base station 3c (step ST112), and the macrocell base station device 2c transmits a disconnection preparation request to the HeNB base station device 3c (step ST103).

Upon receiving the disconnection preparation request from the macro base station device 2c, the disconnection preparation request processing unit 304 of the HeNB base station device 3c transmits a disconnection preparation ACK to the macrocell base station device 2c (step ST104).

Based on the disconnection preparation ACK received from the HeNB base station device 3c, the SCC disconnection requesting unit 205 of the macrocell base station device 2c transmits an SCC disconnection request to the mobile station device 1 (step ST105).

Upon receiving the disconnection request from the macrocell base station device 2c, the SCC disconnection processing unit 105 of the mobile station device 1 performs a process of disconnecting SCC and disconnects communication with the HeNB base station device 3c (step ST106).

The mobile station device 1 performs communication with the macrocell base station device 2c (step ST107).

Thus, the wireless communication system according to the present embodiment includes the macrocell base station device 2c, the HeNB the base station device 3c, and the mobile station device 1 that communicates with the macrocell base station device 2c and the HeNB the base station device 3c. Communication using the CA technology is being performed using a first component carrier used for the mobile station device 1 to communicate with the macrocell base station device 2c, and a second component carrier used for the mobile station device 1 to communicate with the HeNB base station device 3c. Based on a result of the measurement of communication environments, the CA communication rejection determining unit 32c of the HeNB base station device 3c determines to disconnect the second component carrier from the component carriers used for the communication using the CA technology. Based on the result of the determination performed by the CA communication rejection determining unit 32c, the CA communication rejection requesting unit 308c transmits a CA communication rejection request to the macrocell base station device 2c.

Upon receiving the CA communication rejection request from the CA communication rejection requesting unit 308c, the disconnection preparation requesting unit 206 of the macrocell base station device 2c transmits a disconnection preparation request to the HeNB base station device 3c. The disconnection preparation requesting unit 206 of the macrocell base station device 2c transmits to the HeNB base station device 3c, a disconnection preparation request that requests the HeNB base station device 3c to prepare to disconnect the second component carrier from the component carriers used for the communication using the CA technology.

Upon receiving the disconnection preparation ACK, the SCC disconnection requesting unit 205 transmits to the mobile station device 1, a disconnection request that requests the mobile station device 1 to disconnect the second component carrier. Upon receiving the disconnection request, the mobile station device 1 disconnects the second component carrier from the component carriers used for performing the communication using the CA technology.

Thus, it is possible to disconnect SCC in accordance with the traffic amount, thereby making it possible to provide an excellent communication speed for PCC.

Here, the description has been given in the present embodiment with respect to the case where the macrocell base station device 2c uses PCC as a main base station device, and the HeNB base station device 3c uses SCC. However, the HeNB base station device 3c may be configured to use PCC as a main base station device. Alternatively, a configuration may be such that another HeNB base station 3c uses PCC as a main base station device, and the HeNB base station device 3c uses SCC. Additionally, a main base station device is assumed to manage a scheduling. As a modified example, however, the core network switch 4 may be configured to manage the scheduling.

Further, in the present embodiment, the expression "disconnect SCC" has been used, but an expression "deactivate SCC and monitor the SCC" may be used. Here, the "deactivate" means entering a state such that no data communication, and no transmission and reception of a control signal and the like, are performed. For example, reference signals (pilot symbols) of deactivated SCC are received periodically. When measurement of a reception quality of the CC is not performed, the power of the system of receiving SCC may be turned off. Here, even when deactivation is performed, it is not always necessary to perform monitoring.

Additionally, similar to the second embodiment and the third embodiment, a disconnection request addressed to the mobile station device 1 may be transmitted from the HeNB base station device 3c.

Fifth Embodiment

Hereinafter, a fifth embodiment of the present invention will be described in details with reference to drawings.

Figure 21:
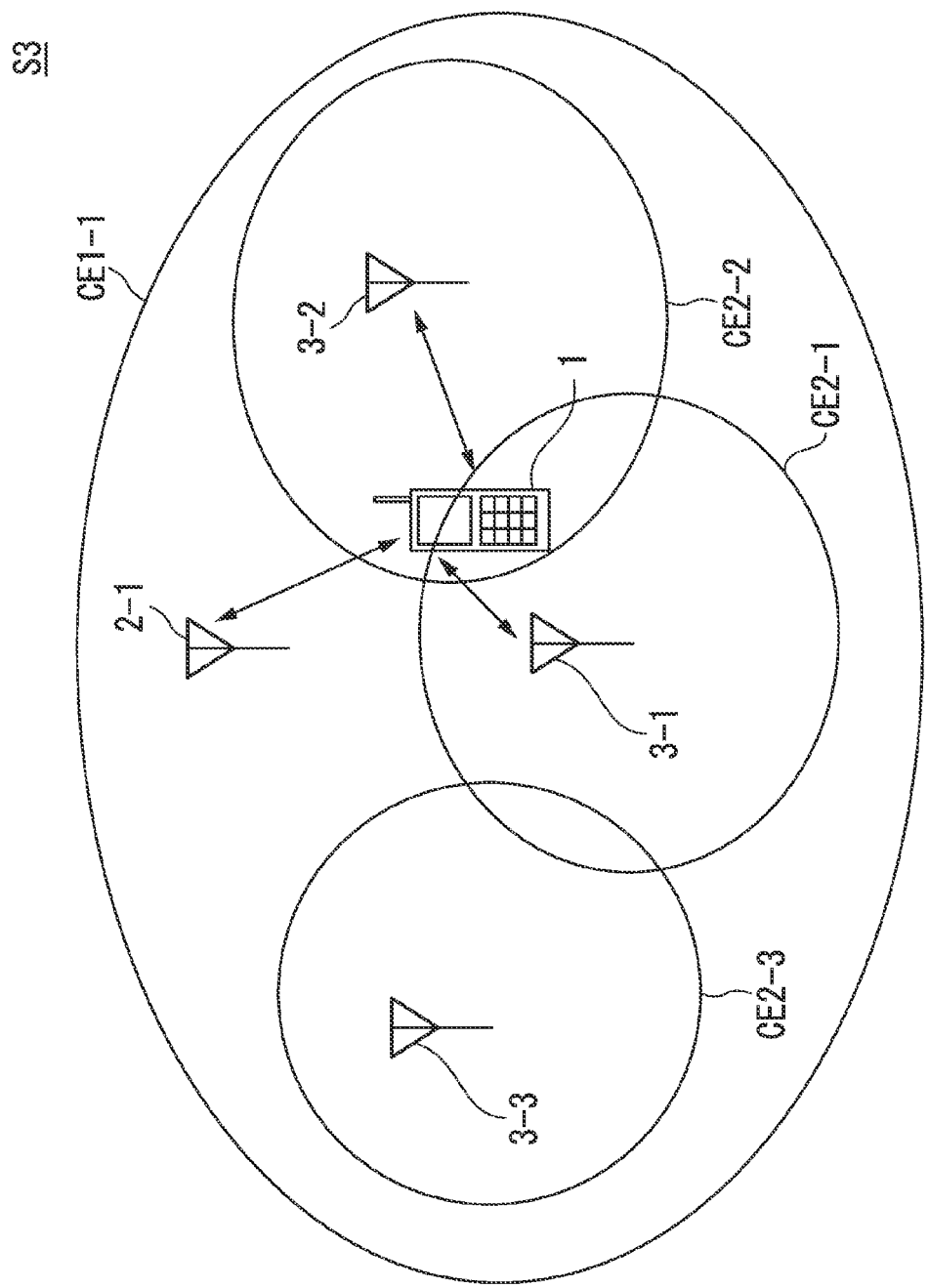
FIG. 21 is a schematic diagram showing an example of a configuration of a wireless communication system according to a fifth embodiment and a fifth embodiment of the present invention.

FIG. 21 is a schematic diagram showing an example of a configuration of a wireless communication system S3 according to the fifth embodiment and a sixth embodiment of the present invention.

The wireless communication system S3 includes the mobile station device 1, the macrocell base station device 2-1, the HeNB base station device 3-1, the HeNB base station device 3-2 (third base station device), and the HeNB base station device 3-3.

The macrocell base station device 2-1 serves the cell CE1-1 as a communication coverage. The HeNB base station device 3-1, the HeNB base station device 3-2, and the HeNB base station device 3-3 respectively serve a cell CE2-1, a cell CE2-2, and a cell CE2-3 as communication coverages. The cells CE2-1, CE2-2, and CE2-3 are included in the communication coverage of the cell CE1-1.

The macrocell base station device 2-1, the HeNB base station device 3-1, and the HeNB base station device 3-2 communicate with the mobile station device 1, each using a single frequency band (CC). The mobile station device 1 is performing communication using the carrier aggregation (CA) technology, using PCC (first CC) for the macrocell base station device 2-1, SCC (second CC) for the HeNB base station device 3-1, and SCC (third CC) for the HeNB base station device 3-2. Description will be given assuming that the mobile station device 1 performs communication using the CA technology, using the PCC and the two SCCs.

Figure 22:
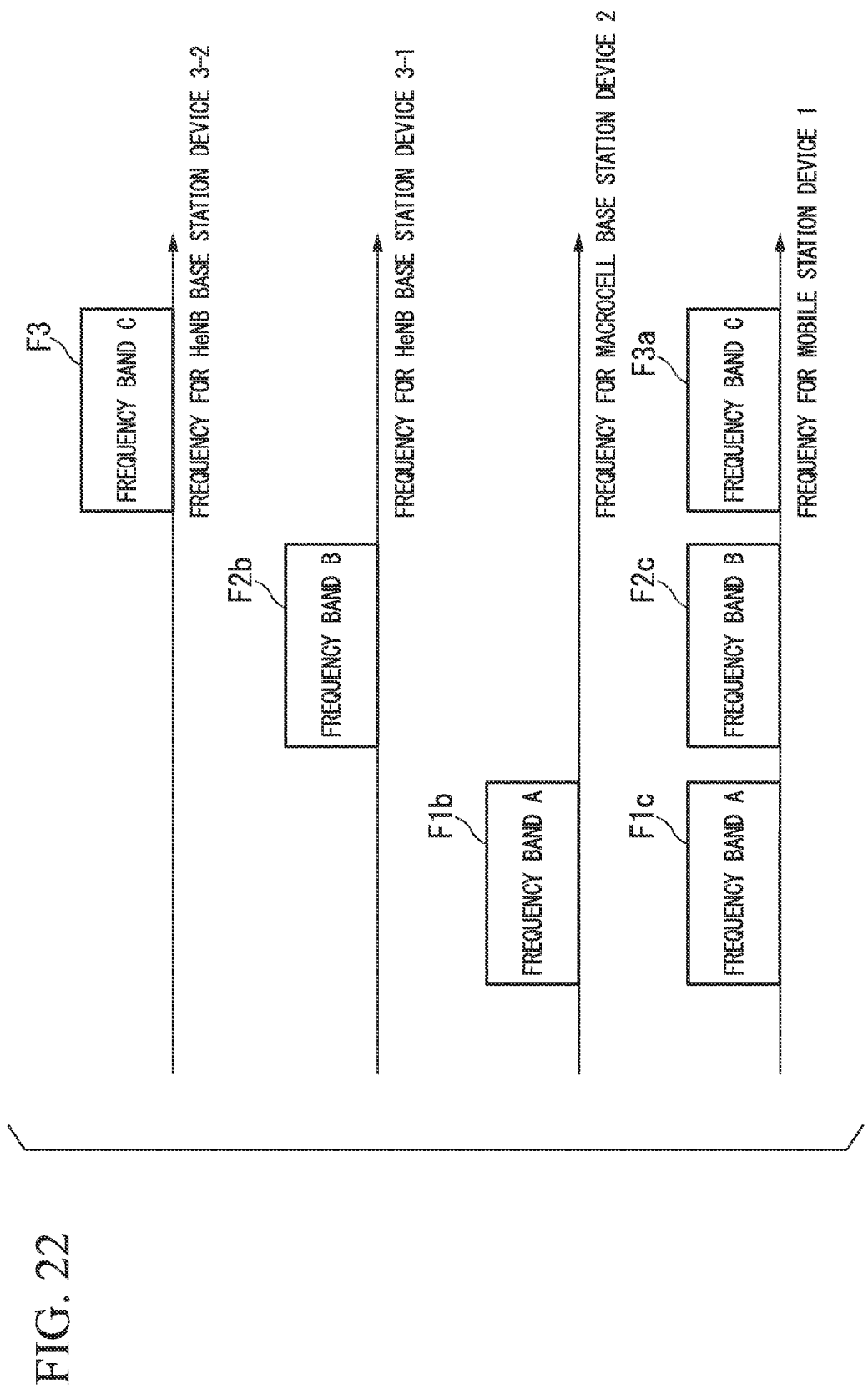
FIG. 22 is a schematic diagram showing an example of communication using the carrier aggregation technology according to a fifth embodiment of the present invention.

FIG. 22 is a schematic diagram showing an example of communication using the carrier aggregation technology according to the fifth embodiment of the present invention.

In FIG. 22, the mobile station device 1 is performing communication using the carrier aggregation (CA) technology, using the CC for the macrocell base station device 2, the CC for the HeNB base station device 3-1, and the CC for the HeNB base station device 3-2. The mobile station device 1 is communicating with the macrocell base station device 2, the HeNB base station device 3-1, and the HeNB base station device 3-2, using frequency bands F1c, F2c, and F3a. The macrocell base station device 2 is communicating with the mobile station device 1 using the frequency band F1b. The HeNB base station device 3-1 is communicating with the mobile station device 1, using the frequency band F2b. The HeNB base station device 3-2 is communicating with the mobile station device 1, using the frequency band F3.

The frequency bands F1b and F1c are the same frequency band. The frequency bands F2b and F2c are the same frequency band. The frequency bands F3 and F3a are the same frequency band. Here, the mobile station device 1 uses the frequency band F1c as the PCC, uses the frequency band F2c as the SCC, and uses the frequency band F3c as the SCC, to perform the CA communication.

Figure 23:
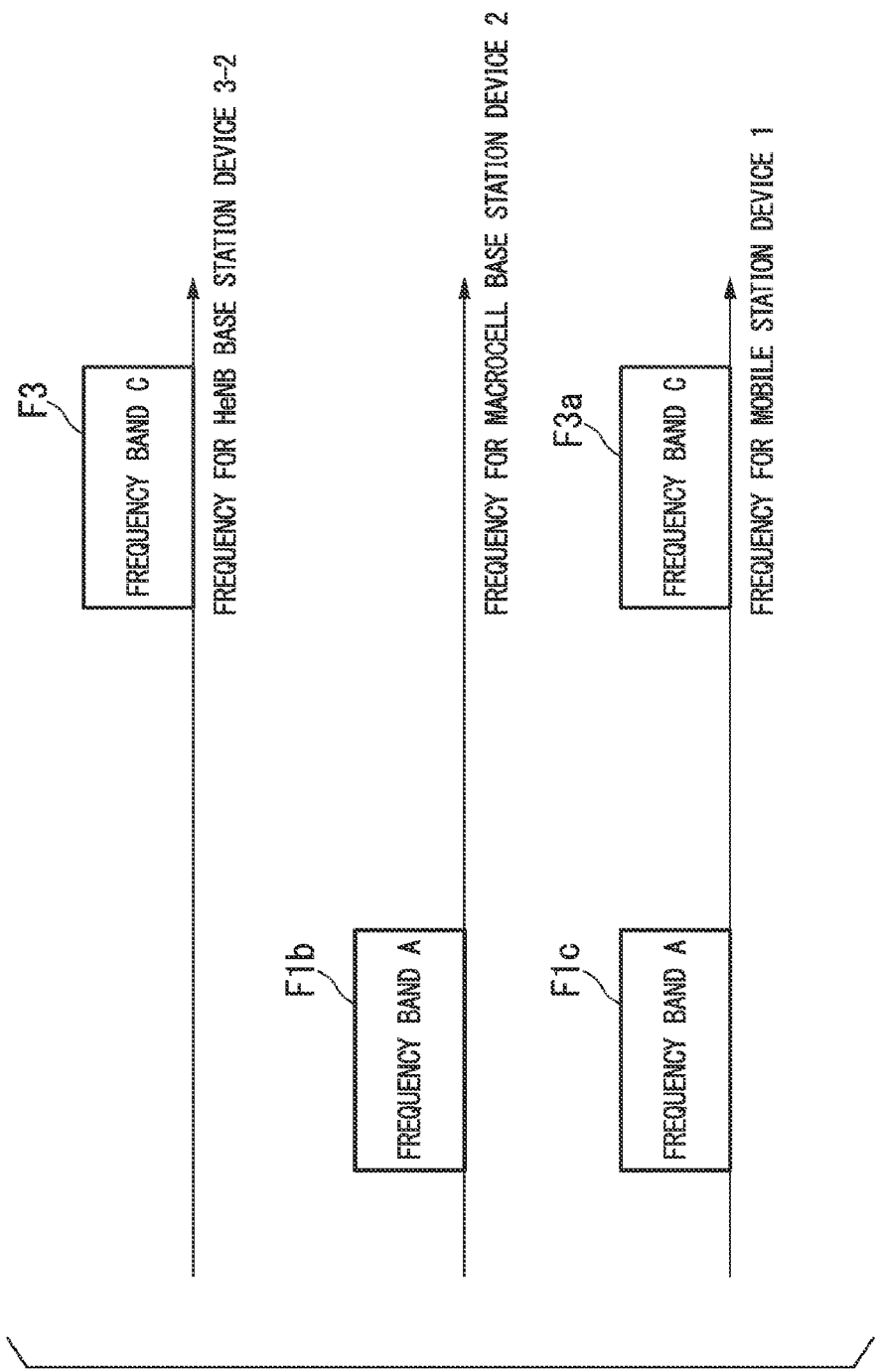
FIG. 23 is a schematic diagram showing an example of a process of disconnecting component carriers to be used for communication using the carrier aggregation according to the fifth embodiment.

FIG. 23 is a schematic diagram showing an example of a process of disconnecting a component carrier used for the communication using the carrier aggregation technology according to the fifth embodiment.

For example, FIG. 23 shows an example of a case where the mobile station device 1 performs an SCC disconnection process in response to an SCC disconnection request transmitted from the macrocell base station device 2 shown in FIG. 22 to the mobile station device 1.

In FIG. 22, the mobile station device 1 communicates with the macrocell base station device 2, the HeNB base station device 3-1, and the HeNB base station device 3-2. Here, with respect to the macrocell base station device 2, the mobile station device 1 performs the SCC disconnection process for the frequency band F2c for the HeNB base station device 3-1. The macrocell base station device 2 transmits an SCC disconnection request to the mobile station device 1. Based on the SCC disconnection request, the mobile station device 1 performs the disconnection process, thereby disconnecting the SCC. Thus, the mobile station device 1 performs the CA communicate, using PCC (frequency band F1c) for the macrocell base station device 2 and SCC (frequency band F3a) for the HeNB base station device 3-2, as shown in FIG. 23.

A configuration of the mobile station device 1 according to the fifth embodiment is similar to that of the mobile station device 1 of the first embodiment, and therefore description thereof is omitted here.

Figure 24:
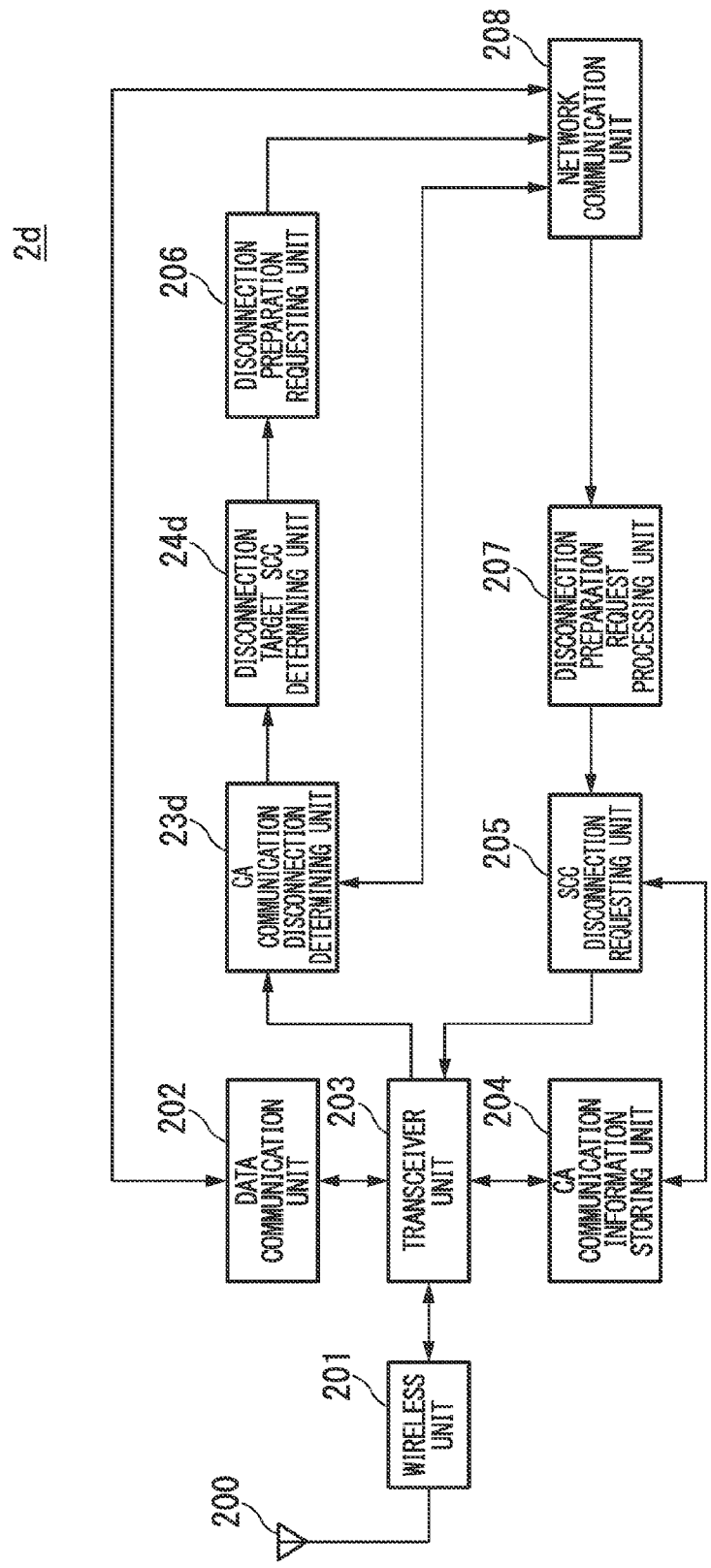
FIG. 24 is a schematic block diagram showing an example of a configuration of a macrocell base station device according to a fifth embodiment.

FIG. 24 is a schematic block diagram showing an example of a configuration of the macrocell base station device 2d according to the fifth embodiment.

Comparing the macrocell base station device 2d and the macrocell base station device 2c of the fourth embodiment, there are differences in that the CA communication rejection request processing unit 22c is removed, and a CA communication disconnection determining unit 23d and a disconnection-target SCC determining unit 24d are added. Other configurations are the same as those of the macrocell base station device 2c of the fourth embodiment, and therefore description thereof is omitted here.

For example, the CA communication determining unit 23d measures the amount of traffic between the mobile station device 1 and the macrocell base station device 2d, and the amount of traffic between the mobile station device 1 and the HeNB base station device 3. The CA communication disconnection determining unit 23d determines whether or not the measured traffic amount is equal to or less than a threshold value. If the measured traffic amount is equal to or less than a threshold value, the CA communication disconnection determining unit 23d determines to disconnect the CA communication. The CA communication disconnection determining unit 23d outputs to the disconnection-target SCC determining unit 24d, the determination to disconnect the CA communication. The detailed operation of the CA communication disconnection determining unit 23d will be described later.

Upon receiving the determination to disconnect the CA communication from the CA communication disconnection determining unit 23d, the disconnection-target SCC determining unit 24d determines which SCC to disconnect. For example, the determination of SCC to be disconnected is performed by comparing the wireless communication quality of the HeNB the base station device 3-1 and the wireless communication quality of the HeNB base station device 3-2, and determining SCC with the lower wireless communication quality to be disconnected. The disconnection-target SCC determining unit 24d has the disconnection preparation requesting unit 206 generate a disconnection preparation request with respect to the SCC determined to be disconnected.

Figure 25:
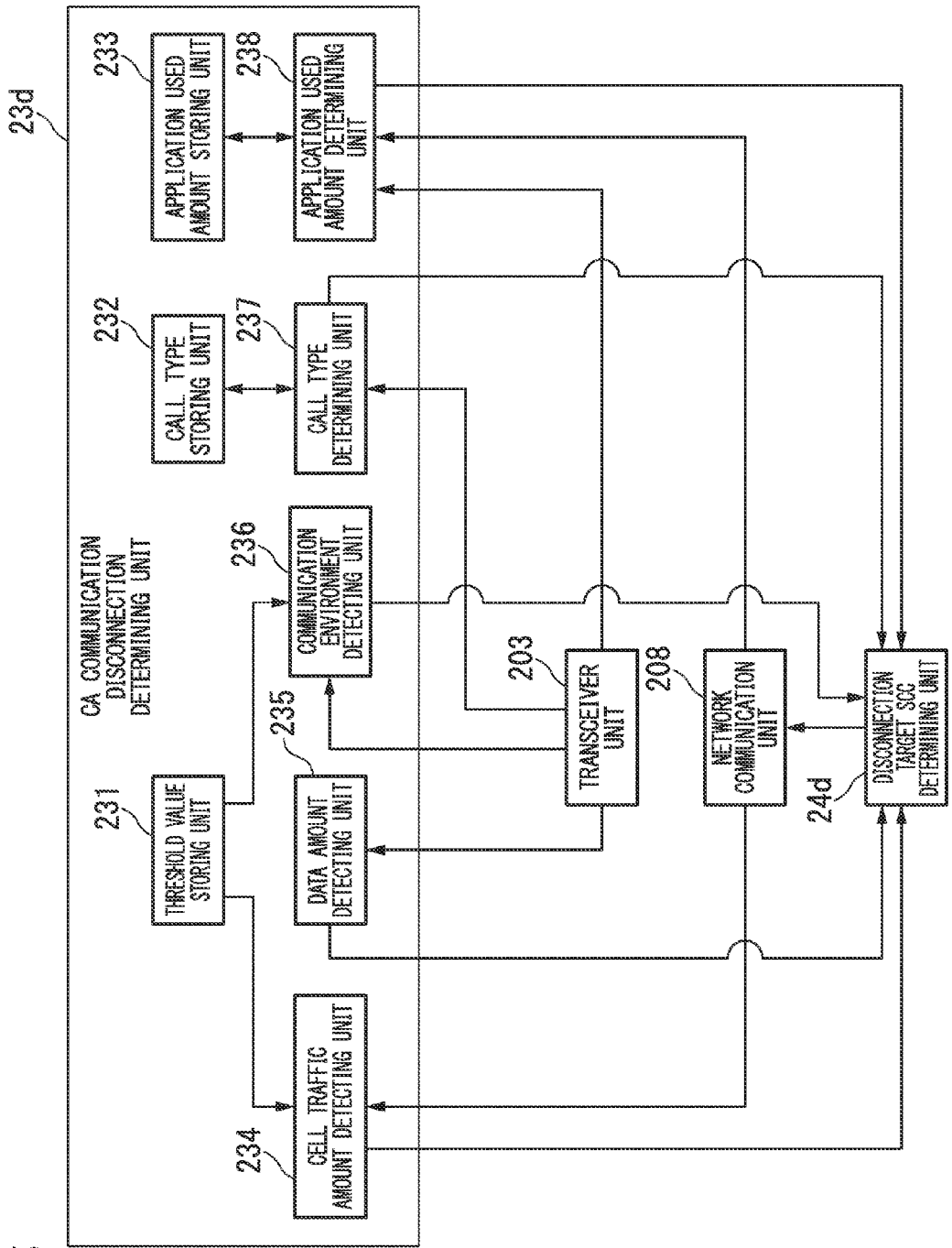
FIG. 25 is a schematic block diagram showing an example of a configuration of a carrier aggregation communication disconnection determining unit according to the fifth embodiment.

FIG. 25 is a schematic block diagram showing an example of a configuration of a carrier aggregation communication disconnection determining unit (CA communication disconnection determining unit 23d) according to the fifth embodiment.

The CA communication disconnection determining unit 23d is configured to include a threshold value storing unit 231, a call type storing unit 232, an application used amount storing unit 233, a cell traffic amount detecting unit 234, a data amount detecting unit 235, a communication environment detecting unit 236, a call type determining unit 237, and an application used amount determining unit 238.

The threshold value storing unit 231 stores a threshold value regarding the traffic amount of the cell served by the HeNB the base station device 3, a threshold value regarding the traffic amount of the cell served by the macrocell base station device 2d, a threshold value regarding the amount of downlink data to be transmitted to the mobile station device 1, a threshold value regarding the amount of uplink data to be transmitted from the mobile station device 1, and a threshold value regarding a communication quality of SCC used for communication between the mobile station device 1 and the HeNB base station device 3.

The call type storing unit 232 stores information regarding the call type. The application used amount storing unit 233 stores information regarding the amount of applications in use.

The cell traffic amount detecting unit 234 detects the traffic amount of the cell serviced by the HeNB base station device 3. Then, the cell traffic amount detecting unit 234 determines whether or not the traffic amount of the cell served by the HeNB base station device 3 is greater than or equal to the threshold value. If the traffic amount of the cell served by the HeNB base station device 3 is greater than or equal to the threshold value, that is, if the HeNB base station device 3 is in a busy state, the cell traffic detecting unit 234 determines to disconnect the CA communication.

The cell traffic detecting unit 234 detects the traffic amount of the cell served by the HeNB base station device 3. Then, the cell traffic amount detecting unit 234 determines whether or not the traffic amount of the cell served by the HeNB base station device 3 is greater than or equal to the threshold value. If the traffic amount of the cell served by the HeNB base station device 3 is greater than or equal to the threshold value, that is, if the HeNB base station device 3 is in a busy state, the cell traffic detecting unit 234 determines to disconnect the CA communication.

The cell traffic detecting unit 234 detects the traffic amount of the cell served by the macrocell base station device 2d. Then, the cell traffic detecting unit 234 determines whether or not the traffic amount of the cell served by the macrocell base station device 2d is equal to or less than the threshold value. If the traffic amount of the cell served by the macrocell base station device 2d is equal to or less than the threshold value, for example, if the macrocell base station device 2d is not in a busy state, the cell traffic detecting unit 234 determines to disconnect the CA communication.

The cell traffic amount detecting unit 234 outputs to the disconnection-target SCC determining unit 24d, a result of the determination regarding the traffic amount of the cell.

Here, the cell traffic amount detecting unit 234 determines to disconnect the CA communication in a case where the CA communication is determined to be disconnected in accordance with at least one of the result of the determination based on the traffic amount of the cell served by the HeNB base station device 3 and the result of the determination based on the traffic amount of the cell served by the macrocell base station device 2d.

The data amount detecting unit 235 detects the amount of downlink data to be transmitted to the mobile station device 1. Then, the data amount detecting unit 235 determines whether or not the detected amount of downlink data is equal to or less than a threshold value. If the amount of downlink data, for example, the amount of data addressed to the mobile station device 1 and stored in a buffer, is equal to or less than the threshold value, the data amount detecting unit 235 determines to disconnect the CA communication.

The data amount detecting unit 235 detects the amount of uplink data to be transmitted from the mobile station device 1. Then, the data amount detecting unit 235 determines whether or not the detected amount of uplink data to be transmitted from the mobile station device 1 is equal to or less than a threshold value. If the amount of uplink data to be transmitted from the mobile station device 1, for example, the amount of data to be transmitted from the mobile station device 1 and stored in a buffer of the mobile station device 1, is equal to or less than the threshold value, the data amount detecting unit 235 determines to disconnect the CA communication.

The data amount detecting unit 235 outputs to the disconnection-target SCC determining unit 24d, a result of the determination regarding the amount of data.

Here, the data amount detecting unit 215 determines to disconnect the CA communication in at least one of the case where the amount of downlink data is equal to or less than the threshold value, and the case where the amount of uplink data is equal to or less than the threshold value. For example, in a case where the amount of downlink data is equal to or greater than the threshold value, and the amount of uplink data is equal to or less than the threshold value, the data amount detecting unit 215 may determine to disconnect only the SCC used in the uplink.

The communication environment detecting unit 236 detects a wireless communication quality for each SCC. The communication environment detecting unit 236 determines whether or not the detected wireless communication quality for each SCC is equal to or less than the threshold value. If the wireless communication quality is equal to or less than the threshold value, the communication environment detecting unit 236 outputs to the disconnection-target SCC determining unit 24d, information regarding the detected wireless communication quality for each SCC.

The call type determining unit 237 detects a call type during communication, and determines whether or not to disconnect the CA communication in response to a change in call type during the communication. For example, if the call type is switched from the call type of the high volume to the call type of the small volume, the call type determining unit 237 determines to disconnect the CA communication. The call type determining unit 237 has the call type storing unit 232 store the detected call type. The call type determining unit 237 outputs a result of the determination to the disconnection-target SCC determining unit 24d.

The application used amount determining unit 238 detects the number of applications in use. Then, in accordance with the number of applications in use, the application used amount determining unit 238 determines whether or not to disconnect the CA communication. For example, in a case where one of a plurality of applications is suspended in use while the plurality of applications are simultaneously used, the application used amount determining unit 238 determines to disconnect the CA communication.

The application used amount determining unit 238 has the application used amount storing unit 233 store the detected number of applications. The application used amount determining unit 238 outputs a result of the determination to the disconnection-target SCC determining unit 24d.

Here, in the present embodiment, the CA communication is determined to be disconnected if at least one of the cell traffic amount detecting unit 234, the data amount detecting unit 235, the communication environment detecting unit 236, the call type determining unit 237, and the application used amount determining unit 238 determines to disconnect the CA communication. However, the CA communication may be determined to be disconnected based on other conditions, for example, information regarding communication environments, a wireless communication quality, a bit rate, or the like. Here, examples of the information regarding communication environments include information regarding a bit error rate or a packet error rate for each CC, a throughput, or the like. Additionally, although the expression "disconnect SCC (disconnect CA communication)" is used here, an expression "deactivate SCC" may be used.

Figure 26:
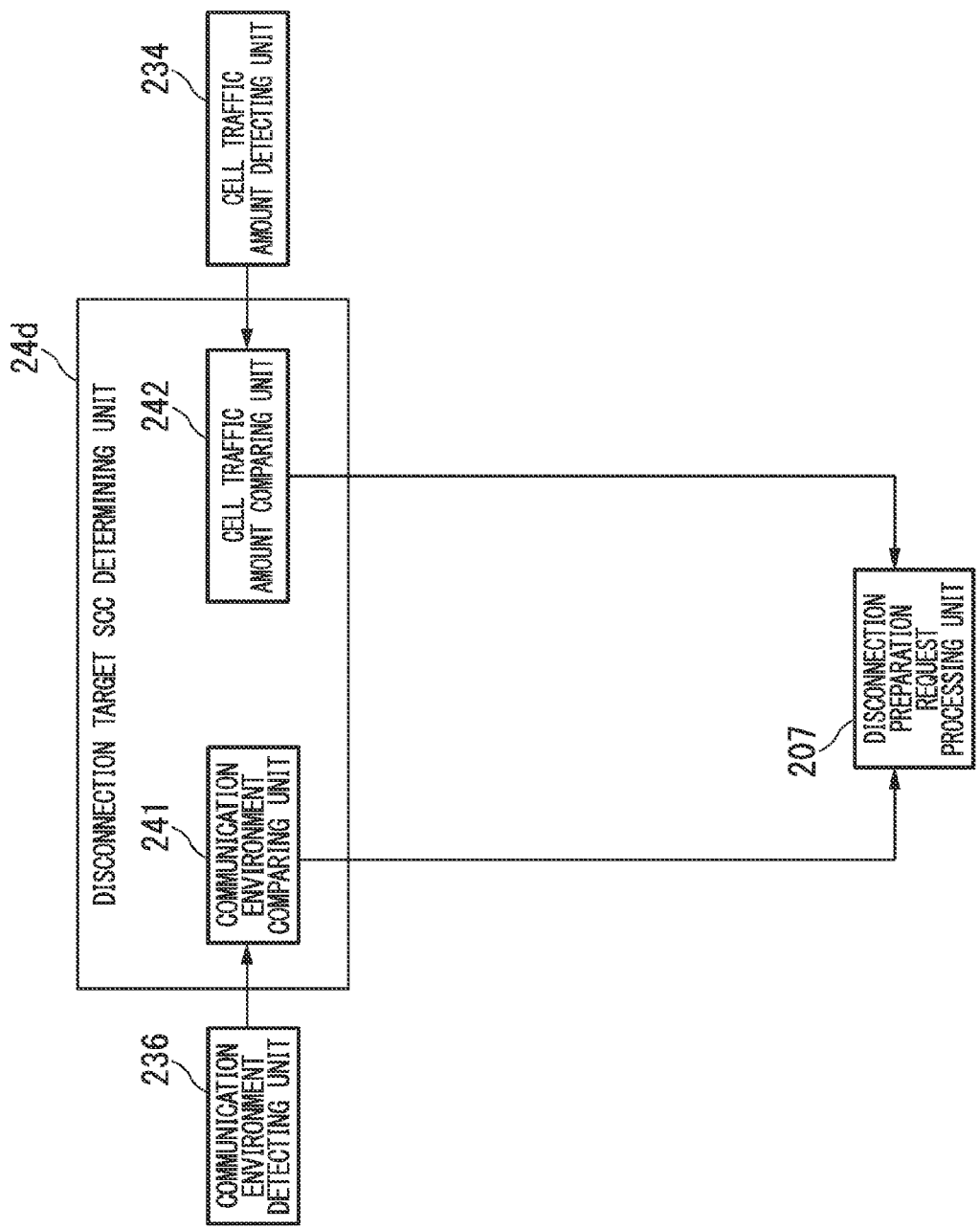
FIG. 26 is a schematic block diagram showing an example of a configuration of a disconnection target component carrier determining unit according to the fifth embodiment.

FIG. 26 is a schematic block diagram showing an example of a configuration of the disconnection-target component carrier determining unit (disconnection-target SCC determining unit 24d) according to the fifth embodiment.

The disconnection-target SCC determining unit 24d is configured to include a communication environment comparing unit 241 and a cell traffic amount comparing unit 242.

Based on the information regarding the wireless communication quality, which is received from the communication environment detecting unit 236, the communication environment comparing unit 241 compares the wireless communication quality for each SCC by, for example, using the bit error rate. As a result of comparing the wireless communication qualities, the communication environment comparing unit 241 determines to disconnect the SCC with the lower wireless communication quality, that is, for example, the SCC with the higher bit error rate. The communication environment comparing unit 241 outputs to the disconnection preparation request processing unit 207, information regarding the SCC determined to be disconnected.

Based on the result of the determination regarding the traffic amount of the cell, which is received from the cell traffic amount detecting unit 234, the cell traffic comparing unit 242 determines an SCC to be disconnected. The cell traffic comparing unit 242 compares the traffic amount of the cell for each SCC. Then, the cell traffic comparing unit 242 determines to be the SCC to be disconnected, SCC with high cell traffic, that is, SCC for the base station device in a busy state. The cell traffic amount comparing unit 242 outputs to the disconnection preparation request processing unit 207, information regarding the SCC determined to be disconnected.

A configuration of the HeNB the base station device 3 of the present embodiment is similar to that of the HeNB base station device 3 of the first embodiment, and therefore description thereof is omitted.

Figure 27:
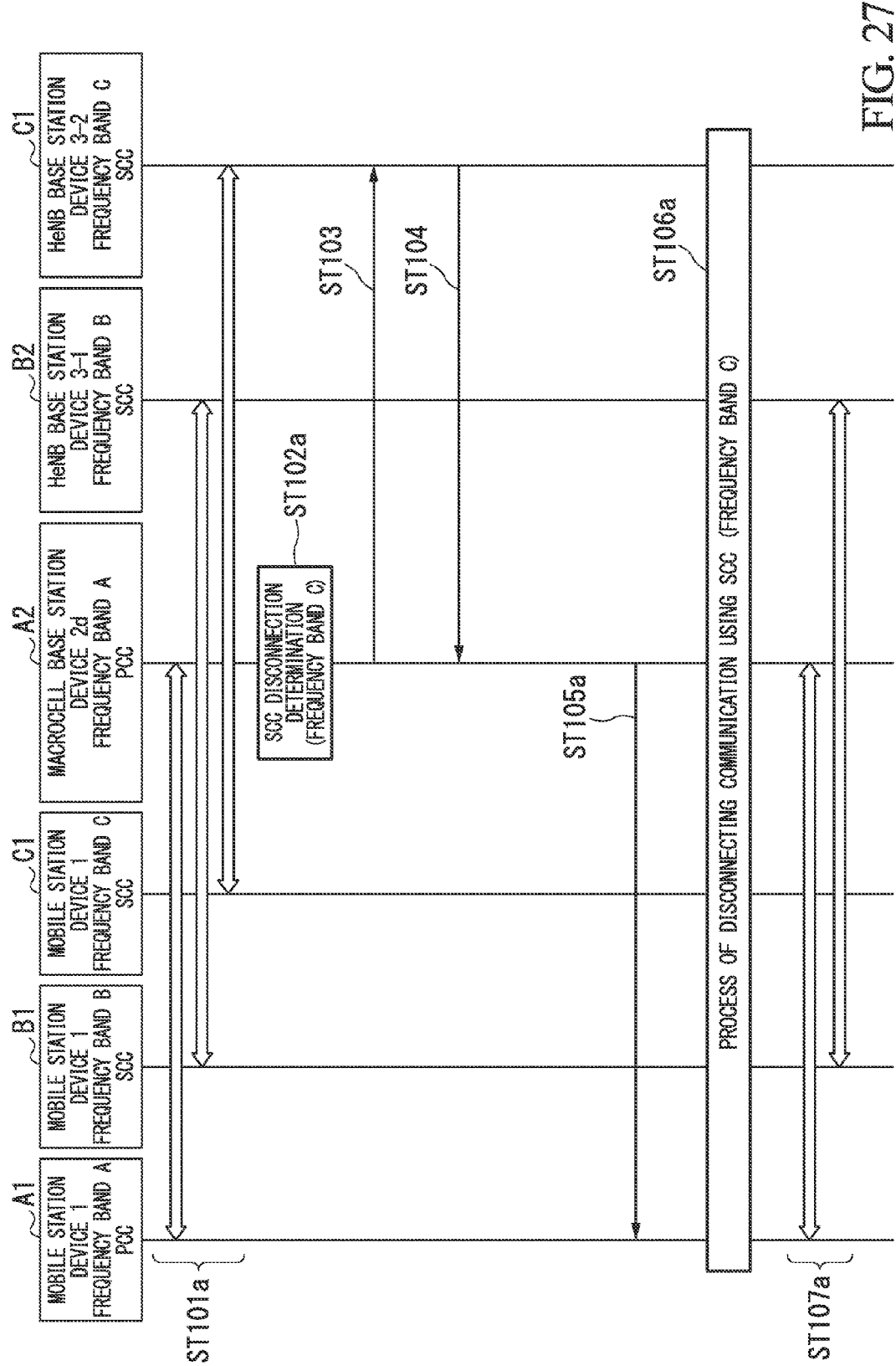
FIG. 27 is a sequence diagram illustrating an example of a component carrier disconnection process to be performed by the mobile station device and three base station devices according to the fifth embodiment.

FIG. 27 is a sequence diagram showing an example of a component carrier disconnection process performed by the mobile station device 1 and the three base station devices according to the fifth embodiment. Communication between the macrocell base station device 2d and the HeNB base station device 3 is performed via the network communication units 208 and 305 of the respective base station devices, but description thereof is omitted hereinafter. Additionally, communication between the mobile station device 1 and the macrocell base station device 2d, and communication between the mobile station device 1 and the HeNB base station device 3, are performed via the transceiver antennas 100, 200, and 300, the wireless units 101, 201, and 301, and the transceiver units 103, 203, and 303, but description thereof is omitted hereinafter.

The mobile station device 1 is performing CA communication using PCC (frequency band A) used to communicate with the macrocell base station device 2d, SCC (frequency band B) used to communicate with the HeNB base station device 3-1, and SCC (frequency band C) used to communicate with the HeNB base station device 3-2 (step ST101a).

The CA communication disconnection determining unit 23d of the macrocell base station device 2d determines to disconnect CA communication from a result of measurement of information regarding communication environments. The disconnection-target SCC determining unit 24d determines SCC to be disconnected. For example, The disconnection-target SCC determining unit 24d determines SCC (frequency band C) used to communicate with the HeNB base station device 3-2 (step ST102a).

When the disconnection-target SCC determining unit 24d determines to disconnect SCC (frequency band C) used to communicate with the HeNB base station device 3-2, the disconnection preparation requesting unit 206 of the macrocell base station device 2d transmits a disconnection preparation request to the HeNB base station device 3-2 (step ST103).

Upon receiving the disconnection preparation request from the disconnection preparation requesting unit 206 of the macrocell base station device 2d, the disconnection preparation request processing unit 304 of the HeNB base station device 3-2 performs preparation to disconnect SCC, and transmits a disconnection preparation ACK to the macrocell base station device 2d (step ST104).

Upon receiving the disconnection preparation ACK from the HeNB base station device 3-2, the SCC disconnection requesting unit 205 of the macrocell base station device 2d transmits an SCC disconnection request to the mobile station device 1 (step ST105a).

Upon receiving the disconnection request from the macrocell base station device 2d, the mobile station device 1 disconnects communication with the HeNB base station device 3-2 (step ST106a).

The mobile station device 1 performs CA communication using the PCC used to communicate with the macrocell base station device 2d, and the SCC used to communicate with the HeNB base station 3-1 (step ST107a).

Thus, the wireless communication system S3 according to the present embodiment includes the macrocell base station device 2d (first base station device), the HeNB base station device 3-1 (second base station device), the HeNB base station device 3-2 (third base station device), and the mobile station device 1 that communicates with those base station devices. The mobile station device 1 is performing communication using the CA technology, using a first component carrier (PCC) used to communicate with the macrocell base station device 2d (first base station device), a second component carrier (SCC) used to communicate with the HeNB base station device 3-1 (second base station device), and a third component carrier (SCC) used to communicate with the HeNB base station device 3-2 (third base station device). The communication environment detecting unit 236 detects environments of communication between the mobile station device 1 and each base station device. The disconnection-target SCC determining unit 24d determines a disconnection-target SCC based on a result of the detection performed by the communication environment detecting unit.

The macrocell base station device 2d (first base station device) transmits a disconnection preparation request to the HeNB base station device 3-2 (third base station device) using the disconnection-target SCC determined by the disconnection-target SCC determining unit 24d. In other words, the disconnection preparation requesting unit 206 of the macrocell base station device 2d (first base station device) transmits to the HeNB base station device 3-2 (third base station device), a disconnection preparation request that requests the HeNB base station device 3-2 (third base station device) to prepare to disconnect the second component carrier from the component carriers used for the communication using the CA technology. Based on the disconnection preparation request, the SCC disconnection requesting unit 205 transmits to the mobile station device 1, a disconnection request that requests the mobile station device 1 to disconnect the second component carrier. Upon receiving the disconnection request, the mobile station device 1 disconnects the third component carrier from the component carriers used for performing the communication using the CA technology.

Thus, it is possible to determine a component carrier to be disconnected from the plurality of component carriers, in accordance with the traffic amount, and disconnect the determined component carrier, thereby making it possible to provide an excellent communication speed for PCC.

Here, the description has been given in the present embodiment with respect to the case where the macrocell base station device 2d uses PCC as a main base station device, and the HeNB base station devices 3-1 and 3-2 use SCCs. However, the HeNB base station device 3-1 may be configured to use PCC as a main base station device. Alternatively, the HeNB base station device 3-2 may be configured to use PCC as a main base station device. Additionally, a main base station device is assumed to manage a scheduling. As a modified example, however, the core network switch 4 may be configured to manage the scheduling.

Further, in the present embodiment, the expression "disconnect SCC" has been used, but an expression "deactivate SCC and monitor the SCC" may be used. Here, the "deactivate" means entering a state such that no data communication, and no transmission and reception of a control signal and the like, are performed. For example, reference signals (pilot symbols) of deactivated SCC are received periodically. When measurement of a reception quality of the CC is not performed, the power of the system of receiving SCC may be turned off. Here, even when deactivation is performed, it is not always necessary to perform monitoring.

Additionally, the description has been given in the present embodiment with respect to the disconnection of one SCC among the three base station devices. However, it is possible to disconnect one CC by a similar method even in a case where CA communication is performed using CCs for the respective four or more base station devices. Further, the HeNB base station device 3 may be configured to transmit a disconnection request to the mobile station device 1, as in the second embodiment and the third embodiment. Moreover, it is also possible to disconnect SCC by transmitting a CA rejection request to the HeNB base station device 3-1 or the HeNB base station device 3-2, as in the fourth embodiment.

Sixth Embodiment

Hereinafter, a sixth embodiment of the present invention will be described with reference to drawings.

A configuration of a mobile station device 1 according to the present embodiment is similar to that of the mobile station device 1 according to the first embodiment, and therefore description thereof is omitted here. A configuration of a macrocell base station device 2 according to the present embodiment is similar to that of the macrocell base station device 2 according to the first embodiment, and therefore description thereof is omitted here. A configuration of an HeNB base station device 3 according to the present embodiment is similar to that of the HeNB base station device 3 according to the first embodiment, and therefore description thereof is omitted here.

Figure 28:
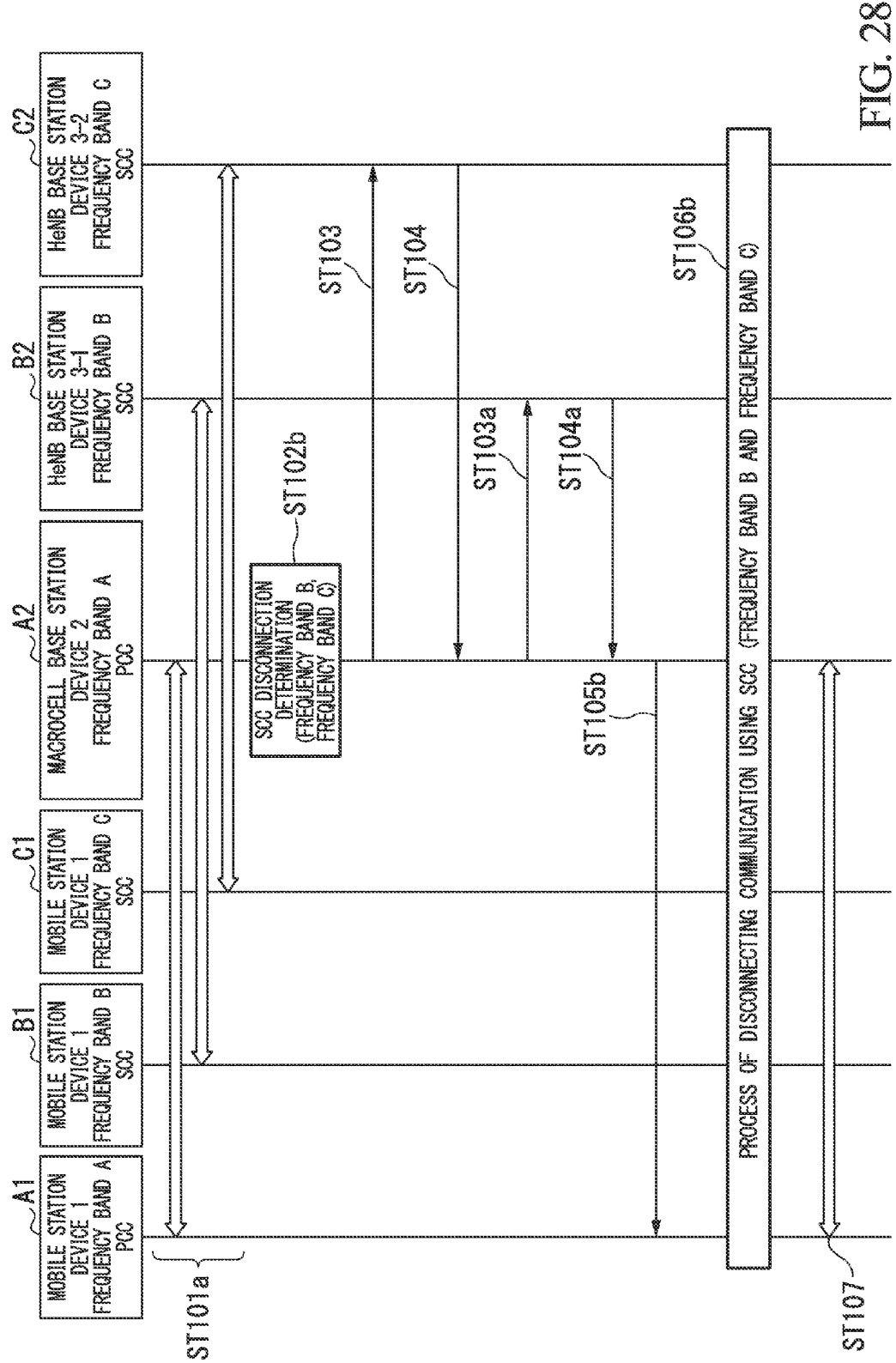
FIG. 28 is a sequence diagram illustrating an example of a component carrier disconnection process to be performed by the mobile station device and three base station devices according to the sixth embodiment.

FIG. 28 is a sequence diagram showing an example of a component carrier disconnection process performed by the mobile station device 1 and the three base station devices according to the sixth embodiment of the present invention.

Communication between the macrocell base station device 2 and the HeNB base station device 3 is performed via the network communication units 208 and 305 of the respective base station devices, but description thereof is omitted hereinafter. Additionally, communication between the mobile station device 1 and the macrocell base station device 2, and communication between the mobile station device 1 and the HeNB base station device 3, are performed via the transceiver antennas 100, 200, and 300, the wireless units 101, 201, and 301, and the transceiver units 103, 203, and 303, but description thereof is omitted hereinafter.

The mobile station device 1 is performing CA communication using PCC (frequency band A) used for communication with the macrocell base station device 2, SCC (frequency band B) used for communication with the HeNB base station device 3-1, and SCC (frequency band C) used for communication with the HeNB base station device 3-2 (step ST101a).

The CA communication determining unit 21 of the macrocell base station device 2 determines to disconnect CA communication from a result of measurement of information regarding the traffic amount (step ST102b). The CA communication determining unit 21 determines to disconnect all the SCCs.

When the CA communication determining unit 21 determines to disconnect the CA communication, the disconnection preparation requesting unit 206 of the macrocell base station device 2 transmits a disconnection preparation request to the HeNB base station device 3-2 (step ST103).

Upon receiving the disconnection preparation request from the macrocell base station device 2, the disconnection preparation request processing unit 304 of the HeNB base station device 3-2 performs preparation to disconnect SCC, and transmits a disconnection preparation ACK to the macrocell base station device 2 (step ST104).

When the CA communication determining unit 21 determines to disconnect the CA communication, the disconnection preparation requesting unit 206 of the macrocell base station device 2 transmits a disconnection preparation request to the HeNB base station device 3-1 (step ST103a).

Upon receiving the disconnection preparation request from the macrocell base station device 2, the disconnection preparation request processing unit 304 of the HeNB base station device 3-1 prepares to disconnect SCC, and transmits a disconnection preparation ACK to the macrocell base station device 2 (step ST104a).

Upon receiving the disconnection preparation ACKs from the HeNB base station device 3-1 and the HeNB base station device 3-2, the SCC disconnection requesting unit 205 of the macrocell base station device 2 transmits an SCC disconnection request to the mobile station device 1 (step ST105b).

Upon receiving the disconnection request from the macrocell base station device 2, the SCC disconnection processing unit 105 of the mobile station device 1 disconnects the communication with the HeNB base station device 3-1 and the communication with the HeNB base station device 3-2 (step ST106b).

The mobile station device 1 performs communication with the macrocell base station device 2 using the PCC (step ST107).

Thus, the wireless communication system according to the present embodiment includes the macrocell base station device 2, the HeNB base station device 3-1, the HeNB base station device 3-2, and the mobile station device 1 that communicates with those base station devices. The mobile station device 1 is performing communication using the CA technology, using a first component carrier used to communicate with the macrocell base station device 2, a second component carrier used to communicate with the HeNB base station device 3-1, and a third component carrier used to communicate with the HeNB base station device 3-2.

The macrocell base station device 2 transmits to the HeNB base station 3-1 and the HeNB base station device 3-2, disconnection preparation requests that request the HeNB base station device 3-1 and the HeNB base station device 3-2 to disconnect the second component carrier. The macrocell base station device 2 transmits to the mobile station device 1, a disconnection request that requests the mobile station device 1 to disconnect the second component carrier and the third component carrier from the component carriers used for the communication using the CA technology. Upon receiving the disconnection request, the mobile station device 1 disconnects the second component carrier and the third component carrier. As a result, it is possible to provide a wireless communication system with an excellent communication speed.

Here, the description has been given in the present embodiment with respect to the case where the macrocell base station device 2 uses PCC as a main base station device, and the HeNB base station devices 3-1 and 3-2 use SCCs. However, the HeNB base station device 3-1 may be configured to use PCC as a main base station device. Alternatively, the HeNB base station device 3-2 may be configured to use PCC as a main base station device. Even in a case where the HeNB base station device 3-1 or 3-2 uses PCC as a main base station device, and the macrocell base station device 2 and a plurality of other HeNB base station devices 3 use SCCs, it is possible to disconnect a component carrier by a similar method, and the macrocell base station device 2 need not be included. Additionally, a main base station device is assumed to manage a scheduling. As a modified example, however, the core network switch 4 may be configured to manage the scheduling.

Further, in the present embodiment, the expression "disconnect SCC" has been used, but an expression "deactivate SCC and monitor the SCC" may be used. Here, the "deactivate" means entering a state such that no data communication, and no transmission and reception of a control signal and the like, are performed. For example, reference signals (pilot symbols) of deactivated SCC are received periodically. When measurement of a reception quality of the component carrier is not performed, the power of the system of receiving SCC may be turned off. Here, even when deactivation is performed, it is not always necessary to perform monitoring.

Additionally, the description has been given in the present embodiment with respect to the disconnection of one SCC among the three base station devices. However, it is possible to disconnect all SCCs by a similar method even in a case where CA communication is performed using CCs for the respective four or more base station devices. Further, the HeNB base station device 3 may be configured to transmit a disconnection request to the mobile station device 1, as in the second embodiment and the third embodiment.

Seventh Embodiment

Hereinafter, a seventh embodiment of the present invention will be described with reference to drawings.

An example of CA communication according to the seventh embodiment of the present invention is similar to that shown in FIGS. 2 and 3, and therefore description thereof is omitted here. Additionally, a wireless communication system S2 according to the present embodiment is similar to that of the wireless communication system S2 shown in FIG. 4, and therefore description is omitted here.

Figure 29:
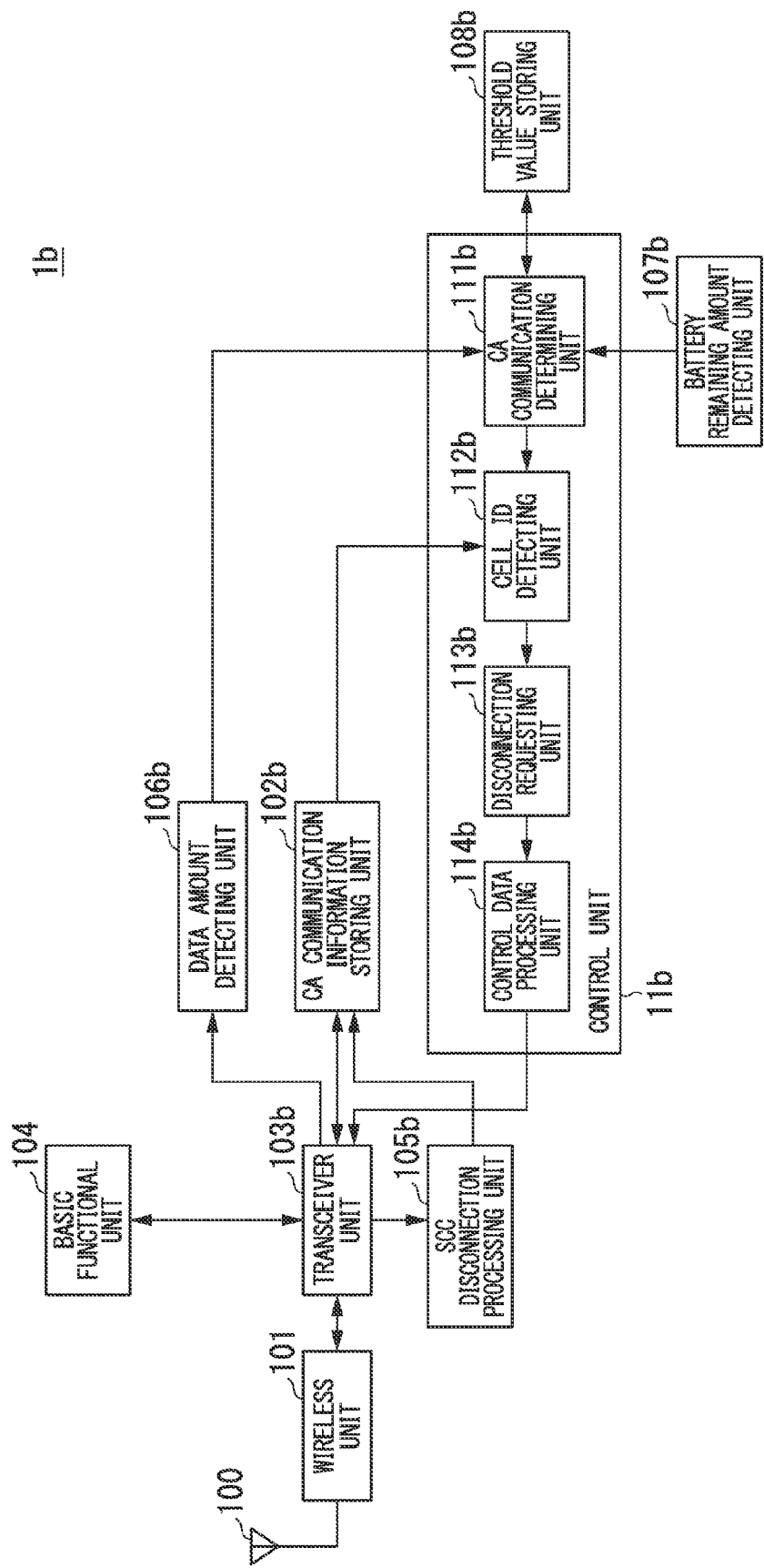
FIG. 29 is a schematic block diagram showing an example of a configuration of a mobile station device according to a seventh embodiment of the present invention.

FIG. 29 is a schematic block diagram showing an example of a configuration of the mobile station device 1b according to the seventh embodiment of the present invention.

The mobile station device 1b is configured to include the transceiver antenna 100, the wireless unit 101, the CA communication information storing unit 102, a transceiver unit 103b, the basic functional unit 104, an SCC disconnection processing unit 105b, a data mount detecting unit 106b, a battery remaining amount detecting unit 107b, a threshold storing unit 108b, and a control unit 11b. The mobile station device 1 performs wireless communication with a macrocell base station device 2e and an HeNB base station device 3d.

The wireless unit 101 down-converts a communication signal received from the transceiver antenna 100, and outputs the down-converted communication signal to the transceiver unit 103. Additionally, the wireless unit 101 up-converts a communication signal received from the transceiver unit 103, and transmits the up-converted communication signal to the macrocell base station device 2e or the HeNB the base station device 3d via the transceiver antenna 100.

The CA communication information storing unit 102b stores CA communication information. Here, the CA communication information represents information regarding, for example, an ID of each base station device, an ID of each mobile station device, a cell ID of each base station device, a frequency band of each CC, a bandwidth, and the like.

The transceiver unit 103b modulates a communication signal received from the basic functional unit 104 and the control unit 11b. Here, the communication signal represents a signal including information regarding, for example, voice communication such as a telephone call, an image, text communication, and the like. Then, the transceiver unit 103b reads the CA communication information stored by the CA communication information storing unit 102b. Based on the CA communication information, the transceiver unit 103b maps the modulated communication signal to wireless resources (time, frequency), and outputs the mapped communication signal to the wireless unit 101.

The transceiver unit 103b reads the CA communication information stored by the CA communication information storing unit 102b. Based on the CA communication information, the transceiver unit 103b demaps to wireless resources, a communication signal received from the wireless unit 101. Then, the transceiver unit 103b demodulates the demapped communication signal. The transceiver unit 103b outputs the demodulated communication signal to the basic functional unit 104. The transceiver unit 103b has the CA communication information storing unit store the CA communication information, such as an ID of each base station device, a frequency band of each CC, a bandwidth, and the like, which are used at the time communication has been performed with each base station device.

The basic functional unit 104 includes an input/output device to perform a display of a telephone call, an image, and a text, with respect to voice communication, an image, text communication, and the like, for example, a microphone, speakers, a display, input keys, a touch panel, and the like.

Based on the communication signal received from the transceiver unit 103b, the data amount detecting unit 106b measures, for example, for each CC, information regarding the amount of data transmitted to or received from each base station device. Then, the data amount detecting unit 106b outputs the information regarding the measured amount of data (CC data amount information) to the control unit 11b. Here, the information regarding the amount of data represents, for example, the amounts of uplink and downlink data transmitted by communication between a mobile station device and a base station device, or the total amount of uplink/downlink data. Additionally, the CC data amount information represents information regarding the amount of data for each CC. However, the present invention is not limited thereto, and the CC data amount information may represent information regarding the amount of data for each base station device.

The battery remaining amount detecting unit 107b measures information regarding the remaining amount of a battery of the mobile station device 1b. Then, the battery remaining amount detecting unit 107b outputs to the control unit 11b, battery remaining amount information regarding the battery remaining amount as a result of the measurement. Here, the battery remaining amount information represents information including information indicating information indicating the power consumption amount of the device itself and information indicating the battery remaining amount stored in the threshold value storing unit 108b.

Upon receiving the SCC disconnection preparation request received from the transceiver unit 103b, the SCC disconnection processing unit 105b disconnects SCC. The SCC disconnection processing unit 105b deletes the CA communication information regarding the disconnected SCC, from the CA communication information stored by the CA communication information storing unit 102b.

The control unit 11b is configured to include a CA communication determining unit 111b, a cell ID detecting unit 112b, a disconnection requesting unit 113b, and a control data processing unit 114b.

The CA communication determining unit 111b compares the CC data amount information that is received, the battery remaining amount information of the mobile station device 1b, the data amount threshold value information stored in the threshold value storing unit 108b, and the battery remaining amount threshold value information. Based on a result of the comparison, the CA communication determining unit 111b determines whether or not to perform CA communication.

Specifically, in order for the CA communication determining unit 111b to determine whether or not to perform the CA communication, for example, the mobile station device 1b checks the data amount of the device itself, and determine whether or not a measured value of the data amount is equal to or less than a threshold value. If a measured value of the data amount is equal to or less than a threshold value, the CA communication determining unit 111b determines to disconnect CA communication. Additionally, the mobile station device 1b determines whether or not a measured value of the battery remaining amount of the device itself is equal to or less than a threshold value. If a measured value of the battery remaining amount is equal to or less than the threshold value, the CA communication determining unit 111b determines to disconnect the CA communication. The CA communication determining unit 111b determines to disconnect the CA communication if at least one of a measured value of the data amount or the battery remaining amount is equal to or less than the threshold value.

The present invention is not limited thereto, and the CA communication determining unit 111b determines based on at least one of those conditions whether or not to perform CA communication. However, whether or not to perform CA communication may be determined based on other conditions (e.g., bit rate). Additionally, other conditions may be further added to determine whether or not to perform the CA communication.

Based on the determination performed by the CA communication determining unit 111b, the cell ID detecting unit 112b reads CA communication information from the CA communication information storing unit 102b. The cell ID detecting unit 112b generates SCC disconnection information based on the read CA communication information. Then, the cell ID detecting unit 112b outputs the generated SCC disconnection information to the disconnection requesting unit 113b.

Based on the SCC disconnection information received from the cell ID detecting unit 112b, the disconnection requesting unit 113b generates an SCC disconnection request to be transmitted using PCC. The disconnection requesting unit 113b outputs the generated SCC disconnection request to the control data processing unit 114b.

Based on the SCC disconnection request received from the disconnect requesting unit 113b, the control data processing unit 114b performs, after processing controlled data, wireless communication with the macrocell base station device 2e via the transceiver unit 103b.

Figure 30:
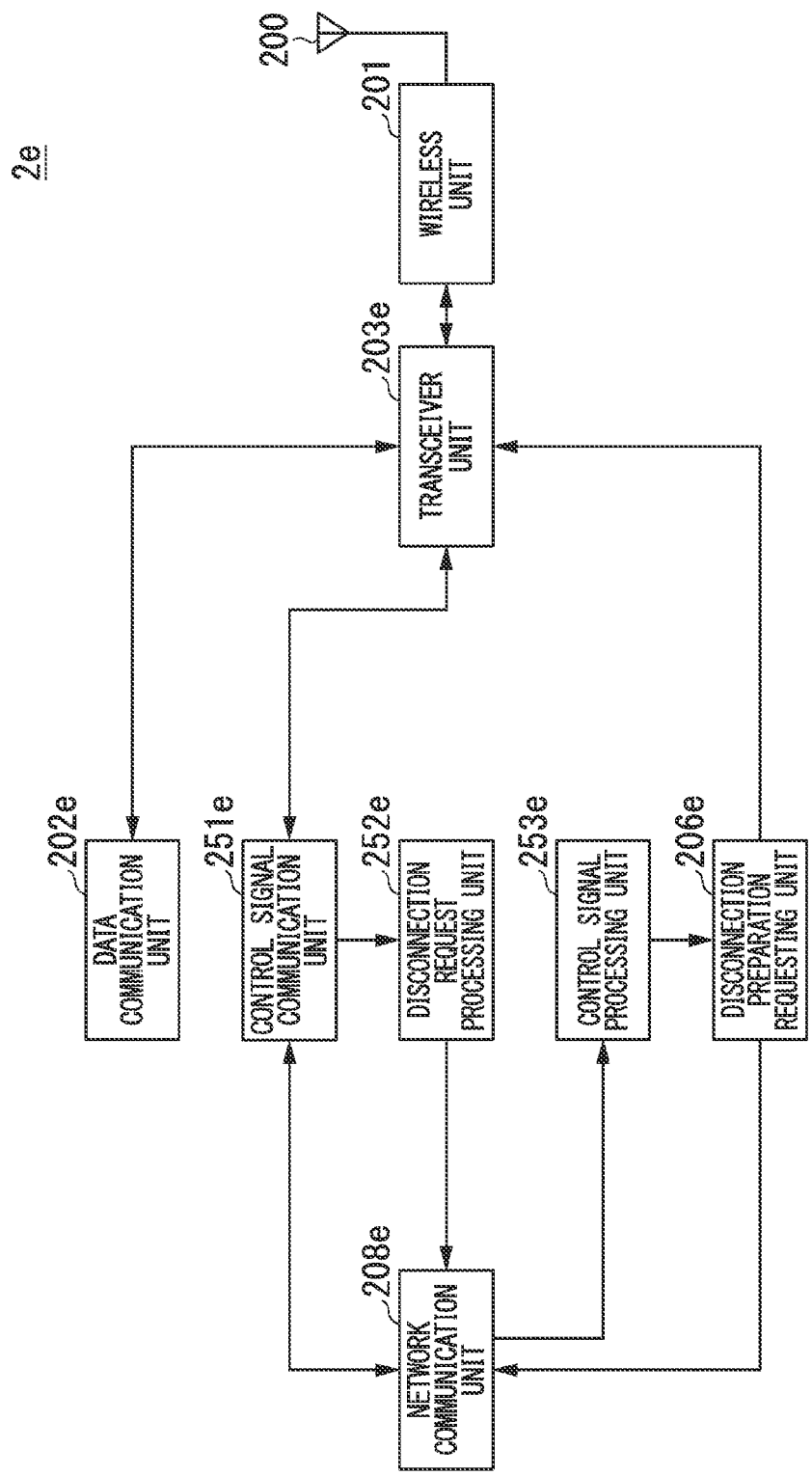
FIG. 30 is a schematic block diagram showing an example of a configuration of a macrocell base station device according to the seventh embodiment.

FIG. 30 is a schematic block diagram showing an example of a configuration of the macrocell base station device 2e according to the seventh embodiment.

The macrocell base station device 2e is configured to include the transceiver antenna 200, the wireless unit 201, a data communication unit 202e, a transceiver unit 203e, a disconnection preparation requesting unit 206e, a network communication unit 208e, a communication signal notifying unit 251e, a disconnection request processing unit 252e, and a control signal processing unit 253e.

The wireless unit 201 down-converts a communication signal received from the transceiver antenna 200, and outputs the down-converted communication signal to the transceiver unit 203e. Additionally, the wireless unit 201 up-converts a communication signal received from the transceiver unit 203e, and transmits the up-converted communication signal to the mobile station device 1 via the transceiver antenna 200.

The data communication unit 202e generates a communication signal including communication information regarding communication with the mobile station device 1b. Then, the communication unit 202e outputs the generated communication signal to the transceiver unit 203e.

The transceiver unit 203e modulates a communication signal received from the data communication unit 202e and the disconnection preparation requesting unit 206e. The transceiver unit 203e maps the communication signal to wireless resources (time, frequency) based on allocation of a predetermined frequency band (e.g., CC). Then, the transceiver unit 203e outputs the mapped communication signal to the transceiver unit 203e.

Based on a predetermined frequency band (CC), the transceiver unit 203e de-maps to wireless resources, a communication signal received from the wireless unit 201. The transceiver unit 203e demodulates the demapped communication signal. The transceiver unit 203e outputs the modulated communication signal to the data communication unit 202e.

Based on a control signal received from the control signal processing unit 253e, the disconnection preparation requesting unit 206e generates an SCC disconnection preparation request. The disconnection preparation requesting unit 206e transmits to the mobile station device 1b via the transceiver unit 203e, a communication signal including the generated SCC disconnection preparation request.

Based on the control signal received from the transceiver unit 203e, the control signal communication unit 251e generates a control signal that controls data communication performed by the HeNB base station device 3d. The control signal communication unit 251e transmits the generated control signal to the HeNB base station device 3d via the network communication unit 208e.

Based on the control information received from the network communication unit 208e, the communication signal control unit 251e generates a control signal that controls communication performed by the mobile station device 1b. The communication signal control unit 251e outputs the generated control signal to the transceiver unit 203e.

Additionally, the control signal communication unit 251e outputs to the disconnection request processing unit 252e, the SCC disconnection request received from the transceiver unit 203e.

Based on the SCC disconnection request received from the control signal communication unit 251e, the disconnection request processing unit 252e generates an SCC disconnection request including base station device information and mobile station device information which are targeted for disconnection of SCC. The control signal communication unit 251e outputs the generated SCC disconnection request to the control signal processing unit 253e via the network communication unit 208e.

The control signal processing unit 253e performs a control signal process on the SCC disconnection request received from the disconnection request processing unit 252e. Here, the control signal process represents, for example, a packet communication process or a process of adding a control signal to an input/output signal.

The control signal processing unit 253e outputs to the disconnection preparation requesting unit 206e, the SCC disconnection request subjected to the control signal process. Additionally, the control signal processing unit 253e performs a control signal process on the SCC disconnection preparation ACK received from the HeNB base station device 3d via the network communication unit 208e. Then, the control signal processing unit 253e outputs to the disconnection preparation request section 206e, the SCC disconnection preparation ACK subjected to the control signal process.

Figure 31:
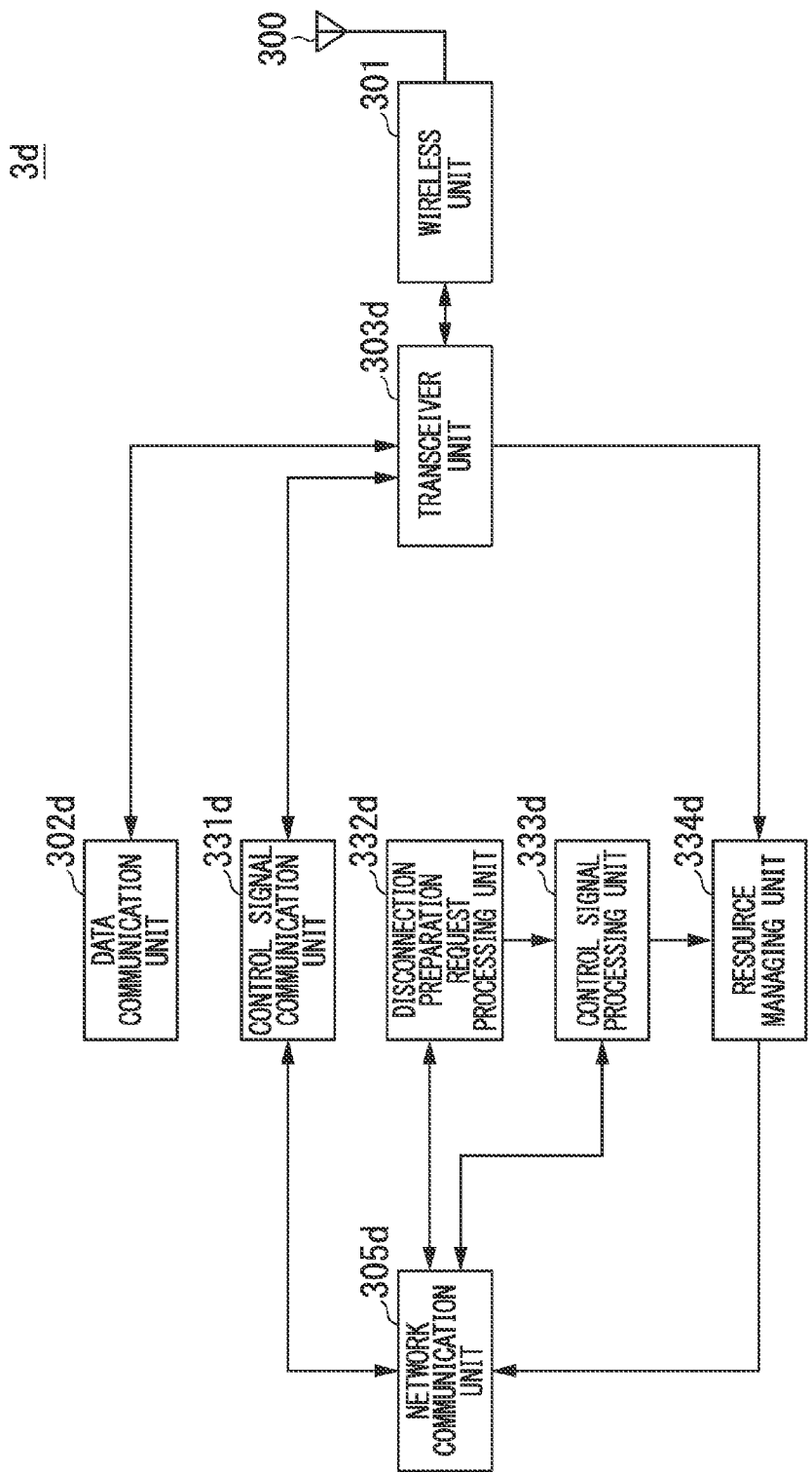
FIG. 31 is a schematic block diagram showing an example of a configuration of an HeNB base station device according to the seventh embodiment.

FIG. 31 is a schematic block diagram showing an example of a configuration of the HeNB base station device 3d according to the seventh embodiment.

The HeNB base station device 3d is configured to include a transceiver antenna 300, a wireless unit 301, a data communication unit 302d, a transceiver unit 303d, a network communication unit 305d, a control signal communication unit 331d, a disconnection preparation request processing unit 332d, a control signal processing unit 333d, and a resource managing unit 334d.

The wireless unit 301 down-converts a communication signal received from the transceiver antenna 300, and outputs the down-converted communication signal to the transceiver unit 303d. Additionally, the wireless unit 301 up-converts a communication signal received from the transceiver unit 303d, and transmits the up-converted communication signal via the transceiver antenna 300.

The data communication unit 302d generates a communication signal including communication information regarding communication with the mobile station device 1b. Then, the communication unit 302d outputs the generated communication signal to the transceiver unit 303d.

The transceiver unit 303d modulates a communication signal received from the data communication unit 302d. The transceiver unit 303d maps the communication signal to wireless resources (time, frequency), based on allocation of a predetermined frequency band (e.g., CC). The transceiver unit 303d outputs the mapped communication signal to the wireless unit 301.

Based on a predetermined frequency band (CC), the transceiver unit 303d demaps to wireless resources, a communication signal received from the wireless unit 301. The transceiver unit 303d demodulates the demapped communication signal. The transceiver unit 303d outputs the demodulated communication signal to the data communication unit 302d.

Based on the control information received from the transceiver unit 303d, the control signal communication unit 331d generates a control signal that controls data communication performed by the macrocell base station device 2e. The control signal communication unit 331d outputs the generated control signal to the network communication unit 305d.

Based on the control information received from the network communication unit 305d, the control signal communication unit 331d generates a control signal that controls communication performed by the mobile station device 1b. The control signal communication unit 331d outputs the generated control signal to the transceiver unit 303d.

Additionally, the control signal communication unit 331d outputs to the disconnection preparation request processing unit 332d via the network communication unit 305d, an SCC disconnection preparation request received from the transceiver unit 303d.

Based on the SCC disconnection preparation request received from the control signal communication unit 331d, the disconnection preparation request processing unit 332d performs an SCC disconnection preparation process.

Based on the SCC disconnection preparation request received from the disconnection preparation request processing unit 332d, the control signal processing unit 333d generates an SCC disconnection preparation ACK.

Additionally, the control signal processing unit 333d outputs the generated SCC disconnection preparation ACK to the resource managing unit 334d. The control signal processing unit 333d transmits the generated SCC disconnection preparation ACK to the macrocell base station device 2e via the network communication unit 305d.

Based on the SCC disconnection preparation ACK received from the control signal processing unit 333d, the resource managing unit 334d performs a resource release process and outputs information to the network communication unit 305d.

Figure 32:
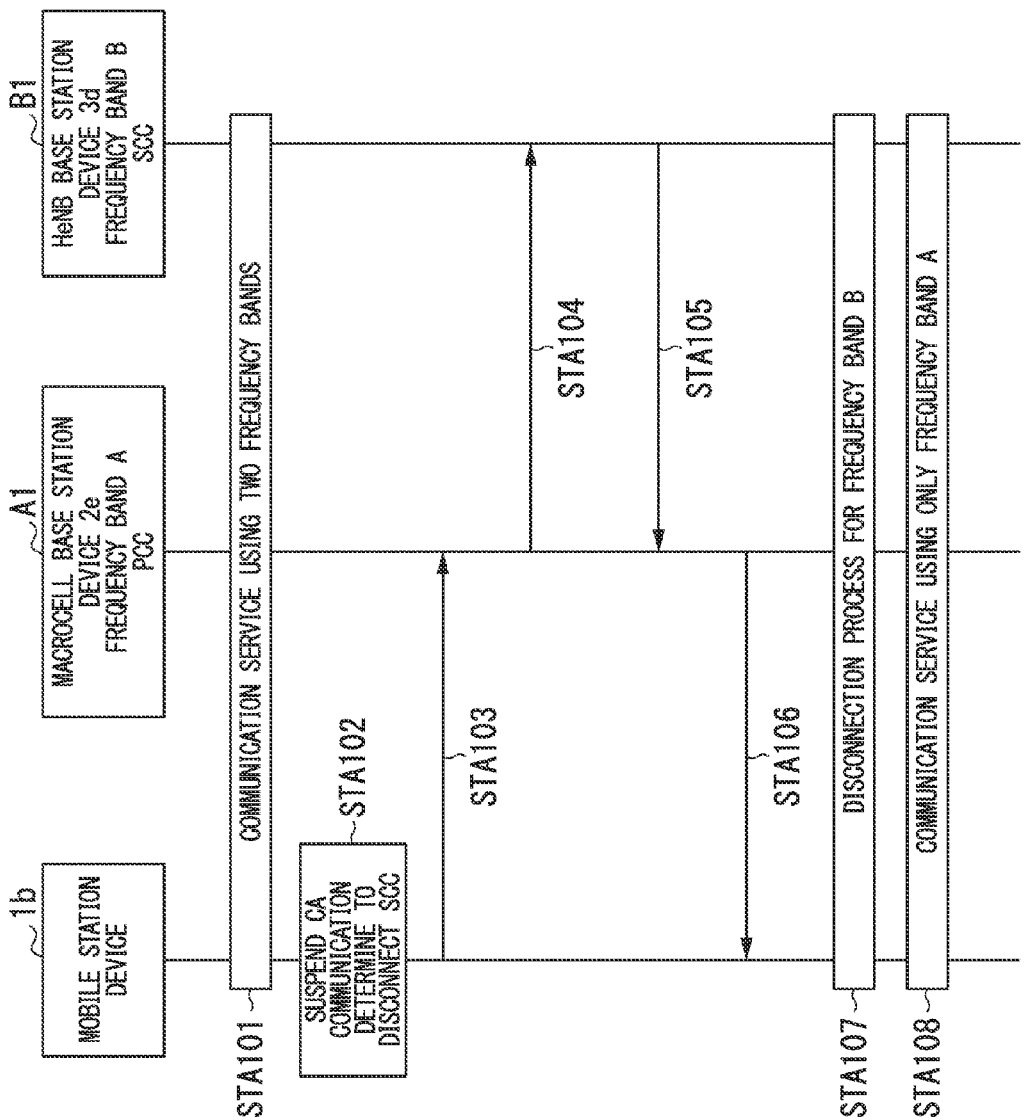
FIG. 32 is a sequence diagram illustrating an example of a component carrier disconnection process to be performed by the mobile station device and two base station devices according to the seventh embodiment.

FIG. 32 is a sequence diagram showing an example of an SCC disconnection process performed by the mobile station device 1b and the two base station devices according to the seventh embodiment.

Communication between the macrocell base station device 2e and the HeNB base station device 3d is performed via the network communication units 208e and 305d of the respective base station devices, but description thereof is omitted hereinafter. Additionally, communication between the mobile station device 1b and the macrocell base station device 2e, and communication between the mobile station device 1b and the HeNB base station device 3d, are performed via the transceiver antennas 200 and 300, the wireless units 201 and 301, and the transceiver units 203e and 303d, but description thereof is omitted hereinafter.

Additionally, the mobile station device 1b shown in FIG. 32 includes a mobile station device 1b with a frequency band APCC A and a mobile station device 1b with a frequency band BSCC B, similarly to FIG. 9. The mobile station device 1b with the frequency band APCC A performs communication using a frequency band APCC A1 for the macrocell base station device 2e. The mobile station device 1b with the frequency band BSCC B performs communication using a frequency band BSCC B1 for the HeNB base station device 3d. However, description will be given hereinafter with respect to a mobile station device 1b including the mobile station device 1b with the frequency band APCC A and the mobile station device 1b with the frequency band BSCC B.

First, the mobile station device 1b and the macrocell base station device 2e are performing CA communication using PCC. The mobile station device 1b and the HeNB base station device 3d are performing CA communication using SCC (step STA101).

The mobile station device 1b determines to disconnect SCC based on CC data amount information and battery remaining amount information. In other words, the mobile station device 1b determines to suspend the CA communication. For example, if it is determined that measurement information regarding the battery remaining amount, or measurement information regarding the data amount, is equal to or less than a threshold value, the CA communication determining unit 111b of the mobile station device 1b determines to disconnect CA communication (step STA102).

Based on information regarding the CA communication (e.g., an ID of a disconnection-target base station device, a frequency band, a bandwidth, and the like), the mobile station device 1b transmits an SCC disconnection request to the macrocell base station device 2e (step STA103).

Based on the SCC disconnection request transmitted in step STA103, the macrocell base station device 2e transmits an SCC disconnection preparation request to the HeNB base station device 3d (step STA104).

Based on the SCC disconnection preparation request transmitted in step STA104, the HeNB base station device 3d transmits an SCC disconnection preparation ACK to the macrocell base station device 2e (step STA105).

Based on the SCC disconnection preparation ACK transmitted in step STA105, the macrocell base station device 2e transmits an SCC disconnection preparation request to the mobile station device 1b (step STA106).

Based on the SCC disconnection preparation request transmitted in step STA106, the mobile station device 1b disconnects the communication with the HeNB base station device 3d (step STA107).

The mobile station device 1b provides communication service using PCC for the macrocell base station device 2e (step STA108).

Thus, the wireless communication system according to the present embodiment includes the macrocell base station device 2e, the HeNB base station device 3d, and the mobile station device 1b. The mobile station device 1b is performing the CA communication using a CC for the macrocell base station device 2e and a CC for the HeNB base station device 3d. The mobile station device 1b transmits using PCC, an SCC disconnection request to disconnect the SCC from the CCs used for the CA communication. Based on the SCC disconnection request, the macrocell base station device 2e transmits to the HeNB base station device 3d, an SCC disconnection preparation request that requests the HeNB base station device 3d to prepare to disconnect the SCC during the CA communication.

If a base station device that communicates with the mobile station device using PCC differs from a base station device that communicates with the mobile station device communicates using SCC, in conventional cases, even if an SCC disconnection request notification is transmitted to the base station device that communicates with the mobile station device using the PCC, the communication with the mobile station device using the SCC cannot be disconnected in some cases. On the other hand, according to the present embodiment, it is possible to disconnect the SCC during CA communication among a plurality of base station devices. Additionally, it is possible to disconnect the SCC in accordance with the amount of traffic, thereby making it possible to provide an excellent communication speed for PCC.

Here, the description has been given in the present embodiment with respect to the case where the first CC used for the communication between the mobile station device 1b and the macrocell base station device 2e is PCC, and the second CC used for the communication between the mobile station device 1b and the HeNB base station device 3d is SCC. However, a configuration may be such that the CC for the macrocell base station device 2e is SCC, and the CC for the HeNB base station device 3d is PCC. Alternatively, a configuration may be such that the CC for the HeNB base station device 3d-1 is PCC, and the CC for the HeNB base station device 3d-2 is SCC, without using the macrocell base station device 2e. In this case, the wireless communication system can disconnect the SCC in a similar manner.

Eighth Embodiment

Hereinafter, an eighth embodiment of the present invention will be described with reference to drawings.

An example of CA communication according to the eighth embodiment of the present invention is similar to that shown in FIGS. 2 and 3, and therefore description thereof is omitted here. Additionally, a wireless communication system S2 according to the present embodiment is similar to that of the wireless communication system S2 shown in FIG. 4, and therefore description is omitted here.

Figure 33:
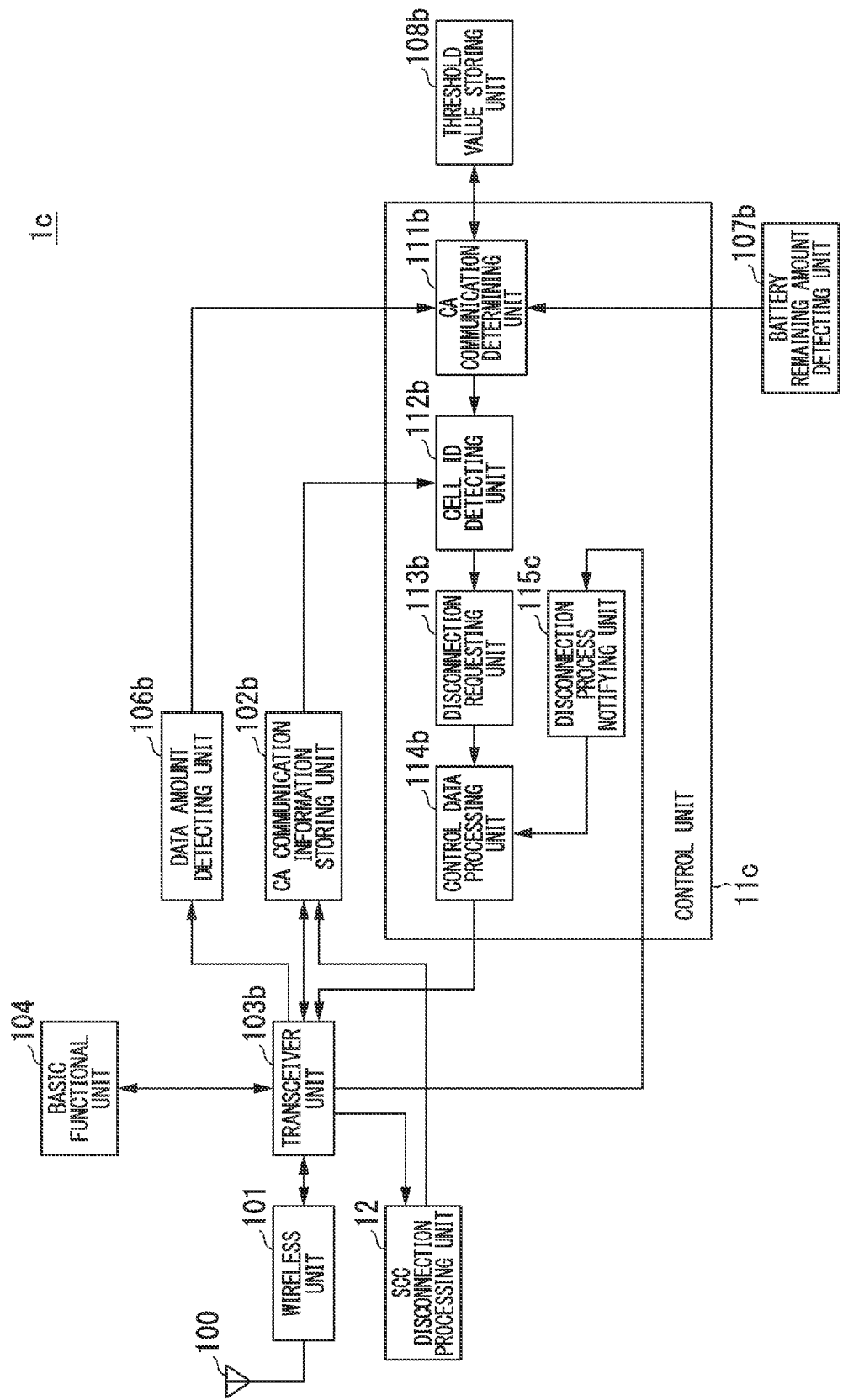
FIG. 33 is a schematic block diagram showing an example of a configuration of a mobile station device according to an eighth embodiment of the present invention.

FIG. 33 is a schematic block diagram showing an example of a configuration of a mobile station device 1c according to the eighth embodiment of the present invention.

Comparing the mobile station device 1c and the mobile station device 1b according to the seventh embodiment, the disconnection process notifying unit 115c of the control unit 11c is different. Other configurations are similar to those of the seventh embodiment, and therefore description is omitted. The mobile station device 1c performs wireless communication with a macrocell base station device 2f and an HeNB base station device 3e.

Based on a communication signal indicating disconnection of SCC, which is received from the transceiver unit 103b, the disconnection process notifying unit 115c generates an SCC disconnection process notification to the macrocell base station device 2f using PCC. The disconnection process notifying unit 115c transmits the generated SCC disconnection process notification to the macrocell base station device 2f via the control data processing unit 114b and the transceiver unit 103b.

Figure 34:
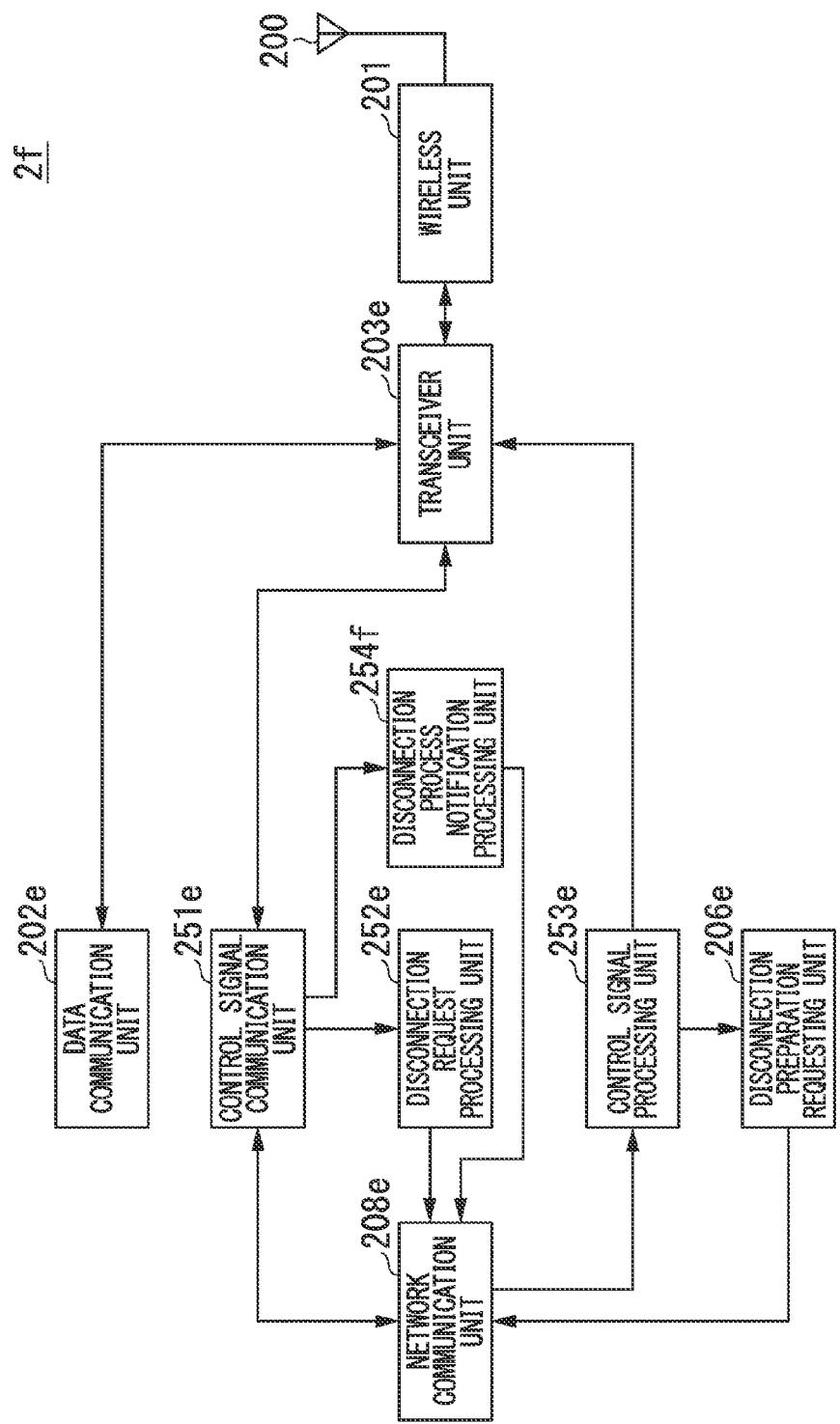
FIG. 34 is a schematic block diagram showing an example of a configuration of a macrocell base station device according to the eighth embodiment.

FIG. 34 is a schematic block diagram showing an example of a configuration of the macrocell base station device 2f according to the eighth embodiment.

Comparing the macrocell base station device 2f and the macrocell base station device 2e according to the seventh embodiment, a disconnection process notification processing unit 254f is different. Other configurations are similar to those of the seventh embodiment, and therefore description is omitted here.

The disconnection process notification processing unit 254f receives the SCC disconnection process notification received from the control signal communication unit 251e.

The disconnection process notification processing unit 254f outputs the SCC disconnection process notification to the control signal processing unit 253e via the network communication unit 208e.

Based on the SCC disconnection process notification received from the disconnection process notification processing unit 254f, the control signal processing unit 253e generates an SCC disconnection process ACK addressed to the mobile station device 1c. The control signal processing unit 253e transmits the generated SCC disconnection process ACK to the mobile station device 1c via the transceiver unit 203e.

Figure 35:
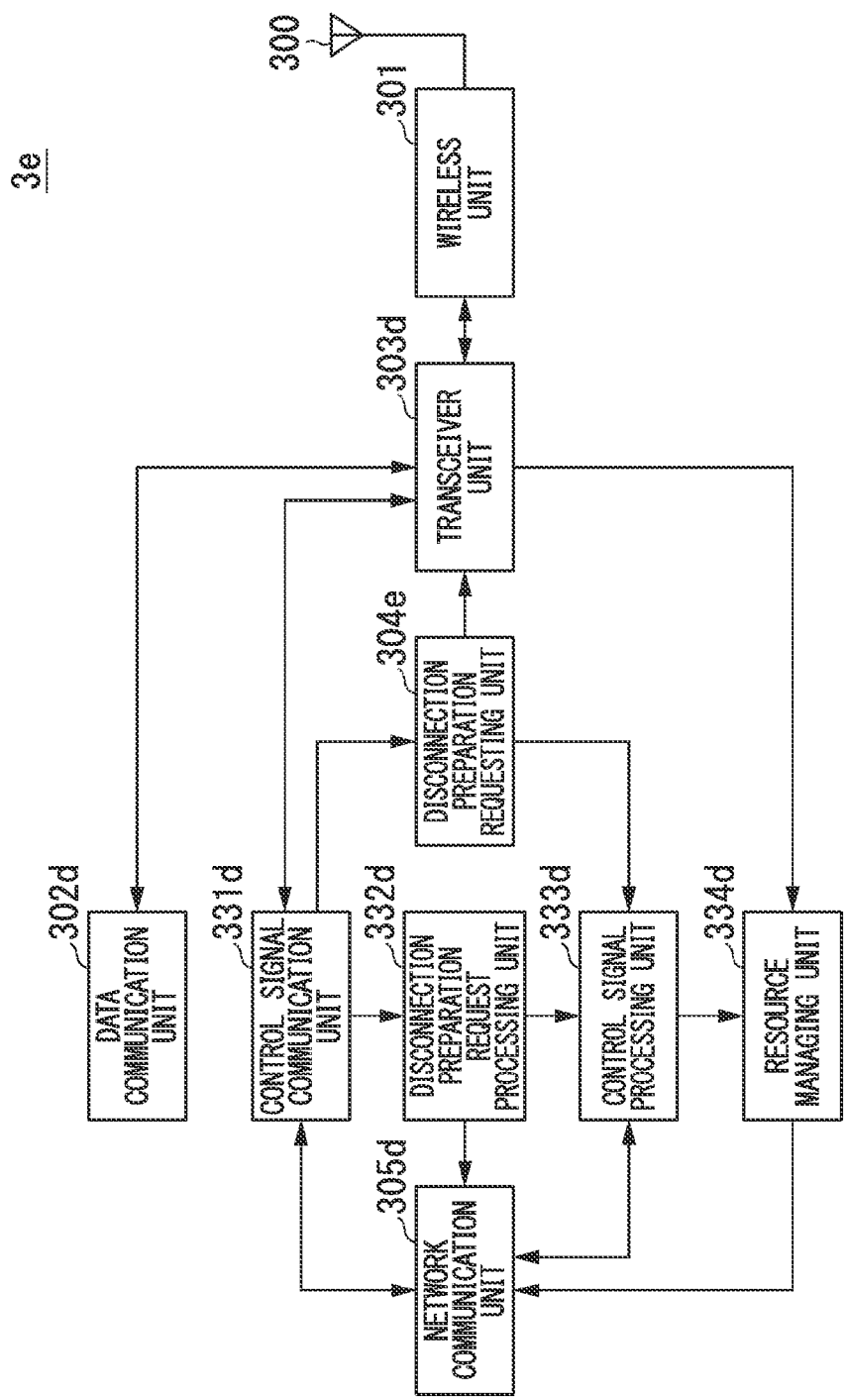
FIG. 35 is a schematic block diagram showing an example of an HeNB base station device according to the eighth embodiment.

FIG. 35 is a schematic block diagram showing an example of the HeNB base station device 3e according to the eighth embodiment.

Comparing the HeNB base station device 3e and the HeNB base station device 3d of the seventh embodiment, a disconnection preparation requesting unit 304e is different. Other configurations are similar to those of the seventh embodiment, and therefore the description thereof is omitted here.

Based on the SCC disconnection preparation request received from the control signal communication unit 331d, the disconnection preparation requesting unit 304e generates an SCC disconnection preparation request. Then, the disconnection preparation requesting unit 304e transmits the generated SCC disconnection preparation request to the mobile station device 1c via the transceiver unit 303d. Additionally, the disconnection preparation requesting unit 304e outputs the generated SCC disconnection preparation request to the network communication unit 305d and the control signal processing unit 333d.

Figure 36:
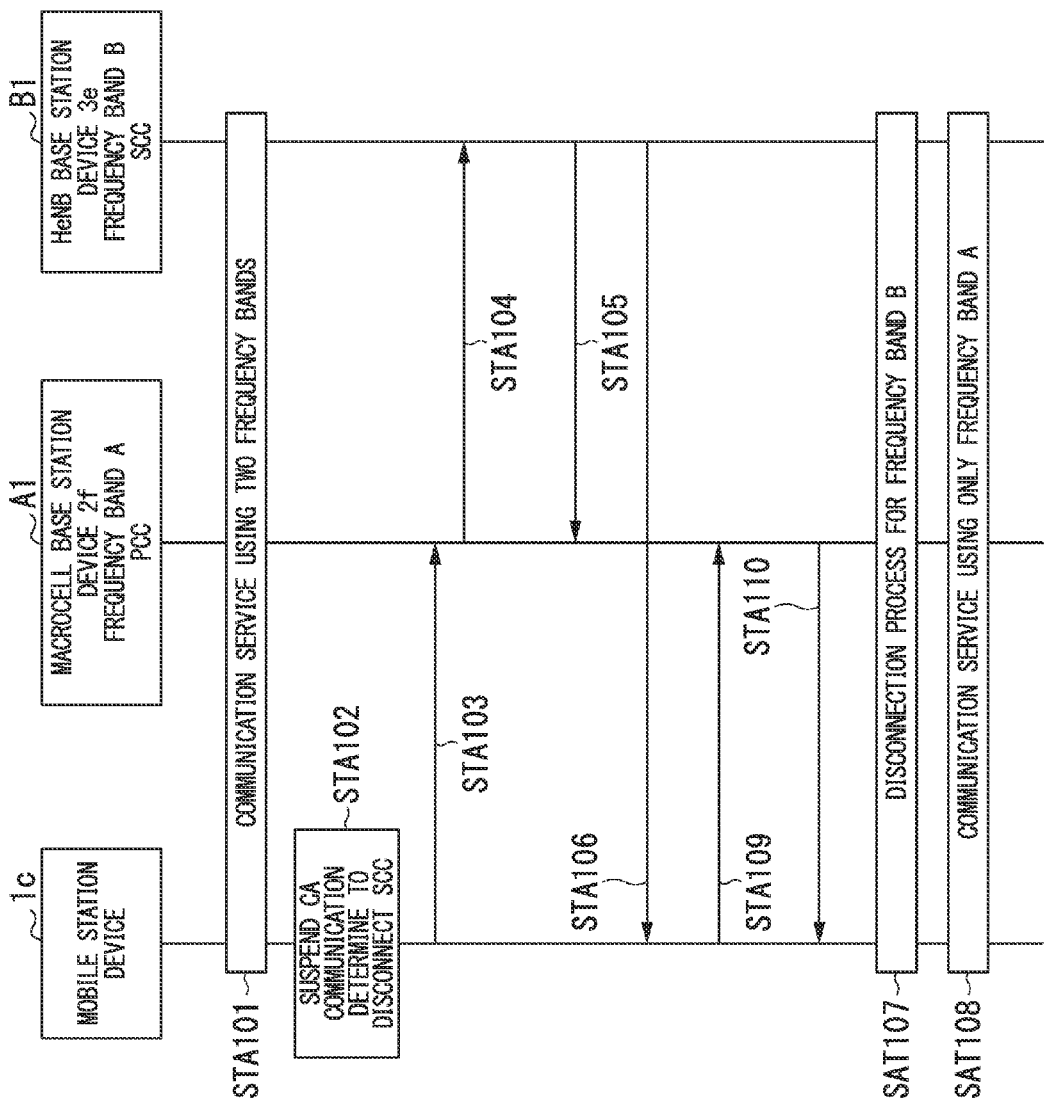
FIG. 36 is a sequence diagram illustrating an example of a component carrier disconnection process to be performed by the mobile station device and two base station devices according to the eighth embodiment.

FIG. 36 is a sequence diagram showing an example of an SCC disconnection process performed by the mobile station device 1c and the two base station devices (the macrocell base station device 2f, the HeNB base station device 3e) according to the eighth embodiment.

Communication between the macrocell base station device 2f and the HeNB base station device 3e is performed via the network communication units 208e and 305d of the respective base station devices, but description thereof is omitted hereinafter. Additionally, communication between the mobile station device 1c and the macrocell base station device 2f, and communication between the mobile station device 1c and the HeNB base station device 3e, are performed via the transceiver antennas 200 and 300, the wireless units 201 and 301, and the transceiver units 203e and 303d, but description thereof is omitted hereinafter.

Additionally, the mobile station device 1c shown in FIG. 32 includes a mobile station device 1c with a frequency band APCC A and a mobile station device 1c with a frequency band BSCC B, similarly to FIG. 13. The mobile station device 1c with the frequency band APCC A performs communication using a frequency band APCC A1 for the macrocell base station device 2f. The mobile station device 1c with the frequency band BSCC B performs communication using a frequency band BSCC B1 for the HeNB base station device 3e. However, description will be given hereinafter with respect to a mobile station device 1b including the mobile station device 1c with the frequency band APCC A and the mobile station device 1c with the frequency band BSCC B.

First, the mobile station device 1c and the macrocell base station device 2f are performing CA communication using PCC. The mobile station device 1c and the HeNB base station device 3e are performing CA communication using SCC (step STA101).

The mobile station device 1c determines to disconnect SCC based on CC data amount information and battery remaining amount information. In other words, the mobile station device 1c determines to suspend CA communication. For example, if it is determined that measurement information regarding the battery remaining amount, or measurement information regarding the data amount, is equal to or less than a threshold value, the mobile station device 1c determines to disconnect CA communication (step STA102).

Based on information regarding the CA communication (e.g., an ID of a disconnection-target base station device, a frequency band, a bandwidth, and the like), and the mobile station device 1c transmits an SCC disconnection request to the macrocell base station device 2f (step STA103).

Based on the SCC disconnection request transmitted in step STA103, the macrocell base station device 2f transmits an SCC disconnection preparation request to the HeNB base station device 3e (step STA104).

Based on the SCC disconnection preparation request transmitted in step STA104, the HeNB base station device 3e transmits an SCC disconnection preparation ACK to the macrocell base station device 2f (step STA105).

Based on the SCC disconnection request transmitted in step STA104, the macrocell base station device 3e transmits an SCC disconnection preparation request to the mobile station device 1c (step STA106).

Based on the SCC disconnection preparation request transmitted in step STA106, the mobile station device 1c transmits an SCC disconnection process notification to the macrocell base station device 2f (step STA109).

Based on the SCC disconnection process notification transmitted in step STA109, the macrocell base station device 2f transmits an SCC disconnection process ACK to the mobile station device 1c (step STA110).

Based on the SCC disconnection process ACK transmitted in step STA110, the mobile station device 1c disconnects the communication with the HeNB base station device 3e (using SCC (frequency band B)) (step STA107).

The mobile station device 1c provides communication service using PCC (frequency band A) for the macrocell base station device 2f (step STA108).

Thus, the wireless communication system according to the present embodiment includes the macrocell base station device 2f, the HeNB base station device 3e, and the mobile station device 1c. The mobile station device 1c is performing CA communication using a CC for the macrocell base station device 2f and a CC for the HeNB base station device 3e. The mobile station device 1c transmits using PCC, an SCC disconnection request to disconnect the SCC from the PCC used for the CA communication. Based on the SCC disconnection request, the macrocell base station device 2f transmits to the mobile station device 1c, an SCC disconnection preparation request that requests the mobile station device 1c to prepare to disconnect the SCC during the CA communication. Thus, it is possible to disconnect the SCC during the CA communication among the plurality of base station devices, thereby making it possible to provide a wireless communication system with an excellent speed for PCC.

Here, the description has been given in the present embodiment with respect to the case where the CC for the macrocell base station device 2f is PCC, and the CC for the HeNB base station device 3e is SCC. However, a configuration may be such that the CC for the macrocell base station device 2f is SCC, and the CC for the HeNB base station device 3e is PCC. Alternatively, a configuration may be such that the CC for the HeNB base station 3e-1 is PCC, and the CC for the HeNB base station device 3e-2 is SCC. In this case, the wireless communication system can disconnect the SCC in a similar manner.

Ninth Embodiment

Hereinafter, a ninth embodiment of the present invention will be described with reference to drawings.

An example of CA communication according to the ninth embodiment of the present invention is similar to that shown in FIGS. 2 and 3, and therefore description thereof is omitted here. Additionally, a wireless communication system S2 according to the present embodiment is similar to that of the wireless communication system S2 shown in FIG. 4, and therefore description is omitted here.

Additionally, a mobile station device 1c according to the present embodiment is similar to that of the mobile station device 1c of the eighth embodiment, and therefore description is omitted here. A macrocell base station device 2e is similar to that of the macrocell base station device 2e of the seventh embodiment, and therefore description is omitted here.

Figure 37:
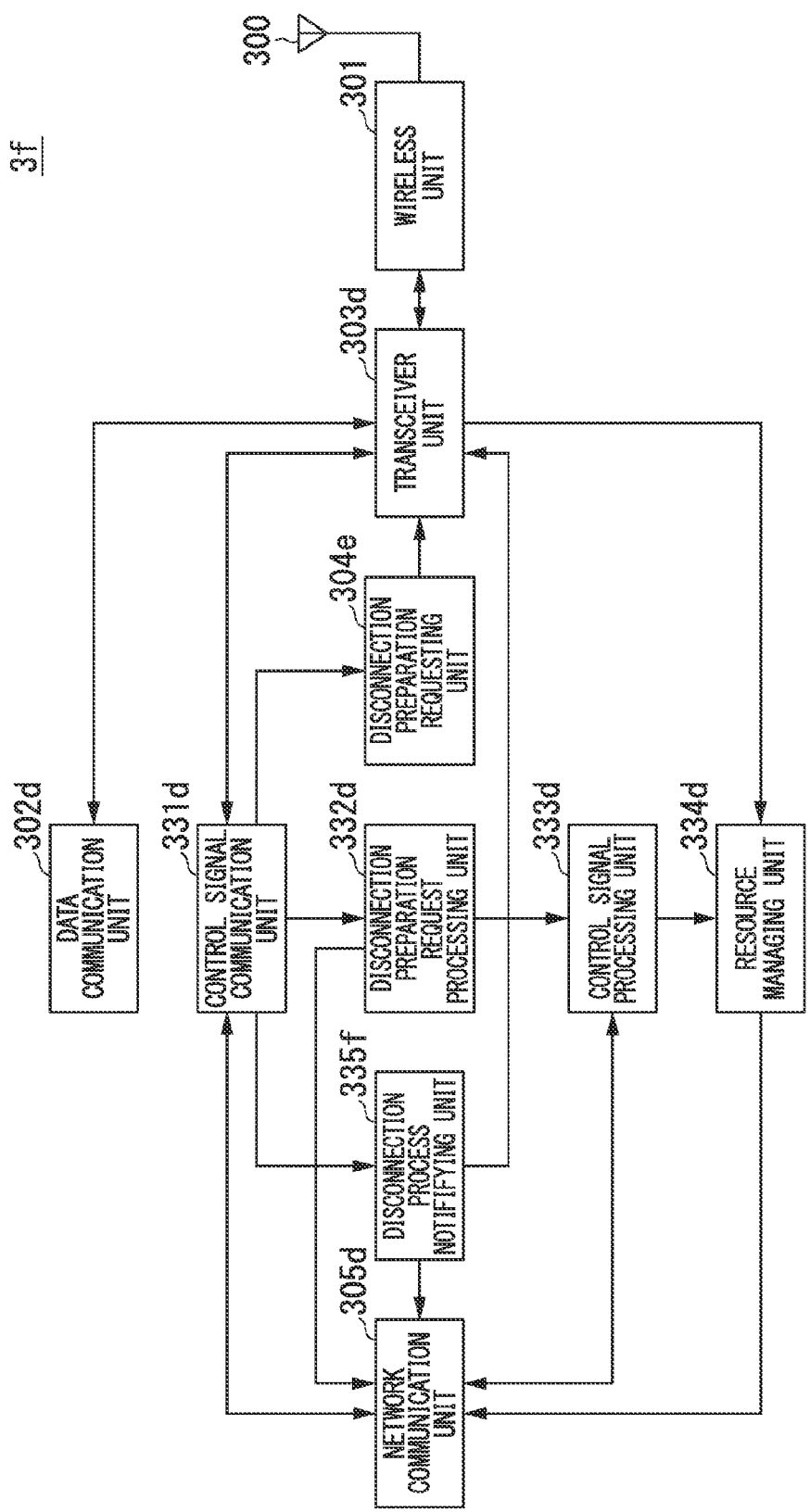
FIG. 37 is a schematic block diagram showing an example of a configuration of an HeNB base station device according to a ninth embodiment of the present invention.

FIG. 37 is a schematic block diagram showing an example of a configuration of an HeNB base station device 3f according to the ninth embodiment of the present invention.

Comparing the HeNB base station device 3f and the HeNB base station device 3e of the eighth embodiment, a disconnection process notifying unit 335f is different. Other configurations are similar to those of the eighth embodiment, and therefore the description thereof is omitted.

Based on an SCC disconnection preparation request received from the control signal communication unit 331d, the disconnection process notifying unit 335f generates an SCC disconnection process notification. Then, the disconnection process notifying unit 335f transmits the generated SCC disconnection process notification to the macrocell base station device 2e via the network communication unit 305d.

Figure 38:
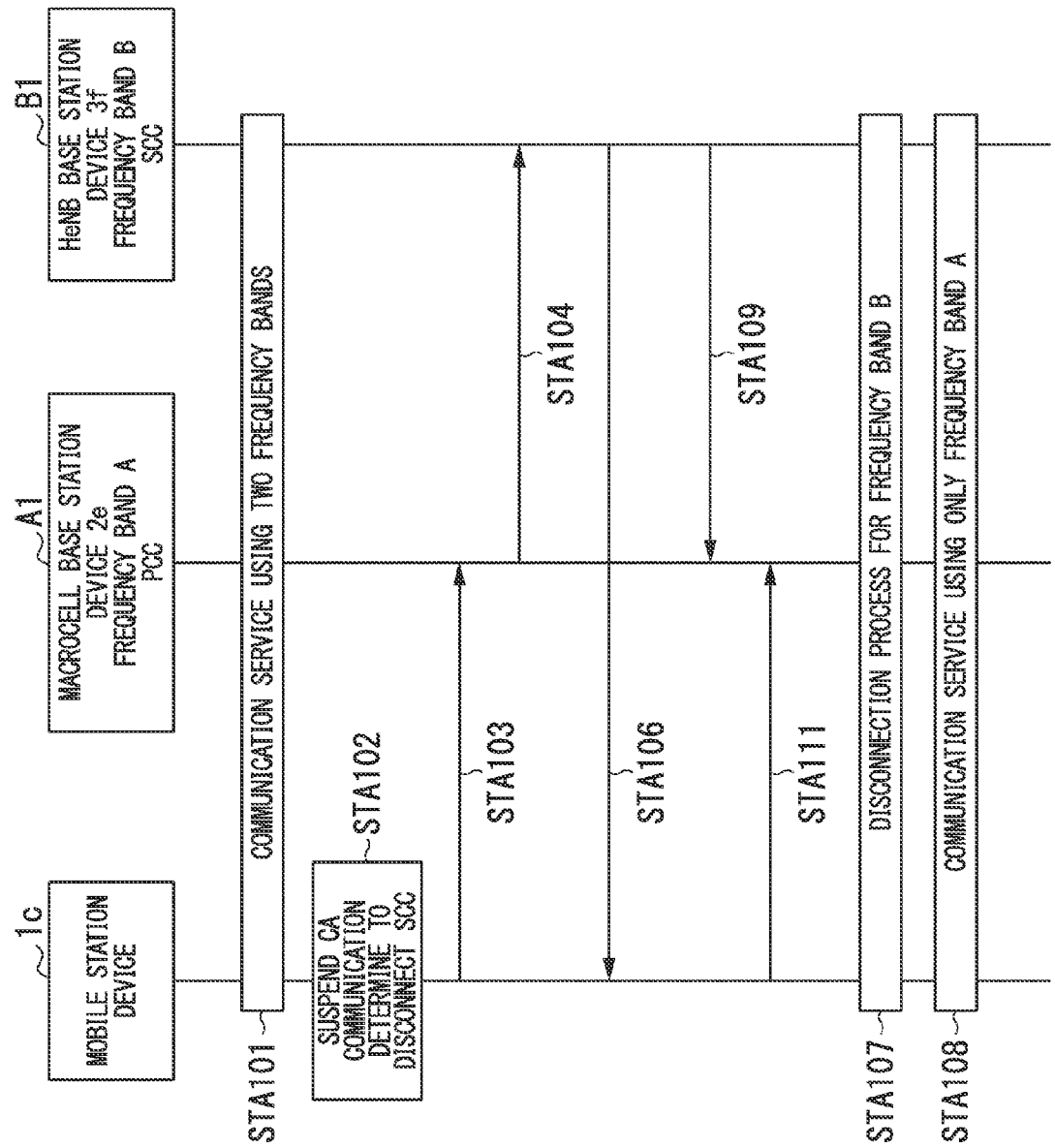
FIG. 38 is a sequence diagram illustrating an example of an SCC disconnection process to be performed by the mobile station device and two base station devices according to the ninth embodiment.

FIG. 38 is a sequence diagram showing an example of an SCC disconnection process performed by the mobile station device 1c and the two base station devices (the macrocell base station device 2e, the HeNB base station device 3f) according to the ninth embodiment.

Communication between the macrocell base station device 2e and the HeNB base station device 3f is performed via the network communication units 208e and 305d of the respective base station devices, but description thereof is omitted hereinafter. Additionally, communication between the mobile station device 1c and the macrocell base station device 2e, and communication between the mobile station device 1c and the HeNB base station device 3f, are performed via the transceiver antennas 200 and 300, the wireless units 201 and 301, and the transceiver units 203e and 303d, but description thereof is omitted hereinafter.

Additionally, the mobile station device 1c shown in FIG. 38 includes a mobile station device 1c with a frequency band APCC A and a mobile station device 1c with a frequency band BSCC B, similarly to FIG. 16. The mobile station device 1c with the frequency band APCC A performs communication using a frequency band APCC A1 for the macrocell base station unit 2e. The mobile station device 1c with the frequency band BSCC B performs communication using a frequency band BSCC B1 for the HeNB base station device 3f. However, description will be given hereinafter with respect to a mobile station device 1c including the mobile station device 1c with the frequency band APCC A and the mobile station device 1c with the frequency band BSCC B.

First, the mobile station device 1c and the macrocell base station device 2e are performing CA communication using PCC. The mobile station device 1c and the HeNB base station device 3f are performing CA communication using SCC (step STA101).

The mobile station device 1c determines to disconnect SCC based on CC data amount information and battery remaining amount information. In other words, the mobile station device 1c determines to suspend the CA communication. For example, if it is determined that measurement information regarding the battery remaining amount, or measurement information regarding the data amount, is equal to or less than a threshold value, the mobile station device 1c determines to disconnect CA communication (step STA102).

Based on information regarding the CA communication (e.g., an ID of a disconnection-target base station device, a frequency band, a bandwidth, and the like), and the mobile station device 1c transmits an SCC disconnection request to the macrocell base station device 2e (step STA103).

Based on the SCC disconnection request transmitted in step STA103, the macrocell base station device 2e transmits an SCC disconnection preparation request to the HeNB base station device 3f (step STA104).

Based on the SCC disconnection request transmitted in step STA104, the macrocell base station device 3f transmits an SCC disconnection preparation request to the mobile station device 1c (step STA106).

Based on the SCC disconnection preparation request transmitted in step STA104, the macrocell base station device 3f transmits an SCC disconnection process notification to the macrocell base station device 2e (step STA109).

Based on the SCC disconnection preparation request transmitted in step STA106, the mobile station device 1c transmits an SCC disconnection process notification to the macrocell base station device 2e (step STA111).

Based on the SCC disconnection process ACK transmitted in step STA110, the mobile station device 1c disconnects the communication with the HeNB base station device 3f (using SCC (frequency band B)) (step STA107).

The mobile station device 1c provides communication service using PCC (frequency band A) for the macrocell base station device 2e (step STA108).

Thus, the wireless communication system according to the present embodiment includes the macrocell base station device 2e, the HeNB base station device 3f, and the mobile station device 1c. The mobile station device 1c is performing CA communication using a CC for the macrocell base station device 2e and a CC for the HeNB base station device 3f. The mobile station device 1c transmits using PCC, an SCC disconnection request to disconnect the SCC from the PCC used for the CA communication. Based on the SCC disconnection request, the macrocell base station device 2e transmits to the mobile station device 1c, an SCC disconnection preparation request that requests the mobile station device 1c to prepare to disconnect the SCC during the CA communication. Thus, it is possible to disconnect the SCC during the CA communication among the plurality of base station devices.

Here, the description has been given in the present embodiment with respect to the case where the CC for the macrocell base station device 2e is PCC, and the CC for the HeNB base station device 3f is SCC. However, a configuration may be such that the CC for the macrocell base station device 2e is SCC, and the CC for the HeNB base station device 3f is PCC. Alternatively, a configuration may be such that the CC for the HeNB base station device 3f-1 is PCC, and the CC for the HeNB base station device 3f-2 is SCC. In this case, the wireless communication system can disconnect the SCC in a similar manner.

Tenth Embodiment

Hereinafter, a tenth embodiment of the present invention will be described with reference to drawings.

An example of CA communication according to the tenth embodiment of the present invention is similar to that shown in FIGS. 22 and 23, and therefore description thereof is omitted here. Additionally, a wireless communication system S3 according to the present embodiment is similar to that of the wireless communication system S3 shown in FIG. 21, and therefore description is omitted here.

Figure 39:
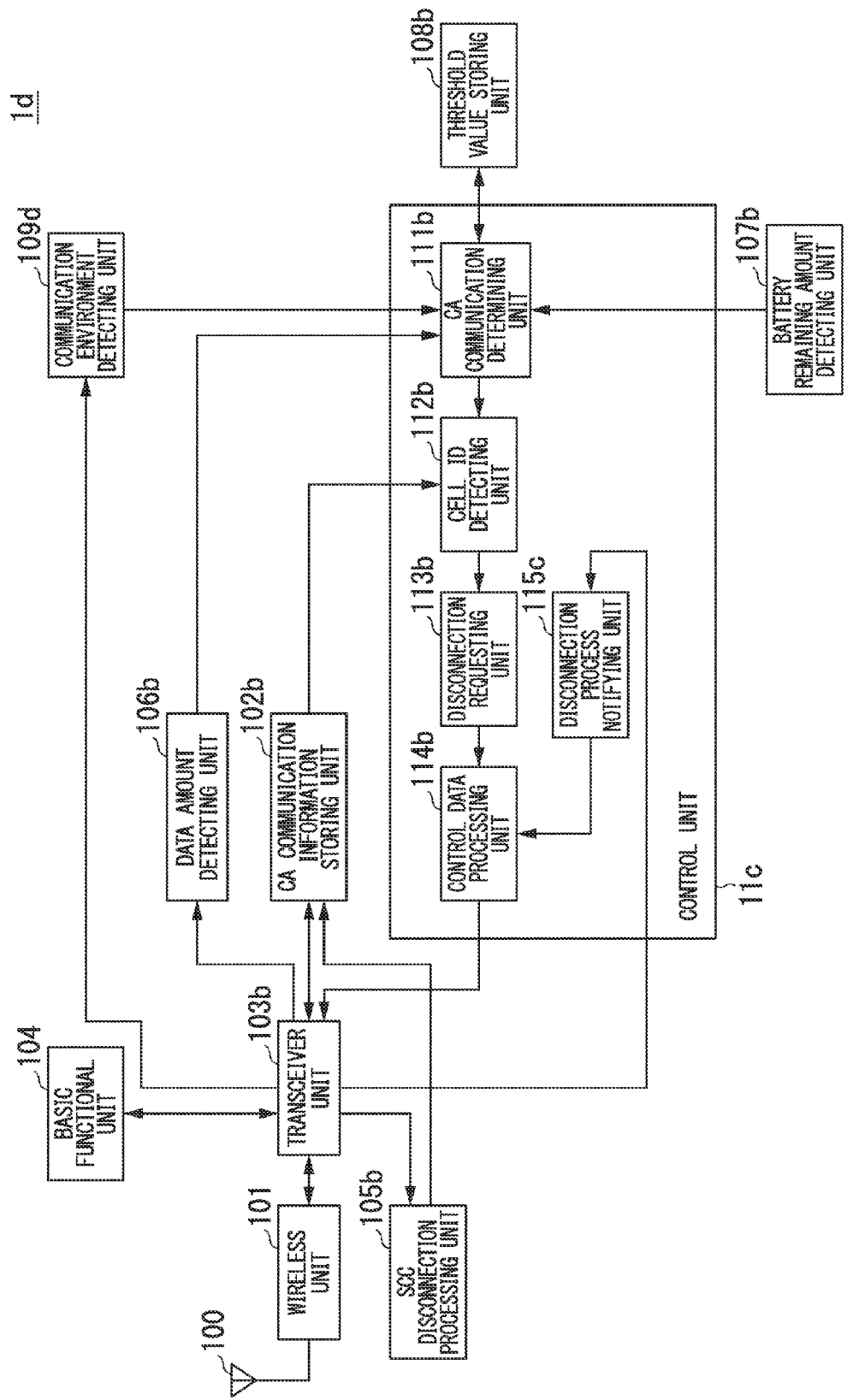
FIG. 39 is a schematic block diagram showing an example of a configuration of a mobile station device according to a tenth embodiment of the present invention.

FIG. 39 is a schematic block diagram showing an example of a configuration of a mobile station device 1d according to the tenth embodiment of the present invention.

Comparing the mobile station device 1d and the mobile station device 1c of the eighth embodiment, a communication environment detecting unit 109d is different. Other configurations are similar to those of the eighth embodiment, and therefore description is omitted. The mobile station device 1d performs wireless communication with a macrocell base station device 2e, an HeNB base station device 3d-1, and an HeNB base station device 3d-2.

Based on a communication signal received from the transceiver unit 103b, the communication environment detecting unit 109d measures information regarding communication environments of communication between the mobile station device 1d and each base station device. The communication environment detecting unit 109d outputs to the control unit 11c, the measured information regarding the communication environments. Here, the information regarding the communication environments represents information, such as a bit error rate, a packet error rate, a throughput, and the like for each CC.

In the present embodiment, the macrocell base station device 2e has a configuration similar to that of the macrocell base station device 2e of the seventh embodiment, and therefore description thereof is omitted here. Additionally, the HeNB base station device 3d-1 and the HeNB base station device 3d-2 have configurations similar to that of the HeNB base station device 3d, and therefore description thereof is omitted here.

Figure 40:
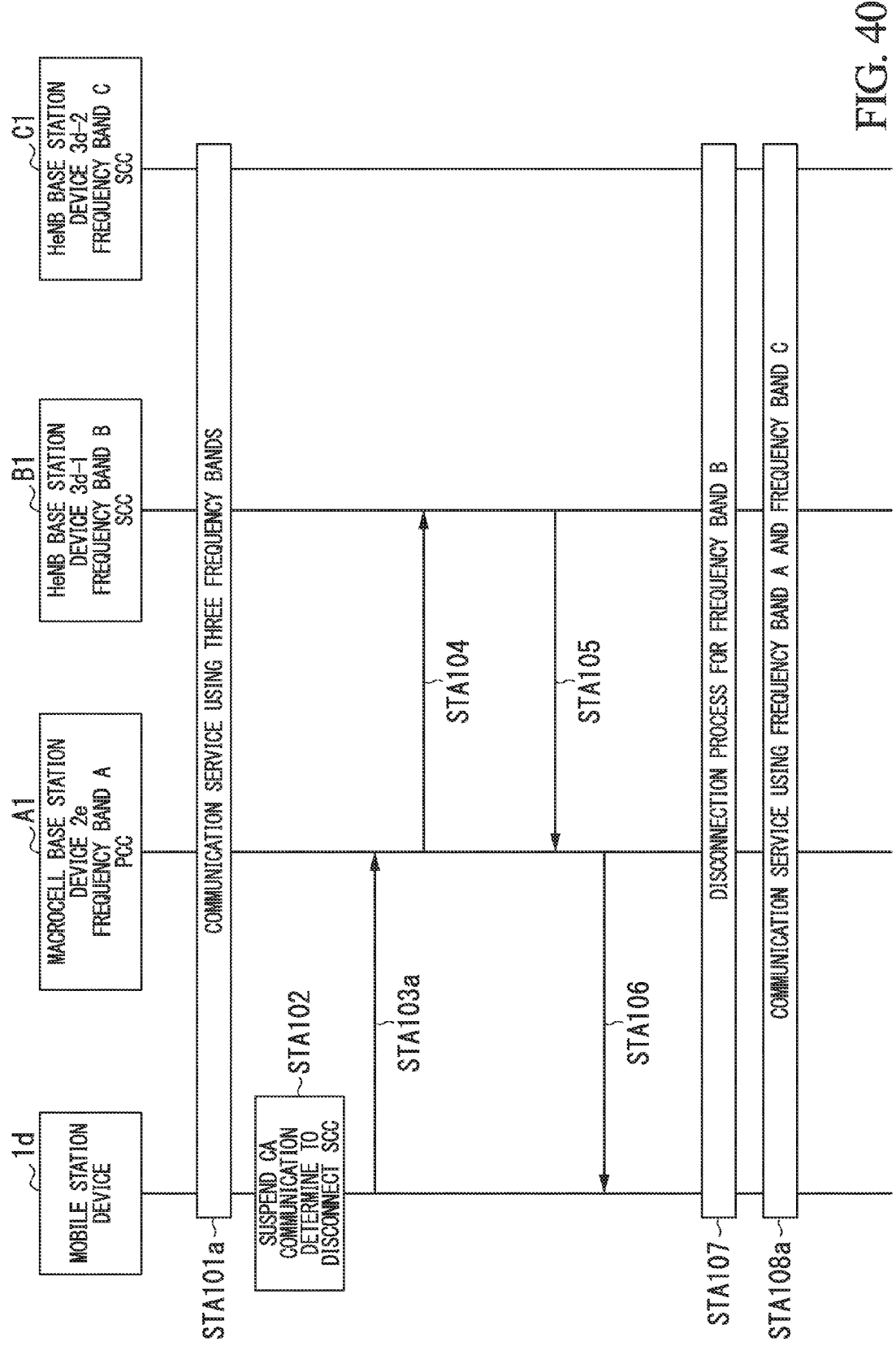
FIG. 40 is a sequence diagram illustrating an example of an SCC disconnection process to be performed by the mobile station device and three base station devices according to the tenth embodiment.

FIG. 40 is a sequence diagram showing an example of an SCC disconnection process performed by the mobile station device 1d and the three base station devices according to the tenth embodiment.

Communication among the macrocell base station device 2f, the HeNB base station device 3d-1, and the HeNB base station device 3d-2 is performed via the network communication units 208e and 305d of the respective base station devices, but description thereof is omitted hereinafter.

Additionally, communication between the mobile station device 1d and the macrocell base station device 2e, communication between the mobile station device 1d and the HeNB base station device 3d-1, and communication between the mobile station device 1d and the HeNB base station device 3d-2, are performed via the transceiver antennas 200 and 300, the wireless units 201 and 301, and the transceiver units 203e and 303d, but description thereof is omitted hereinafter.

Additionally, the mobile station device 1d shown in FIG. 40 includes a mobile station device 1d with a frequency band APCC A, a mobile station device 1d with a frequency band BSCC B, and a mobile station device 1d with a frequency band CSCC C, similarly to FIG. 27. The mobile station device 1d with the frequency band APCC A performs communication using a frequency band APCC A1 for the macrocell base station unit 2e. The mobile station device 1d with the frequency band BSCC B performs communication using a frequency band BSCC B1 for the HeNB base station device 3d-1. The mobile station device 1d with the frequency band CSCC C performs communication using a frequency band CSCC C1 for the HeNB base station device 3d-2. However, description will be given hereinafter with respect to a mobile station device 1d including the mobile station device 1d with the frequency band APCC A, the mobile station device 1d with the frequency band BSCC B, and the mobile station device 1d with the frequency band CSCC C.

First, the mobile station device 1d and the macrocell base station device 2e are performing CA communication using PCC (frequency A). The mobile station device 1d and the HeNB base station device 3d-1 are performing CA communication using SCC (frequency B). The mobile station device 1d and the HeNB base station device 3d-2 are performing CA communication using SCC (frequency C) (step STA101a).

The mobile station device 1d determines to disconnect SCC based on CC data amount information and battery remaining amount information. In other words, the mobile station device 1d determines to suspend the CA communication. For example, if it is determined that measurement information regarding the battery remaining amount, or measurement information regarding the data amount, is equal to or less than a threshold value, the mobile station device 1d determines to disconnect CA communication (step STA102).

Based on information regarding communication environments and information regarding CA communication (e.g., an ID of a disconnection-target base station device, a frequency band, a bandwidth, and the like), and the mobile station device 1d transmits an SCC disconnection request to the macrocell base station device 2e (step STA103a).

Based on the SCC disconnection request transmitted in step STA103a, the macrocell base station device 2e transmits an SCC disconnection preparation request to the HeNB base station device 3d-1 (step STA104).

Based on the SCC disconnection preparation request transmitted in step STA103a, the HeNB base station device 3d-1 transmits an SCC disconnection preparation ACK to the macrocell base station device 2e (step STA105).

Based on the SCC disconnection preparation request transmitted in step STA105, the macrocell base station device 2e transmits an SCC disconnection preparation request to the mobile station device 1d (step STA106).

Based on the SCC disconnection preparation request transmitted in step STA106, the mobile station device 1d disconnects the communication with the HeNB base station device 3d-1 (using SCC (frequency band B)) (step STA107).

The mobile station device 1d provides CA communication service using PCC (frequency band A) for the macrocell base station device 2e and the SCC (frequency band C) for the HeNB base station device 3d-2 (step STA108a).

Thus, the wireless communication system according to the present embodiment includes the macrocell base station device 2e, the HeNB base station device 3d-1, the HeNB base station device 3d-2, and the mobile station device 1d.

The mobile station device 1d is performing CA communication using a CC for the macrocell base station device 2e, a CC for the HeNB base station device 3d-1, and a CC for the HeNB base station device 3d-2. The mobile station device 1d transmits using PCC, an SCC disconnection request to disconnect the SCC from the PCC used for the CA communication. At this time, based on the information regarding communication environments, the mobile station device 1d determines which SCC to disconnect. For example, based on the SCC disconnection request, the macrocell base station device 2e transmits to the mobile station device 1d, an SCC disconnection preparation request that requests the mobile station device 1d to prepare to disconnect the SCC for the HeNB base station device 3d-1 being performing the CA communication. Thus, the mobile station device 1d disconnects the SCC for the HeNB base station device 3d-1 and performs CA communication with the macrocell base station device 2e and the HeNB base station device 3d-2. Thus, it is possible to disconnect the SCC during the CA communication among the plurality of base station devices, thereby making it possible to provide a wireless communication system with an excellent communication speed.

Here, the description has been given in the present embodiment with respect to the case where the CC for the macrocell base station device 2e is PCC, and the CCs for the HeNB base station device 3d-1 and the HeNB base station device 3d-2 are SCCs. However, a configuration may be such that the CCs for the macrocell base station device 2e and the HeNB base station device 3d-2 are SCCs, and the CC for the HeNB base station device 3d-1 is PCC. Alternatively, a configuration may be such that the CC for the HeNB base station 3d-2 is PCC, and the CCs for the macrocell base station device 2e and the HeNB base station device 3d-1 are SCCs. Alternatively, a configuration may be such that the CC for the HeNB base station 3d-1 is PCC, the CC for the HeNB base station device 3d-2 is SCC, and the CC for the HeNB base station device 3d-3 is SCC. In this case, the wireless communication system can disconnect the SCC in a similar manner.

Eleventh Embodiment

Hereinafter, an eleventh embodiment of the present invention will be described with reference to drawings.

An example of CA communication according to the eleventh embodiment of the present invention is similar to that shown in FIGS. 22 and 23, and therefore description thereof is omitted here. Additionally, a wireless communication system S3 according to the present embodiment is similar to that of the wireless communication system S3 shown in FIG. 21, and therefore description is omitted here.

Figure 41:
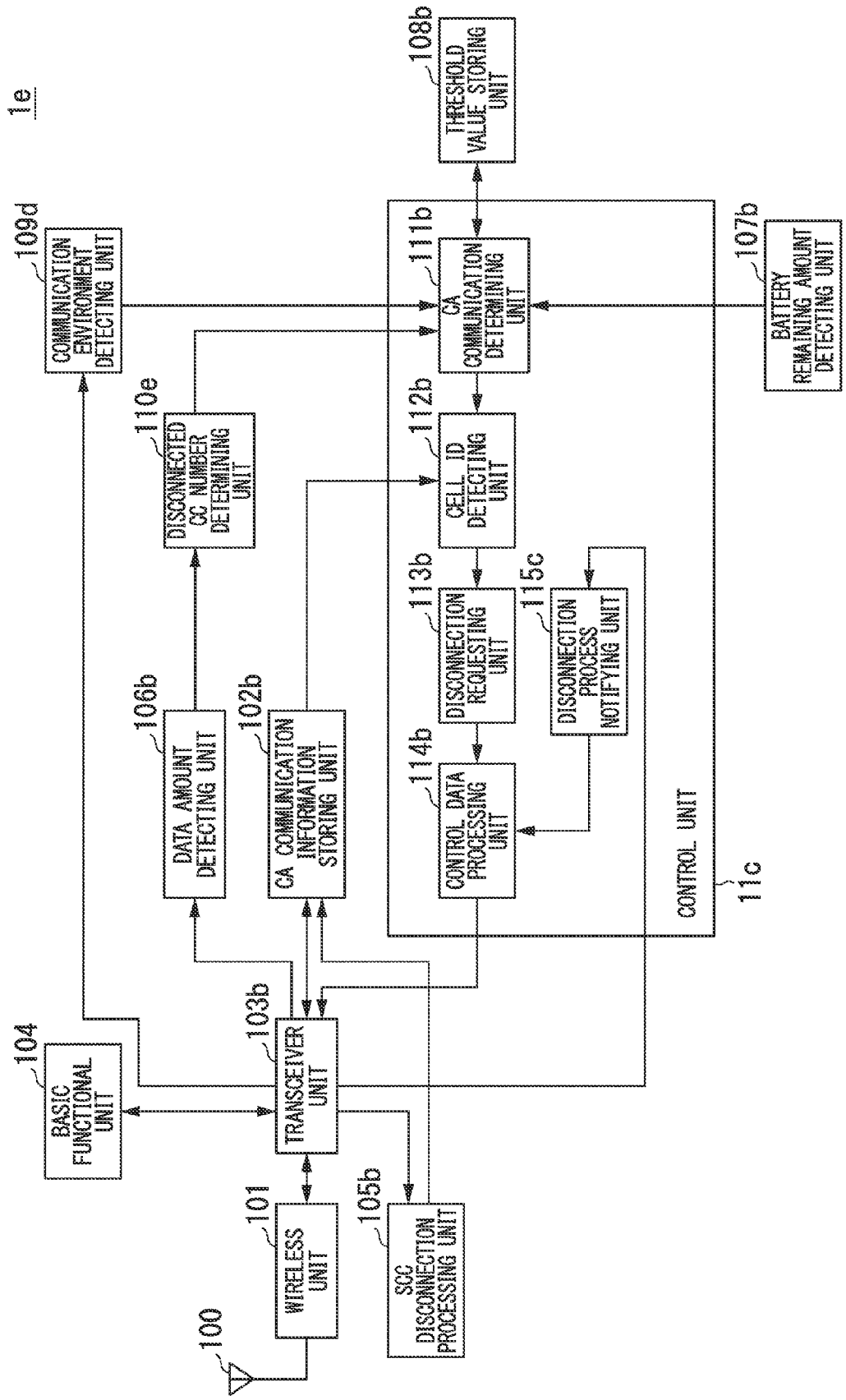
FIG. 41 is a schematic block diagram showing an example of a configuration of a mobile station device according to an eleventh embodiment of the present invention.

FIG. 41 is a schematic block diagram showing an example of a configuration of a mobile station device 1e according to the eleventh embodiment of the present invention.

Comparing the mobile station device 1e and the mobile station device 1d of the tenth embodiment, a disconnected CC number determining unit 110e is different. Other configurations are similar to those of the tenth embodiment, and therefore description is omitted. The mobile station device 1e performs wireless communication with a macrocell base station device 2g, an HeNB base station device 3d-1, and an HeNB base station device 3d-2.

Based on CC data amount information received from the data amount detecting unit 106b, the disconnected CC number determining unit 110e determines the number of SCCs to be disconnected. Then, the disconnected CC number determining unit 110e outputs to the CA communication determining unit 111b, the determined number of SCCs to be disconnected.

Figure 42:
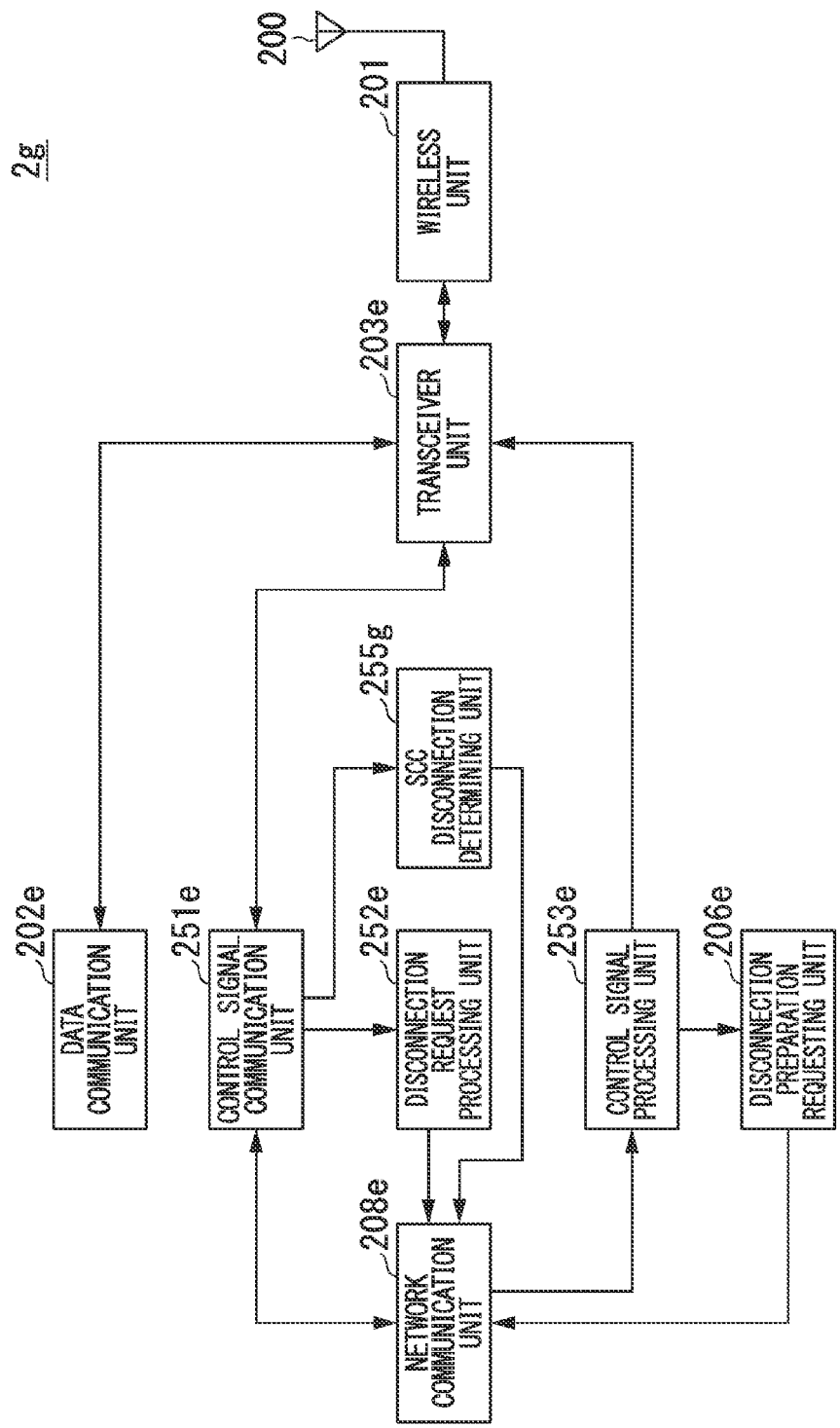
FIG. 42 is a schematic block diagram showing an example of a configuration of a macrocell base station device according to the eleventh embodiment.

FIG. 42 is a schematic block diagram showing an example of a configuration of the macrocell base station device 2g according to the eleventh embodiment.

Comparing the macrocell base station device 2g and the macrocell base station device 2e of the seventh embodiment, an SCC disconnection determining section 255g is different. Other configurations are similar to those of the seventh embodiment, and therefore description is omitted here.

Based on disconnected SCC number information indicating the number of SCCs to be disconnected, which is received from the control signal communication unit 251e, the disconnected SCC number determining unit 255g determines, from the CC data amount and the traffic condition, which SCC to disconnect. Then, the disconnected SCC number determining unit 255g transmits the determined SCC to the HeNB base station device 3d via the network communication unit 208e.

In the present embodiment, the HeNB base station device 3d-1 and the HeNB base station device 3d-2 have similar configurations as that of the HeNB base station device 3d of the seventh embodiment, and therefore description thereof will be omitted.

Figure 43:
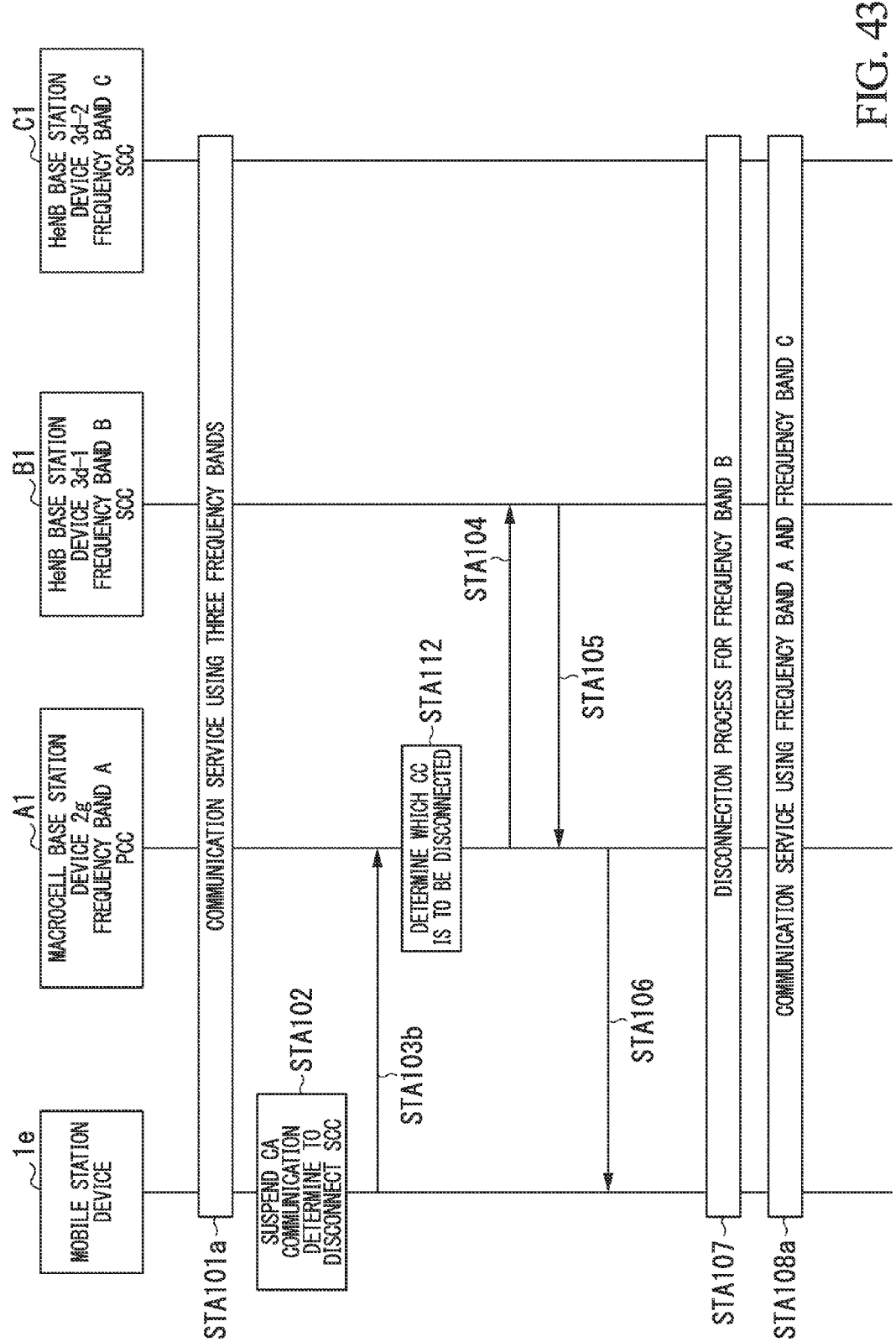
FIG. 43 is a sequence diagram illustrating an example of an SCC disconnection process to be performed by the mobile station device and three base station devices according to the eleventh embodiment.

FIG. 43 is a sequence diagram showing an example of an SCC disconnection process performed by the mobile station device 1e and the three base station devices according to the eleventh embodiment.

Communication among the macrocell base station device 2g, the HeNB base station device 3d-1, and the HeNB base station device 3d-2 is performed via the network communication units 208e and 305d of the respective base station devices, but description thereof is omitted hereinafter.

Additionally, communication between the mobile station device 1e and the macrocell base station device 2g, communication between the mobile station device 1e and the HeNB base station device 3d-1, and communication between the mobile station device 1e and the HeNB base station device 3d-2, are performed via the transceiver antennas 200 and 300, the wireless units 201 and 301, and the transceiver units 203e and 303e, but description thereof is omitted hereinafter.

Additionally, the mobile station device 1e shown in FIG. 43 has a mobile station device 1e with a frequency band APCC A, a mobile station device 1e with a frequency band BSCC B, and a mobile station device 1e with a frequency band CSCC C, similarly to FIG. 28. The mobile station device 1e with the frequency band APCC A performs communication using a frequency band APCC A1 for the macrocell base station unit 2e. The mobile station device 1e with the frequency band BSCC B performs communication using a frequency band BSCC B1 for the HeNB base station device 3d-1. The mobile station device 1e with the frequency band CSCC C performs communication using a frequency band CSCC C1 for the HeNB base station device 3d-2. However, description will be given hereinafter with respect to a mobile station device 1e including the mobile station device 1e with the frequency band APCC A, the mobile station device 1e with the frequency band BSCC B, and the mobile station device 1e with the frequency band CSCC C.

First, the mobile station device 1e and the macrocell base station device 2g are performing CA communication using PCC (frequency A). The mobile station device 1e and the HeNB base station device 3d-1 are performing CA communication using SCC (frequency B). The mobile station device 1e and the HeNB base station device 3d-2 are performing CA communication using SCC (frequency C) (step STA101a).

The mobile station device 1e determines to disconnect SCC based on CC data amount information and battery remaining amount information. In other words, the mobile station device 1e determines to suspend the CA communication. For example, if it is determined that measurement information regarding the battery remaining amount, or measurement information regarding the data amount, is equal to or less than a threshold value, the mobile station device 1e determines to disconnect CA communication (step STA102).

Based on information regarding communication environments and information regarding CA communication (e.g., an ID of a disconnection-target base station device, a frequency band, a bandwidth, and the like), the mobile station device 1e transmits an SCC disconnection request to the macrocell base station device 2g (step STA103b).

Based on the SCC disconnection request transmitted in step STA103b, the macrocell base station device 2g determines which SCC to disconnect (step STA112).

Based on the determination made in step STA112, the macrocell base station device 2g transmits an SCC disconnection preparation request to the HeNB base station device 3d-1 (step STA104).

Based on the SCC disconnection preparation request transmitted in step STA104, the HeNB base station device 3d-1 transmits an SCC disconnection preparation ACK to the macrocell base station device 2g (step STA105).

Based on the SCC disconnection preparation request transmitted in step STA105, the macrocell base station device 2g transmits an SCC disconnection preparation request to the mobile station device 1e (step STA106).

Based on the SCC disconnection preparation request transmitted in step STA106, the mobile station device 1e disconnects the communication with the HeNB base station device 3d-1 using SCC (frequency band B) (step STA107).

The mobile station device 1e provides CA communication service using PCC (frequency band A) for the macrocell base station device 2g and the SCC (frequency band C) for the HeNB base station device 3d-2 (step STA108a).

Thus, the wireless communication system according to the present embodiment includes the macrocell base station device 2g, the HeNB base station device 3d-1, the HeNB base station device 3d-2, and the mobile station device 1e. The mobile station device 1e is performing CA communication using a CC for the macrocell base station device 2g, a CC for the HeNB base station device 3d-1, and a CC for the HeNB base station device 3d-2. The mobile station device 1e transmits using PCC, an SCC disconnection request to disconnect the SCC from the PCC used for the CA communication. At this time, based on the CC data amount information, the mobile station device 1e determines the number of SCCs to be disconnected. Based on the SCC disconnection request, the macrocell base station device 2g determines, from the CC data amount and the traffic condition, which SCC to disconnect. Then, the macrocell base station device 2g transmits to the mobile station device 1e, an SCC disconnection preparation request that requests the mobile station device 1e to prepare to disconnect the SCC for the HeNB base station device 3d-1 being performing the CA communication. Thus, the mobile station device 1d disconnects the SCC for the HeNB base station device 3d-1 and performs CA communication with the macrocell base station device 2g and the HeNB base station device 3d-2. Thus, it is possible to disconnect the SCC during the CA communication among the plurality of base station devices, thereby making it possible to provide a wireless communication system with an excellent communication speed.

Here, the description has been given in the present embodiment with respect to the case where the CC for the macrocell base station device 2g is PCC, and the CCs for the HeNB base station device 3d-1 and the HeNB base station device 3d-2 are SCCs. However, a configuration may be such that the CCs for the macrocell base station device 2g and the HeNB base station device 3d-2 are SCCs, and the CC for the HeNB base station device 3d-1 is PCC. Alternatively, a configuration may be such that the CC for the HeNB base station 3d-1 is PCC, the CC for the HeNB base station device 3d-2 is SCC, and the CC for an HeNB base station device 3d-3 is SCC. In this case, the wireless communication system can disconnect the SCC in a similar manner.

Here, for example, a computer may implement part or all of the mobile station devices 1, 1a, 1b, 1c, 1d, and 1e, the macrocell base station devices 2, 2a, 2b, 2c, 2d, 2e, 2f, and 2g, and the HeNB base station devices 3, 3a, 3b, 3d, 3e, and 3f, which are of the above-described embodiments. In this case, a program for implementing those control functions may be recorded on a computer-readable recording medium, so that a computer system can read and execute the program recorded on the recording medium to implement the control functions. Here, the "computer system" means computer systems included in the mobile station devices 1, 1a, 1b, 1c, 1d, and 1e, the macrocell base station devices 2, 2a, 2b, 2c, 2d, 2e, 2f, and 2g, and the HeNB base station devices 3, 3a, 3b, 3d, 3e, and 3f. Additionally, the "computer system" may include an OS and hardware such as peripheral devices.

Further, the "computer-readable recording medium" means a storage device, such as: a portable medium, for example, a flexible disk, a magneto optical disk, a ROM, or a CD-ROM; or a hard disk built in a computer system. Moreover, the "computer-readable recording medium" may also include a medium that dynamically stores a program for a short period, such as a communication line in a case where the program is transmitted via a network such as the Internet, or a communication line such as a telephone line. Moreover, the "computer-readable recording medium" may also include a medium that temporarily stores a program, such as a volatile memory included in a computer system which serves as a server or client in the above case. Additionally, the above program may be a program for implementing part of the above-described functions. Further, the above program may be a program that can implement the above-described functions in combination with the program already stored in the computer system.

Additionally, part or whole of the mobile station devices 1, 1a, 1b, 1c, 1d, and 1e, the macrocell base station devices 2, 2a, 2b, 2c, 2d, 2e, 2f, and 2g, and the HeNB base station devices 3, 3a, 3b, 3d, 3e, and 3f, which are of the above-described embodiments may be implemented as an integrated circuit, such as an LSI (large scale integration). Each functional block of the mobile station devices 1, 1a, 1b, 1c, 1d, and 1e, the macrocell base station devices 2, 2a, 2b, 2c, 2d, 2e, 2f, and 2g, and the HeNB base station devices 3, 3a, 3b, 3d, 3e, and 3f may be individually made into a processor. Alternatively, part or whole of the functional blocks may be integrated and made into a processor. Additionally, the method of forming an integrated circuit is not limited to LSI, and an integrated circuit may be implemented by a dedicated circuit or a general-purpose processor. Further, if technology of forming an integrated circuit, which replaces LSI, arises as a result of advances in semiconductor technology, an integrated circuit formed by that technology may be used.

As described above, each embodiment of the present invention has been described in detail with reference to the drawings, a specific configuration is not limited to those embodiments, and various design modifications may be made without departing from the scope of the invention. Additionally, each configuration of each embodiment and combinations thereof, and the like, are one example, and addition, omission, replacement, and other changes of the configurations can be made.

DESCRIPTION OF REFERENCE NUMERALS

S1, S2, S3: wireless communication system
1, 1a, 1b, 1c, 1d, 1e: mobile station device
2, 2a, 2b, 2c, 2d, 2e, 2f, 2g: macrocell base station device
3, 3a, 3b, 3d, 3e, 3f, 3-1, 3-2, 3-3, 3d-1, 3d-2, 3d-3: HeNB base station device
4: core network switch
CE1-1, CE1-2, CE2-1, CE2-2, CE2-3: cell
F1, F1a, F1b, F1c: first CC (frequency band A)
F2, F2a, F2b, F2c: second CC (frequency band B)
F3, F3a: third CC (frequency band C)
100: transceiver antenna
101: wireless unit
102, 102b: CA communication information storing unit
103, 103b: transceiver unit
104: basic functional unit
105, 105b: SCC disconnection processing unit
106b: data amount detecting unit
107b: battery remaining amount detecting unit
108b: threshold value storing unit
109d: communication environment detecting unit
110e: disconnected CC number determining unit
11b, 11c: control unit
111b: CA communication determining unit
112b: cell ID detecting unit
113b: disconnection requesting unit
114b: control data processing unit
115a, 115c: disconnection process notifying unit
200: transceiver antenna
201: wireless unit
202, 202e: data communication unit
203, 203e: transceiver unit
204: CA communication information storing unit
205: SCC disconnection requesting unit
206, 206e: disconnection preparation requesting unit
207: disconnection preparation request processing unit
208, 208e: network communication unit
209a: disconnection process notification processing unit
21: CA communication determining unit
211: threshold value storing unit
212: call type storing unit
213: application used amount storing unit
214: cell traffic amount detecting unit
215: data amount detecting unit
216: call type determining unit
217: application used amount determining unit
22c: CA communication rejection request processing unit
23d: CA communication disconnection determining unit
231: threshold value storing unit
232: call type storing unit
233: application used amount storing unit
234: cell traffic amount detecting unit
235: data amount detecting unit
236: communication environment detecting unit 237: call type determining unit
238: application used amount determining unit
24d: disconnection target SCC determining unit
241: communication environment comparing unit
242: cell traffic amount comparing unit
251e: control signal communication unit
252e: disconnection request processing unit
253e: control signal processing unit
254f: disconnection process notification processing unit
255g: SCC disconnection determining unit
300: transceiver antenna
301: wireless unit
302, 302d: data communication unit
303, 303d: transceiver unit
304: disconnection preparation request processing unit
304e: disconnection preparation requesting unit
305, 305d: network communication unit
306a: SCC disconnection requesting unit
307b: SCC disconnection process notifying unit
308c: CA communication rejection requesting unit
32c: CA communication rejection determining unit
321: threshold value storing unit
322: cell traffic amount detecting unit
323: user number detecting unit
325: communication limitation processing unit
331d: control signal communication unit
332d: disconnection preparation request processing unit
333d: control signal processing unit
334d: resource managing unit
335f: disconnection process notifying unit

The invention claimed is:

1. A wireless communication system comprising:
a first base station device;
a second base station device; and
a mobile station device configured to communicate with the first base station device using a first component carrier and to communicate with the second base station device using a second component carrier, wherein
the second base station device comprises:
  carrier aggregation communication rejection determining circuitry that determines, based on a result of measurement of a communication environment, whether or not to disconnect the second component carrier; and
  carrier aggregation communication rejection requesting circuitry that transmits, in a case that the carrier aggregation communication rejection determining circuitry determines to disconnect the second component carrier, to the first base station device, a carrier aggregation communication rejection request that requests the first base station device to reject carrier aggregation communication, and
the first base station device comprises:
  disconnection preparation requesting circuitry that transmits, upon receiving the carrier aggregation communication rejection request, to the second base station device, a disconnection preparation request that requests the second base station device to prepare to disconnect the second component carrier.

* * * * *